United States Patent
Kim

(10) Patent No.: US 12,262,255 B2
(45) Date of Patent: Mar. 25, 2025

(54) OPERATION METHOD AND APPARATUS OF PROTOCOL LAYER DEVICE FOR EFFICIENT HANDOVER IN WIRELESS COMMUNICATION SYSTEM

(71) Applicant: SAMSUNG ELECTRONICS CO., LTD., Suwon-si (KR)

(72) Inventor: Donggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 266 days.

(21) Appl. No.: 17/755,774

(22) PCT Filed: Nov. 6, 2020

(86) PCT No.: PCT/KR2020/015528
§ 371 (c)(1),
(2) Date: May 6, 2022

(87) PCT Pub. No.: WO2021/091315
PCT Pub. Date: May 14, 2021

(65) Prior Publication Data
US 2022/0394581 A1    Dec. 8, 2022

(30) Foreign Application Priority Data
Nov. 6, 2019  (KR) .......................... 10-2019-0141259

(51) Int. Cl.
*H04W 36/18* (2009.01)
*H04W 36/00* (2009.01)

(52) U.S. Cl.
CPC ... *H04W 36/0033* (2013.01); *H04W 36/0055* (2013.01); *H04W 36/185* (2023.05)

(58) Field of Classification Search
CPC . H04W 36/18; H04W 36/0033; H04W 36/08; H04W 36/0055; H04W 36/185; H04W 36/02
See application file for complete search history.

(56) References Cited

U.S. PATENT DOCUMENTS

2018/0302813 A1* 10/2018 Hahn ................... H04W 36/304
2020/0008113 A1* 1/2020 Chen .................. H04W 36/0038
(Continued)

FOREIGN PATENT DOCUMENTS

KR    10-2019-0105930 A    9/2019

OTHER PUBLICATIONS

International Search Report and Written Opinion of the International Searching Authority in connection with International Application No. PCT/KR2020/015528 issued Feb. 18, 2021, 13 pages.
(Continued)

*Primary Examiner* — Jamal Javaid

(57) ABSTRACT

Provided is a method performed by a user equipment (UE) in a wireless communication system. The method includes: receiving, from a source base station, a first radio resource control (RRC) reconfiguration message including configuration information indicating reconfiguration with sync, identification information of a bearer, and dual active protocol stack (DAPS) configuration information indicating that the bearer is configured as a DAPS bearer; reconfiguring a packet data convergence protocol (PDCP) entity of the UE with respect to the bearer; switching uplink data transmission from the source base station to a target base station; and releasing the source base station.

14 Claims, 13 Drawing Sheets

(56) References Cited

U.S. PATENT DOCUMENTS

2020/0022035 A1* 1/2020 Kadiri .............. H04W 36/0072
2021/0045029 A1 2/2021 Ryu

OTHER PUBLICATIONS

ETSI TS 138 331 V15.7.0 (Oct. 2019); Technical Specification; 5G; NR; Radio Resource Control (RRC);Protocol specification (3GPP TS 38.331 version 15.7.0 Release 15); 524 pages.

Nokia et al., "Analysis of DAPS Operation" 3GPP TSG-RAN WG2 Meeting #107, R2-1909036, Prague, Czech Republic, Aug. 26-30, 2019, 7 pages.

ZTE Corporation et al., "Discussion on PDCP aspects for RUDI" 3GPP TSG RAN WG2 Meeting #107, R2-1910758, Prague, Czech Republic, Aug. 26-30, 2019, 6 pages.

Mediatek Inc et al., "UL Handling with DAPS during RUDI Handover" 3GPP TSG-RAN WG2 #107, R2-1909178, Prague, Czech Republic, Aug. 26-30, 2019, 8 pages.

Office Action Report dated Nov. 14, 2024, in connection with European Patent Application No. 20883909.2, 6 pages.

Supplementary European Search Report dated Nov. 8, 2022, in connection with European Patent Application No. 20883909.2, 10 pages.

Mediatek Inc et al., "Bearer handling for RUDI during HO with DAPS," R2-1912968 (revision of R2-1909180), 3GPP TSG-RAN WG2 #107bis, Chongqing, China, Oct. 2019, 5 pages.

RAN2, "LS on RAN2 agreements on LTE and NR mobility enhancements," R2-1914025, 3GPP TSG-RAN WG2 #107bis, Chongqing, China, Oct. 2019, 4 pages.

Qualcomm Incorporated, "Supporting per DRB DAPS HO configuration," R2-1912299, 3GPP TSG-RAN WG2 Meeting #107bis, Chongqing, CN, Oct. 2019, 4 pages.

Ericsson "Characteristics of the handover interruption solution for NR," R2-1908958, 3GPP TSG-RAN WG2 #107, Prague, Czech Republic, Aug. 2019, 9 pages.

* cited by examiner

OPERATION METHOD AND APPARATUS OF PROTOCOL LAYER DEVICE FOR EFFICIENT HANDOVER IN WIRELESS COMMUNICATION SYSTEM

CROSS-REFERENCE TO RELATED APPLICATIONS

This application is a 371 of International Application No. PCT/KR2020/015528, filed 6 Nov. 2020, which claims priority to Korean Patent Application No. 10-2019-0141259, filed 6 Nov. 2019, the disclosures of which are herein incorporated by reference in their entirety.

BACKGROUND

1. Field

The present disclosure relates to a method and apparatus for efficient handover without interruption of data transmission and reception during handover in a next-generation mobile communication system.

2. Description of Related Art

To meet the increase in demand with respect to wireless data traffic after the commercialization of $4^{th}$ generation (4G) communication systems, considerable efforts have been made to develop improved $5^{th}$ generation (5G) communication systems or pre-5G communication systems. For this reason, 5G communication systems or pre-5G communication systems are called beyond 4G network communication systems or post long term evolution (LTE) systems. To achieve a high data rate, the implementation of 5G communication systems in an ultra-high frequency band (millimeter wave (mmWave)) (e.g., a 60 GHz band) is under consideration. To alleviate path loss of radio waves and increase propagation distances of radio waves in a millimeter wave band, technologies for 5G communication systems, such as beamforming, massive multi-input multi-output (MIMO), full dimensional MIMO (FD-MIMO), array antenna, analog beamforming, and large-scale antenna system, are being discussed. Also, in order to improve a system network for 5G communication systems, technologies, such as evolved small cell, advanced small cell, cloud radio access network (cloud RAN), ultra-dense network, device-to-device (D2D) communication, wireless backhaul, moving network, cooperative communication, coordinated multi-points (CoMP), and reception interference cancellation, are being developed. In addition, for 5G communication systems, hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced access technologies, have been developed.

The Internet has evolved from a human-centered connection network, through which humans generate and consume information, to an Internet of things (IoT) network that exchanges and processes information between distributed elements such as objects. An Internet of everything (IoE) technology is emerging, in which a technology related to the IoT is combined with, for example, a technology for processing big data through connection with a cloud server. In order to implement the IoT, various technical components are required, such as, a sensing technology, wired/wireless communication and network infrastructures, a service interfacing technology, a security technology, etc. In recent years, technologies including a sensor network for connecting objects, machine-to-machine (M2M) communication, machine type communication (MTC), etc., have been studied. In the IoT environment, intelligent Internet technology (IT) services may be provided to collect and interpret data obtained from objects connected to each other, and to create new value in human life. As existing information technology (IT) and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to IoT networks. For example, technologies related to sensor networks, M2M communication, MTC, etc., are implemented by using 5G communication technologies including beamforming, MIMO, array antenna, etc. The application of cloud RAN as the big data processing technology described above may be an example of convergence of 5G communication technology and IoT technology.

As it is possible to provide various services according to the development of wireless communication systems, there is a need for a method of seamlessly providing these services. In particular, there is a need for a communication method of efficiently controlling data transmission and reception of a terminal with a source base station and a target base station during handover.

SUMMARY

The present disclosure provides an efficient handover method capable of supporting a service with low transmission delay without data interruption in a next-generation mobile communication system.

The present disclosure provides various efficient handover methods which, when handover is performed in a next-generation mobile communication system, may prevent occurrence of a data interruption time due to handover so as to support a service without data interruption.

DETAILED DESCRIPTION

Figure 1A:
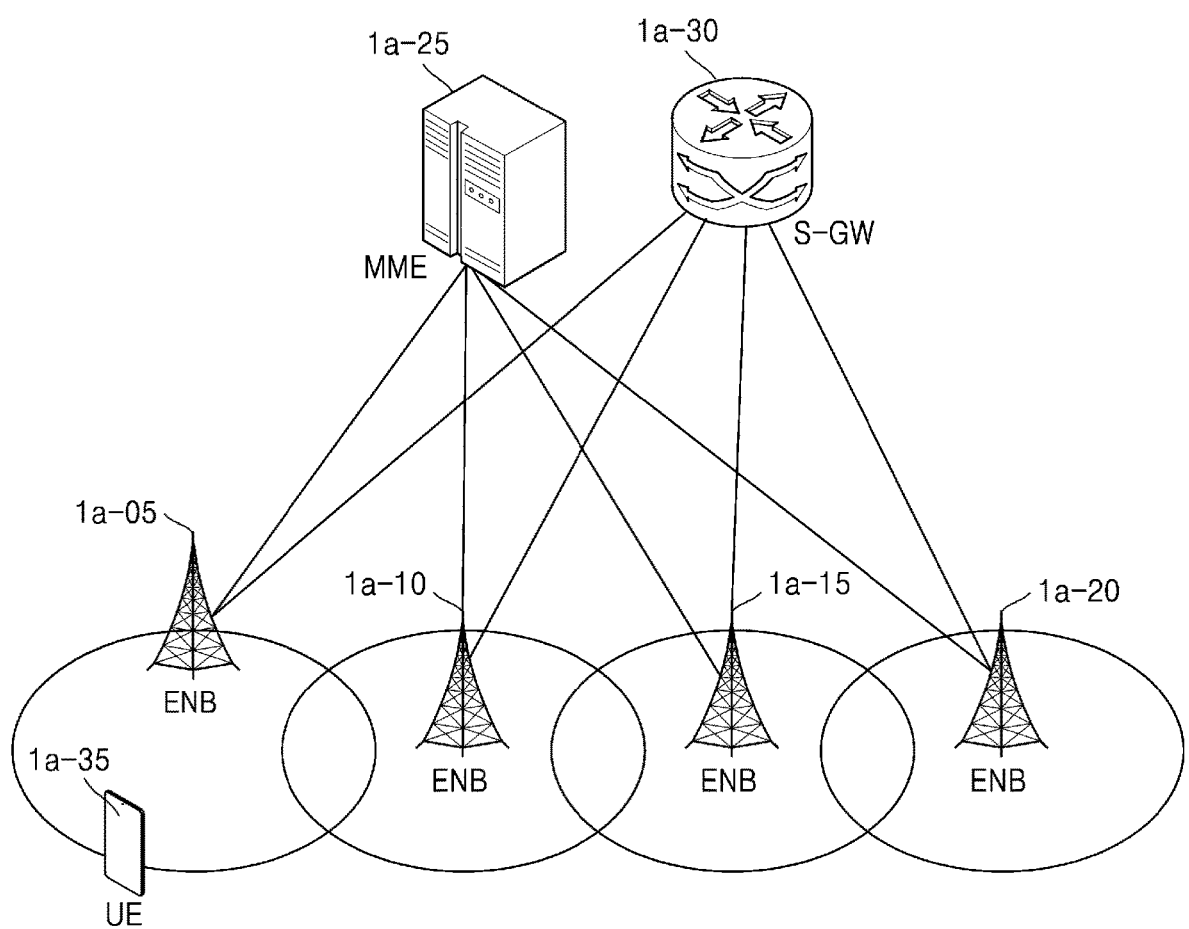
FIG. 1A is a diagram illustrating an architecture of a long term evolution (LTE) system to which the present disclosure is applicable.

The present disclosure relates to a method and apparatus for performing handover in a wireless communication system. A user equipment (UE) according to an embodiment of the present disclosure may transmit and receive data to and from a source base station, may receive a handover command from the source base station, may generate a protocol layer of a bearer for a target base station, and may perform a random access procedure to the target base station, wherein data transmitted and received to and from the source base station may be transmitted and received even during the random access procedure, based on a certain condition.

A method performed by a user equipment (UE) in a wireless communication system, according to an embodiment of the present disclosure, may include: receiving, from a source base station, a first radio resource control (RRC) reconfiguration message including configuration information indicating reconfiguration with sync, identification information of a bearer, and dual active protocol stack (DAPS) configuration information indicating that the bearer is configured as a DAPS bearer; reconfiguring a packet data convergence protocol (PDCP) entity of the UE with respect to the bearer; switching uplink data transmission from the source base station to a target base station; and releasing the source base station.

According to an embodiment of the present disclosure, the reconfiguring of the PDCP entity of the UE for the bearer may include configuring, for the PDCP entity, a security key and header compression context of the target base station.

According to an embodiment of the present disclosure, the switching of the uplink data transmission from the source base station to the target base station may include: when random access to the target base station is successfully completed, requesting the PDCP entity to switch uplink data; and when a PDCP packet data unit (PDU) that the PDCP entity attempts to transmit to a lower layer is a PDCP data PDU, transmitting the PDCP data PDU from the PDCP entity to a first radio link control (RLC) entity associated with the target base station.

According to an embodiment of the present disclosure, the switching of the uplink data transmission from the source base station to the target base station may include: in a case where the PDCP PDU that the PDCP entity attempts to transmit to the lower layer is a PDCP control PDU, when the PDCP control PDU is associated with the source base station, transmitting the PDCP control PDU from the PDCP entity to a second RLC entity associated with the source base station; and when the PDCP control PDU is associated with the target base station, transmitting the PDCP control PDU from the PDCP entity to the first RLC entity associated with the target base station.

According to an embodiment of the present disclosure, the releasing of the source base station may include: receiving, from the source base station or the target base station, a second RRC reconfiguration message including an indicator indicating to release a source for the bearer; releasing a second RLC entity associated with the source base station; and discarding a security key and first header decompression context associated with the source base station.

According to an embodiment of the present disclosure, the releasing of the source base station may further include, before discarding the first header decompression context associated with the source base station, performing header decompression by applying the first header compression context to data received from the source base station, which are stored in the PDCP entity.

According to an embodiment of the present disclosure, in the PDCP entity, the header compression context associated with the target base station may be used for uplink, and the first header decompression context associated with the source base station and the second header decompression context associated with the target base station may be used for downlink.

A user equipment (UE) in a wireless communication system, according to an embodiment of the present disclosure, may include: a transceiver; and at least one processor configured to: control the transceiver to receive, from a source base station, a first radio resource control (RRC) reconfiguration message including configuration information indicating reconfiguration with sync, identification information of a bearer, and dual active protocol stack (DAPS) configuration information indicating that the bearer is configured as a DAPS bearer; reconfigure a packet data convergence protocol (PDCP) entity of the UE with respect to the bearer; switch uplink data transmission from the source base station to a target base station; and perform a control to release the source base station.

Hereinafter, an operation principle of the present disclosure will be described in detail with reference to the accompanying drawings. In describing the present disclosure, when a detailed description of the relevant known functions or configurations is determined to unnecessarily obscure the gist of the present disclosure, the detailed description thereof may be omitted herein. The terms as used herein are those defined by taking into account functions in the present disclosure, but the terms may vary depending on the intention of users or those of ordinary skill in the art, precedents, or the like. Therefore, the definitions should be made based on the contents throughout the specification.

In describing the present disclosure, when a detailed description of the relevant known functions or configurations is determined to unnecessarily obscure the gist of the present disclosure, the detailed description thereof may be omitted. Hereinafter, embodiments of the present disclosure will be described in detail with reference to the accompanying drawings.

The term for identifying an access node, the term referring to network entities, the term referring to messages, the term referring to an interface between network entities, the terms referring to a variety of identification information, and the like are exemplified for convenience of description. Therefore, the present disclosure is not limited to the terms to be described later, and other terms referring to entities having an equivalent technical meaning may be used.

For convenience of description, the terms and names defined in the 3rd generation partnership project (3GPP) standard are used herein. However, the present disclosure is not limited by the terms and names and may be equally applied to systems conforming to other standards. The term "eNB" as used herein may be used interchangeably with the term "gNB" for convenience of description. That is, a base station described as eNB may represent gNB.

The present disclosure proposes seamless handover methods capable of minimizing a data interruption time due to handover or reducing a data interruption time to 0 ms in a next-generation mobile communication system.

Specifically, efficient handover methods proposed in the present disclosure may have one or more of the following features.

When a user equipment (UE) that performs data transmission or reception (uplink or downlink data transmission and reception) with a source gNB through protocol layers (a physical (PHY) layer, a media access control (MAC) layer, a radio link control (RLC) layer, or a packet data convergence protocol (PDCP) layer) of a plurality of first bearers receives a handover command message (or a radio resource control (RRC) reconfiguration message) from the source gNB, the UE may establish protocol layers of a plurality of new second bearers corresponding to the protocol layers for the first bearers (for example, having the same bearer identifier), and may perform data transmission or reception (uplink or downlink data transmission and reception) while continuously maintaining the data transmission or reception with the source gNB through the first bearers without interruption.

After the UE receives the handover command message, the protocol layers (a PHY layer, a MAC layer, an RLC layer, or a PDCP layer) for the second bearers that are newly established are configured for data transmission or reception with a target gNB based on bearer configuration information or protocol layer information included in the handover command message.

The UE performs a random access procedure to the target gNB through the protocol layers (for example, a MAC layer) for the second bearers while performing data transmission or reception (uplink or downlink data transmission and reception) with the source gNB through the protocol layers for the first bearers. The random access procedure may include preamble transmission, random access response reception, message 3 transmission, or message 4 reception (for example, contention resolution MAC control element (CE) or uplink transmission resource reception).

The UE completes the random access procedure to the target gNB through the protocol layers (for example, a MAC layer) for the second bearers while performing data transmission or reception with the source gNB through the protocol layers for the first bearers, and transmits a handover completion message to the target gNB through the protocol layers for the second bearers.

The UE completes the random access procedure to the target gNB through the protocol layers for the second bearers (for example, a MAC layer) while performing data transmission or reception with the source gNB through the protocol layers for the first bearers, transmits the handover completion message to the target gNB through the protocol layers for the second bearers, and performs data transmission or reception (uplink or downlink).

When the UE successfully completes the random access procedure to the target gNB and receives an uplink transmission resource from the target gNB for the first time, the UE stops transmitting data to the source gNB through the protocol layers for the first bearers, and switches uplink transmission to transmit data to the target gNB through the second bearers.

When the UE receives the handover command message, the UE continues to perform data transmission or reception (uplink or downlink data transmission or reception) with the source gNB through the protocol layers for the first bearers, and performs a random access procedure to the target gNB through the protocol layers for the second bearers. When the UE successfully completes the random access procedure and receives the uplink transmission resource from the target gNB for the first time, the UE stops transmitting uplink data to the source gNB through the protocol layers for the first bearers, and transmits uplink data to the target gNB only through the protocol layers for the second bearers. Also, the UE may continue to receive downlink data from the source gNB through the protocol layers for the first bearers, and may continue to receive downlink data from the target gNB through the protocol layers for the second bearers.

The first bearer and the second bearer may be configured in the second PDCP layer structure. In the second PDCP layer structure, both the first bearer for the source gNB (for example, an RLC layer, a MAC layer, or a PHY layer) and the second bearer for the target gNB (for example, an RLC layer, a MAC layer, or a PHY layer) may be connected to one PDCP layer. Uplink data may be transmitted through one of the first bearer and the second bearer via the PDCP layer. That is, the UE transmits the uplink data through the first bearer until the UE performs the random access procedure to the target gNB, successfully completes the random access procedure, and receives the uplink transmission resource from the target gNB for the first time. When the UE performs the random access procedure to the target gNB, successfully completes the random access procedure, and receives the uplink transmission resource from the target gNB for the first time, the UE may stop transmitting data through the first bearer and switch to transmit the uplink data to the target through the second bearer. In this case, in the second PDCP layer structure, the UE may receive the downlink data from the source gNB or the target gNB through the first bearer or the second bearer.

Hereinafter, the present disclosure proposes efficient handover procedures without a data interruption time based on the above features.

FIG. 1A is a diagram illustrating an architecture of a long term evolution (LTE) system to which the present disclosure is applicable.

Referring to FIG. 1A, a radio access network of the LTE system includes next-generation base stations (evolved Node Bs, hereinafter referred to as ENBs, Node Bs, or gNBs) 1a-05, 1a-10, 1a-15, and 1a-20, a mobility management entity (MME) 1a-25, and a serving-gateway (S-GW)

1a-30. A UE (or a terminal) 1a-35 may access an external network through the ENBs 1a-05 to 1a-20 and the S-GW 1a-30.

In FIG. 1A, the ENBs 1a-05 to 1a-20 correspond to an existing Node B of a universal mobile telecommunication system (UMTS). The ENB is connected to the UE 1a-35 through a radio channel, and performs a more complex role than the existing Node B. In the LTE system, all user traffics including real-time services such as Voice over IP (VoIP) through an Internet protocol may be serviced through a shared channel. Therefore, an apparatus for collecting and scheduling status information such as buffer status, available transmission power status, and channel status of UEs may be required. This may be handled by the ENBs 1a-05 to 1a-20. One ENB may typically control a plurality of cells. For example, in order to implement a transmission rate of 100 Mbps, the LTE system may use, for example, an orthogonal frequency division multiplexing (OFDM) scheme in a 20-MHz bandwidth as a radio access technology. Also, a modulation scheme and an adaptive modulation and coding (AMC) scheme that determines a channel coding rate are applied according to the channel status of the UE. The S-GW 1a-30 is an entity that provides data bearers, and may add or release data bearers under the control by the MME 1a-25. The MME is an entity that is responsible for various control functions as well as mobility management functions for the UE, and is connected to a plurality of base stations.

Figure 1B:
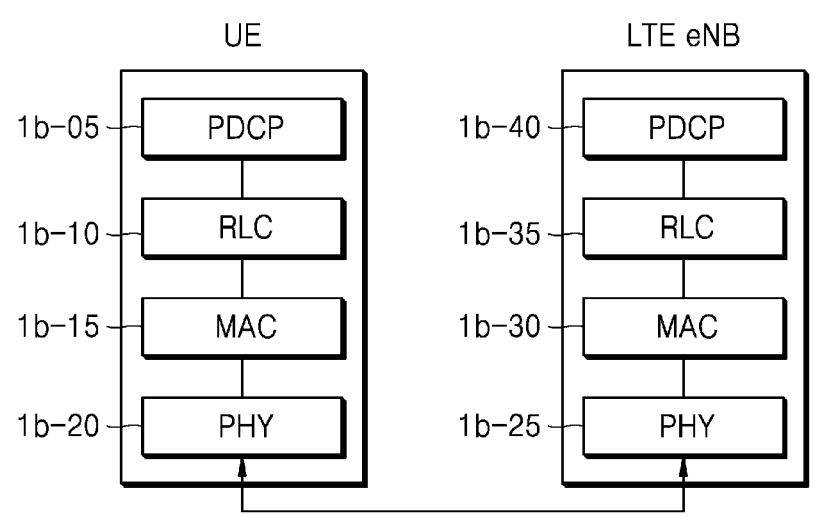
FIG. 1B is a diagram illustrating a radio protocol architecture of an LTE system to which the present disclosure is applicable.

FIG. 1B is a diagram illustrating a radio protocol architecture of an LTE system to which the present disclosure is applicable.

Referring to FIG. 1B, in the radio protocol of the LTE system, a UE and an ENB respectively include PDCPs 1b-05 and 1b-40, RLCs 1b-10 and 1b-35, and MACs 1b-15 and 1b-30. The PDCPs 1b-05 and 1b-40 may be responsible for operations such as IP header compression and decompression. The main functions of the PDCP are summarized as follows.

Header compression and decompression function (Header compression and decompression: Robust header compression (ROHC) only)
   User data transfer function
   In-sequence delivery function (In-sequence delivery of upper layer packet data units (PDUs) at PDCP re-establishment procedure for RLC acknowledged mode (AM))
   Reordering function (For split bearers in DC (only support for RLC AM): PDCP PDU routing for transmission and PDCP PDU reordering for reception)
   Duplicate detection function (Duplicate detection of lower layer service data units (SDUs) at PDCP re-establishment procedure for RLC AM)
   Retransmission function (Retransmission of PDCP SDUs at handover and, for split bearers in DC, of PDCP PDUs at PDCP data-recovery procedure, for RLC AM)
   Ciphering and deciphering function
   Timer-based SDU discard function (Timer-based SDU discard in uplink.)

The RLCs 1b-10 and 1b-35 perform an automatic repeat request (ARQ) operation by reconfiguring a PDCP PDU to an appropriate size. The main functions of the RLC are summarized as follows.

Data transfer function (Transfer of upper layer PDUs)
   ARQ function (Error correction through ARQ (only for AM data transfer))
   Concatenation, segmentation, and reassembly function (Concatenation, segmentation and reassembly of RLC SDUs (only for UM and AM data transfer))
   Re-segmentation function (Re-segmentation of RLC data PDUs (only for AM data transfer))
   Reordering function (Reordering of RLC data PDUs (only for UM and AM data transfer))
   Duplicate detection function (Duplicate detection (only for UM and AM data transfer))
   Error detection function (Protocol error detection (only for AM data transfer))
   RLC SDU discard function (RLC SDU discard (only for UM and AM data transfer))
   RLC re-establishment function The MACs 1b-15 and 1b-30 may be connected to RLC layers configured in one UE, and perform an operation of multiplexing RLC PDUs to MAC PDUs and demultiplexing RLC PDUs from MAC PDUs. The main functions of the MAC are summarized as follows.

Mapping function (Mapping between logical channels and transport channels)
   Multiplexing/demultiplexing function (Multiplexing/demultiplexing of MAC SDUs belonging to one or different logical channels into/from transport blocks (TB) delivered to/from the physical layer on transport channels)
   Scheduling information reporting function
   HARQ function (Error correction through HARQ)
   Function of handling priority between logical channels (Priority handling between logical channels of one UE)
   Function of handling priority between UEs (Priority handling between UEs by means of dynamic scheduling)
   MBMS service identification function
   Transport format selection function
   Padding function The PHY layers 1b-20 and 1b-25 perform an operation of channel-coding and modulating upper layer data, making the channel-coded and modulated upper layer data into OFDM symbols, and transmitting the OFDM symbols over a radio channel, or demodulating OFDM symbols received through a radio channel, channel-decoding the demodulated OFDM symbols, and transmitting the channel-decoded OFDM symbols to the upper layer.

Figure 1C:
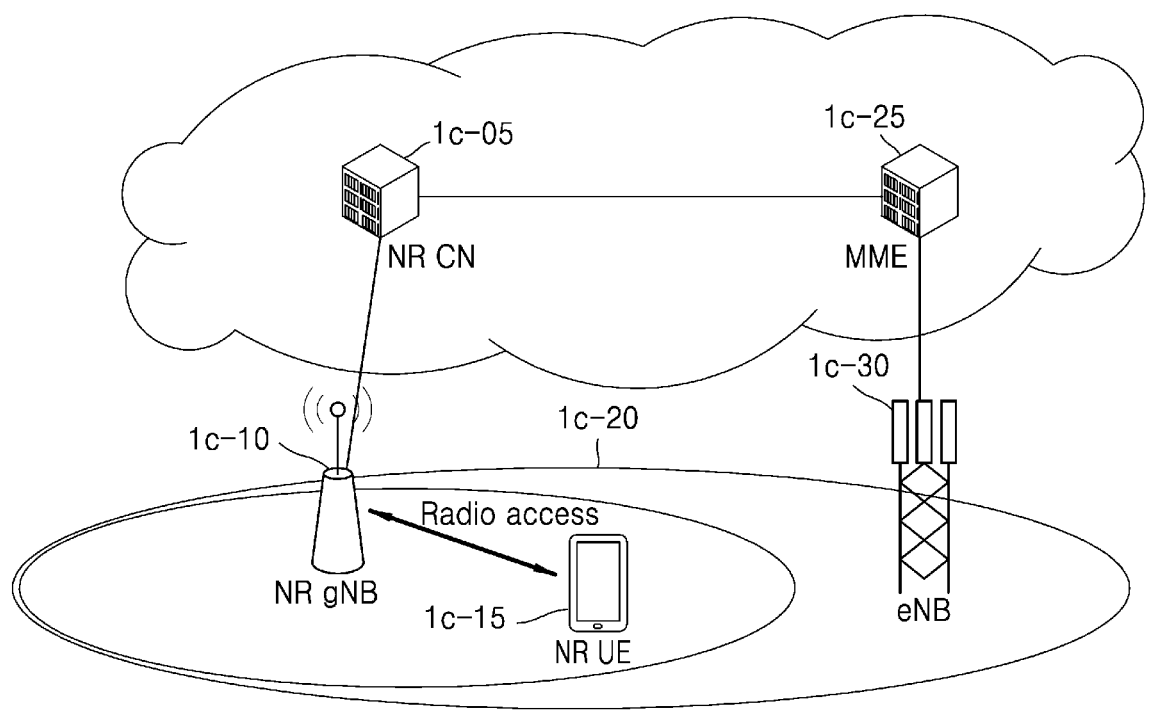
FIG. 1C is a diagram illustrating an architecture of a next-generation mobile communication system to which the present disclosure is applicable.

FIG. 1C is a diagram illustrating an architecture of a next-generation mobile communication system to which the present disclosure is applicable.

Referring to FIG. 1C, a radio access network of the next-generation mobile communication system (hereinafter referred to as NR or 5G) includes a next-generation base station (new radio Node B, hereinafter referred to as an NR gNB or an NR base station) 1c-10 and an NR core network (CN) 1c-05. An NR UE (or a terminal) 1c-15 may access an external network through the NR gNB 1c-10 and the NR CN 1c-05.

In FIG. 1C, the NR gNB 1c-10 corresponds to an eNB of an existing LTE system. The NR gNB 1c-10 may be connected to the NR UE 1c-15 through a radio channel and may provide a service superior to that of the existing Node B. In the next-generation mobile communication system, all user traffics are serviced through a shared channel. Therefore, an apparatus for collecting and scheduling status information such as buffer status, available transmission power status, and channel status of UEs is required. This may be handled by the NR gNB 1c-10. One NR gNB 1c-10 typically controls a plurality of cells. The next-generation mobile communication system may have more than the existing maximum bandwidth so as to implement ultra-high-speed data transmission, compared to the existing LTE, and may additionally use a beamforming technology by using OFDM as a radio access technology. Also, a modulation scheme and an AMC scheme that determines a channel coding rate are applied according to the channel status of the UE. The NR CN 1c-05 performs functions such as mobility support, bearer configuration, and quality of service (QoS) configuration. The NR CN is an entity that is responsible for various control functions as well as a mobility management function for the UE, and may be connected to a plurality of base stations. Also, the next-generation mobile communication system may interoperate with the existing LTE system, and the NR CN is connected to an MME 1c-25 through a network interface. The MME is connected to the eNB 1c-30, which is the existing base station.

Figure 1D:
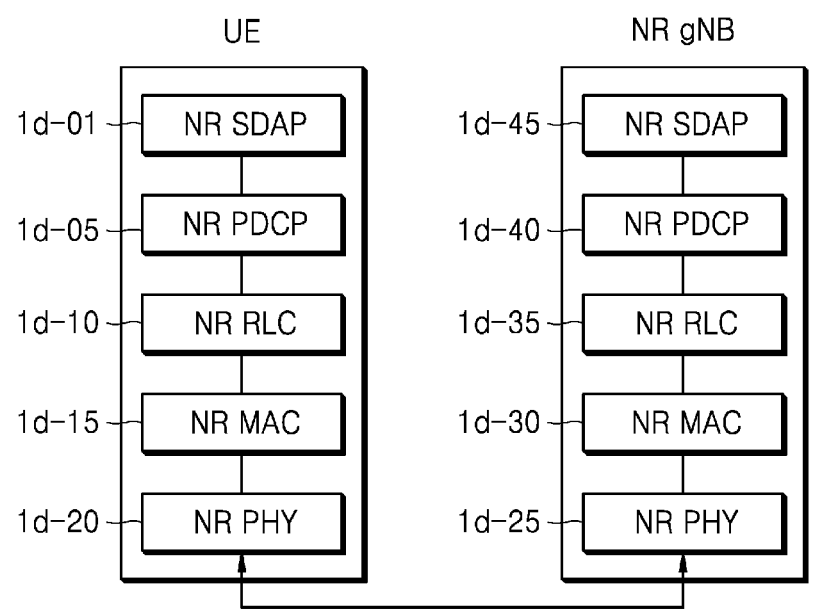
FIG. 1D is a diagram illustrating a radio protocol architecture of a next-generation mobile communication system to which the present disclosure is applicable.

FIG. 1D is a diagram illustrating a radio protocol architecture of a next-generation mobile communication system to which the present disclosure is applicable.

Referring to FIG. 1D, in the radio protocol of the next-generation mobile communication system, a UE and an NR gNB respectively include NR service data adaptation protocols (SDAPs) 1d-01 and 1d-45, NR PDCPs 1d-05 and 1d-40, NR RLCs 1d-10 and 1d-35, and NR MACs 1d-15 and 1d-30.

The main functions of the NR SDAPs 1d-01 and 1d-45 may include some of the following functions.
  User plane data transfer function
  Function of mapping between QoS flow and data radio bearer (DRB) for uplink and downlink
  Function of marking QoS flow ID in both DL and UL packets
  Function of mapping reflective QoS flow to DRB for UL SDAP PDUs In regard to the SDAP layers, the UE may receive an RRC message to configure whether to use the header of the SDAP layer or whether to use the function of the SDAP layer for each PDCP layer, each bearer, or each logical channel. When the SDAP header is configured, the UE may indicate, by using a 1-bit non-access stratum (NAS) reflective QoS indicator and a 1-bit access stratum (AS) reflective QoS indicator of the SDAP header, the UE to update or reconfigure mapping information between a QoS flow and a data bearer for UL and DL. The SDAP header may include QoS flow ID information indicating QoS. QoS information may be used as data processing priority, scheduling information, and the like for supporting efficient services.

The main functions of the NR PDCPs 1d-05 and 1d-40 may include some of the following functions.
  Header compression and decompression function (Header compression and decompression: ROHC only)
  User data transfer function (Transfer of user data)
  In-sequence delivery function (In-sequence delivery of upper layer PDUs)
  Out-of-sequence delivery function (Out-of-sequence delivery of upper layer PDUs)
  Reordering function (PDCP PDU reordering for reception)
  Duplicate detection function (Duplicate detection of lower layer SDUs)
  Retransmission function (Retransmission of PDCP SDUs)
  Ciphering and deciphering function (Ciphering and deciphering)
  Timer-based SDU discard function (Timer-based SDU discard in uplink.)

The reordering function of the NR PDCP layers may refer to a function of reordering PDCP PDUs received from the lower layer in sequence based on a PDCP sequence number (SN). The reordering function of the NR PDCP layers may include at least one of a function of transmitting data to the upper layer in reordered order, a function of immediately transmitting data without considering the order, a function of reordering PDCP PDUs and recording lost PDCP PDUs, a function of reporting the status of the lost PDCP PDUs to a sender, or a function of requesting retransmission of the lost PDCP PDUs.

The main functions of the NR RLCs 1d-10 and 1d-35 may include some of the following functions.
  Data transfer function (Transfer of upper layer PDUs)
  In-sequence delivery function (In-sequence delivery of upper layer PDUs)
  Out-of-sequence delivery function (Out-of-sequence delivery of upper layer PDUs)
  ARQ function (Error correction through ARQ)
  Concatenation, segmentation, and reassembly function (Concatenation, segmentation and reassembly of RLC SDUs)
  Re-segmentation function (Re-segmentation of RLC data PDUs)
  Reordering function (Reordering of RLC data PDUs)
  Duplicate detection function
  Error detection function (Protocol error detection)
  RLC SDU discard function
  RLC re-establishment function The in-sequence delivery function of the NR RLC layers may refer to a function of transmitting RLC SDUs received from the lower layer to the upper layer in sequence. The in-sequence delivery function of the NR RLC layers may include a function of, when one RLC SDU is received after being segmented into a plurality of RLC SDUs, reassembling and transmitting the segmented and received RLC SDUs, a function of reordering the received RLC PDUs based on an RLC SN or a PDCP SN, a function of reordering the RLC PDUs and recording the lost RLC PDUs, a function of reporting the status of the lost RLC PDUs to the sender, a function of requesting retransmission of the lost RLC PDUs, a function of, when there is the lost RLC SDU, transmitting only RLC SDUs up to before the lost RLC SDU to the upper layer in sequence, a function of, when there is the lost RLC SDU but a certain timer has expired, transmitting all RLC SDUs received before the start of the timer to the upper layer in sequence, or a function of, when there is the lost RLC SDU and a certain timer has expired, transmitting all RLC SDUs received so far to the upper layer in sequence. Also, the NR RLC layer may process RLC PDUs in the order of reception (in the order of arrival regardless of the order of serial number and sequence number) and transmit the processed RLC PDUs to the PDCP layer regardless of the order (out-of sequence delivery). When the received RLC PDUs are segments, segments stored in a buffer or to be received in the future may be received, reconfigured into one complete RLC PDU, and processed and transmitted to the PDCP layer. The NR RLC layer may not include the concatenation function, and the concatenation function may be performed by the NR MAC layer, or may be replaced with the multiplexing function of the NR MAC layer.

The out-of-sequence delivery function of the NR RLC layer may refer to a function of transmitting RLC SDUs received from the lower layer directly to the upper layer regardless of the order, and may include a function of, when one RLC SDU is received after being segmented into a plurality of RLC SDUs, reassembling and transmitting the segmented and received RLC SDUs, or a function of storing the RLC SN or PDCP SN of the received RLC PDUs, reordering the RLC PDUs, and recording the lost RLC PDUs.

The NR MACs 1d-15 and 1d-30 may be connected to a plurality of NR RLC layers configured in one UE, and the main functions of the NR MACs may include some of the following functions.

Mapping function (Mapping between logical channels and transport channels)
Multiplexing and demultiplexing function (Multiplexing/demultiplexing of MAC SDUs)
Scheduling information reporting function
HARQ function (Error correction through HARQ)
Function of handling priority between logical channels (Priority handling between logical channels of one UE)
Function of handling priority between UEs (Priority handling between UEs by means of dynamic scheduling)
MBMS service identification function
Transport format selection function
Padding function The NR PHY layers 1d-20 and 1d-25 may perform an operation of channel-coding and modulating upper layer data, making the channel-coded and modulated upper layer data into OFDM symbols, and transmitting the OFDM symbols over a radio channel, or demodulating and channel-decoding OFDM symbols received through a radio channel and transmitting the channel-decoded OFDM symbols to the upper layer.

Figure 1E:
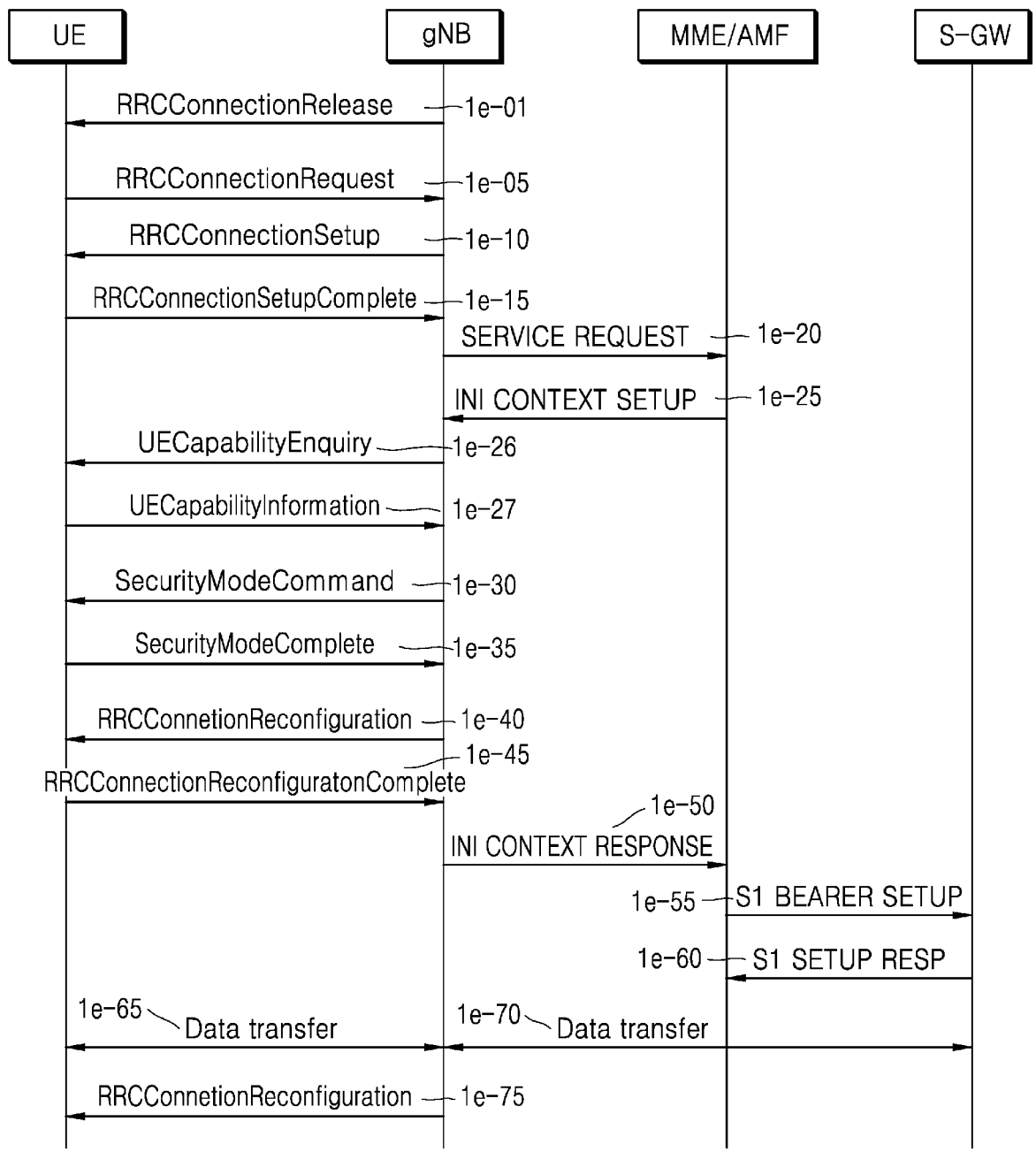
FIG. 1E is a diagram for describing a procedure in which a user equipment switches from a radio resource control (RRC) idle mode to an RRC connected mode and establishes a connection with a network, according to an embodiment of the present disclosure.

FIG. 1E is a diagram for describing a procedure in which a UE switches from an RRC idle mode to an RRC connected mode and establishes a connection with a network in the present disclosure.

In FIG. 1E, when the UE that transmits or receives data in the RRC connected mode does not transmit or receive data for a certain reason or for a certain time, a gNB may transmit an RRCConnectionRelease message to the UE to switch the UE to the RRC idle mode (1e-01). When data to be transmitted is generated, the UE in which the connection is not currently established (hereinafter, an idle mode UE) performs an RRC connection establishment process with the gNB. The UE establishes reverse transmission synchronization with the gNB through a random access process and transmits an RRCConnectionRequest message to the gNB (1e-05). The RRCConnectionRequest message contains a UE identifier and a connection establishment cause (establishmentCause). The gNB transmits an RRCConnectionSetup message so that the UE establishes an RRC connection (1e-10).

The RRCConnectionSetup message includes configuration information for each service/bearer/RLC layer, each logical channel, or each bearer. Whether to use ROHC for each bearer/logical channel, ROHC configuration information (for example, ROHC version, initial information, etc.), statusReportRequired information (information in which the gNB indicates a PDCP status report to the UE), drb-ContinueROHC information (configuration information to maintain ROHC configuration information and use ROHC configuration information as it is) may be transmitted by being included in a PDCP layer configuration information (pdcp-config). Also, the RRCConnectionSetup message contains RRC connection setup information and the like. The bearer for RRC connection is also referred to as a signaling radio bearer (SRB), and is used to transmit or receive an RRC message, which is a control message between the UE and the gNB.

The UE that has established the RRC connection transmits an RRCConnetionSetupComplete message to the gNB (1e-15). The RRCConnetionSetupComplete message includes a SERVICE REQUEST control message in which the UE requests the MME to configure a bearer for a certain service. The gNB transmits the SERVICE REQUEST message contained in the RRCConnetionSetupComplete message to the MME or the AMF (1e-20), and the MME or the AMF determines whether to provide the service requested by the UE. As a result of the determining, when the UE determines to provide the requested service, the MME or the AMF transmits an INITIAL CONTEXT SETUP REQUEST message to the gNB (1e-25). The INITIAL CONTEXT SETUP REQUEST message includes QoS information to be applied when the DRB is configured, security-related information (for example, security key, security algorithm, etc.) to be applied to the DRB, and the like.

Also, when the gNB does not receive UE capability information from the MME or the AMF, the gNB may transmit a UE capability information request message to the UE so as to identify the UE capability information (1e-26). When the UE receives the UE capability information request message, the UE may configure and generate a UE capability information message and report the UE capability information message to the gNB (1e-27). The UE capability information message may include what types of handover methods are supported by the UE. For example, the UE capability, that is, information about whether the UE supports or does not support the efficient handover method (dual active protocol stack (DAPS)) proposed in the present disclosure may be reported to the gNB through an indicator. When the gNB identifies the UE capability information, the gNB may define an indicator for each handover method and indicate to the UE which handover is indicated in a handover command message when indicating the UE to handover. For example, the gNB may indicate to the UE the efficient handover method (DAPS handover method) proposed in the present disclosure. As another method, the DAPS handover method may be configured for each bearer (DRB or SRB) of the UE. When the gNB configures the DAPS handover method in the UE, other handover methods are indicated together to prevent data loss or transmission delay that may occur during handover (examples of the other handover methods include a conditional handover method (a method in which a plurality of target cells are set and a plurality of conditions are set in the UE, wherein, when the above conditions are satisfied in a cell selection or reselection procedure, the UE performs a handover procedure to one target cell) or a handover method without a random access procedure). The UE may perform a handover procedure to the target base station according to the handover method indicated in the handover command message.

The gNB exchanges a SecurityModeCommand message (1e-30) and a SecurityModeComplete message (1e-35) so as to set security with the UE. When the security setting is completed, the gNB transmits an RRCConnectionReconfiguration message to the UE (1e-40).

The RRCConnectionReconfiguration message includes configuration information for each service/bearer/RLC layer, each logical channel, or each bearer. Whether to use ROHC for each bearer/logical channel, ROHC configuration information (for example, ROHC version, initial information, etc.), statusReportRequired information (information in which the gNB indicates a PDCP status report to the UE), drb-ContinueROHC information (configuration information to maintain ROHC configuration information and use ROHC configuration information as it is) may be transmitted by being included in a PDCP layer configuration information (pdcp-config). Also, the RRCConnectionReconfiguration message contains RRC connection setup information and the like. The bearer for RRC connection is also referred to as an SRB, and is used to transmit or receive an RRC message, which is a control message between the UE and the gNB.

Also, the RRCConnectionReconfiguration message includes configuration information of the DRB in which user data is to be processed, and the UE configures the DRB by applying the configuration information of the DRB and transmits an RRCConnectionReconfigurationComplete message to the gNB (1e-45). The gNB that has completed DRB configuration with the UE transmits an INITIAL CONTEXT SETUP COMPLETE message to the MME or the AMF (1e-50), and the MME or the AMF that has received the INITIAL CONTEXT SETUP COMPLETE message exchanges an S1 BEARER SETUP message and an S1 BEARER SETUP RESPONSE message to set an S1 bearer with the S-GW (1e-55, 1e-60). The S1 bearer is a data transmission connection established between the S-GW and the gNB, and corresponds to the DRB one-to-one. When all the above processes are completed, the UE transmits or receives data through the gNB and the S-GW (1e-65, 1e-70). As such, the general data transmission process includes three steps: RRC connection configuration, security configuration, and DRB configuration. Also, the gNB may transmit an RRC connection reconfiguration message to reconfigure, add, or change the configuration of the UE for a certain reason (1e-75).

In the present disclosure, the bearer may include an SRB and a DRB. The SRB refers to a signaling radio bearer, and the DRB refers to a data radio bearer. The SRB is mainly used to transmit and receive the RRC message of the RRC layer, and the DRB is mainly used to transmit and receive user layer data. A UM DRB refers to a DRB using an RLC layer operating in an unacknowledged mode (UM) mode, and an AM DRB refers to a DRB using an RLC layer operating in an acknowledged mode (AM) mode.

In the present disclosure, the bearer for which the DAPS handover method is configured may refer to or indicate at least one of a bearer in which a bearer identifier is included in a list of bearers for which the DAPS handover method is configured or is not included in a list of bearers for which the DAPS handover method is not configured, a bearer in which a DAPS handover method configuration indicator is included in bearer-specific configuration information, or a bearer for which the DAPS handover method configuration indicator is configured in PDCP layer configuration information.

In the present disclosure, the bearer for which the DAPS handover method is not configured may refer to or indicate at least one of a bearer in which a bearer identifier is not included in a list of bearers for which the DAPS handover method is configured or is included in a list of bearers for which the DAPS handover method is not configured, a bearer in which a DAPS handover method configuration indicator is not included in bearer-specific configuration information, or a bearer for which the DAPS handover method configuration indicator is not configured in PDCP layer configuration information.

In the present disclosure, the source base station may be interpreted as a source cell (Pcell, Spcell, or SCell) or a source cell group (a cell group or a master cell group), and the target base station may be interpreted as a target cell (Pcell, Spcell, or SCell) or a target cell group (a cell group or a master cell group).

Figure 1F:
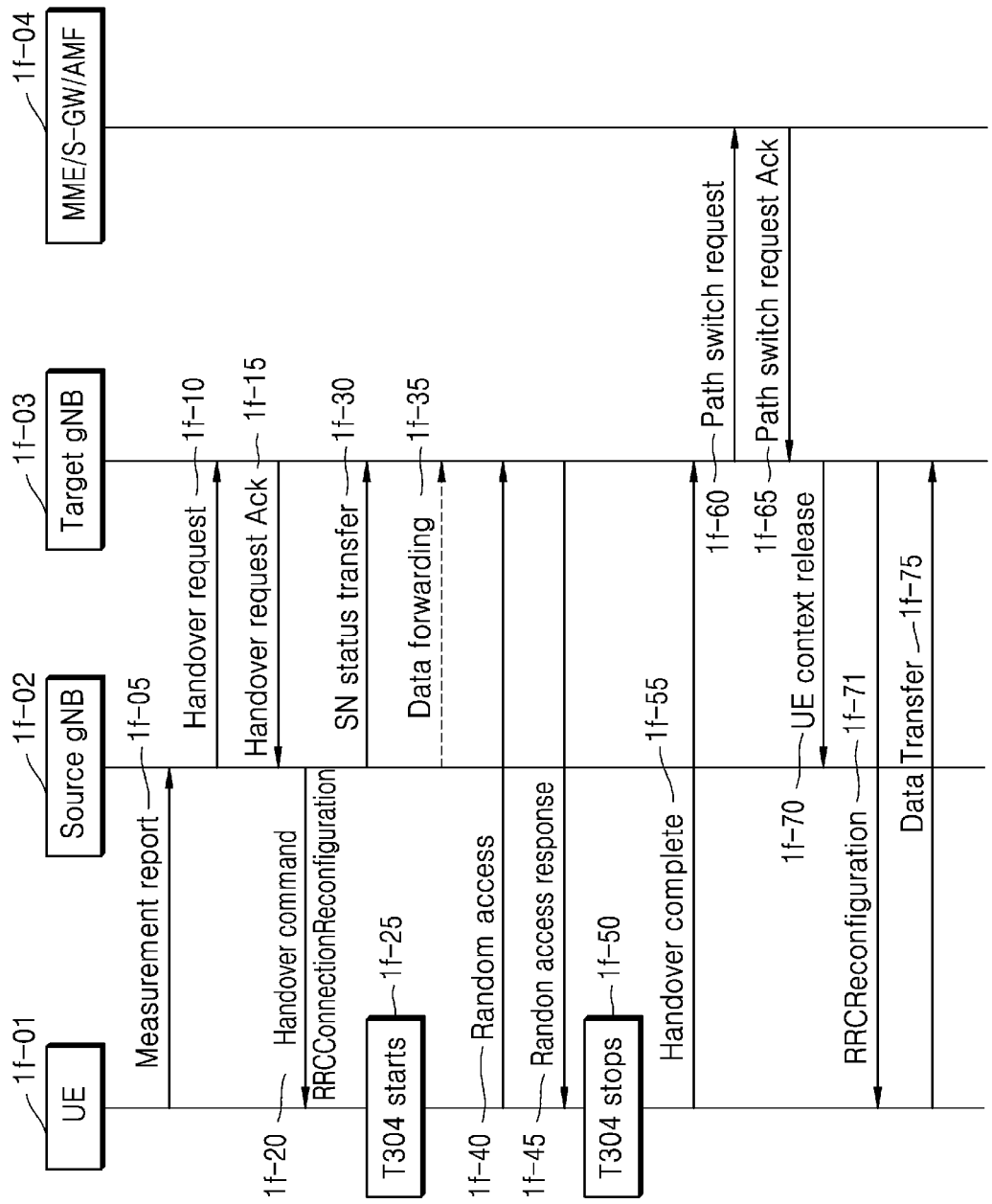
FIG. 1F is a diagram illustrating signaling procedures for performing handover proposed in the present disclosure in a next-generation mobile communication system.

FIG. 1F is a diagram illustrating signaling procedures for performing handover proposed in the present disclosure in a next-generation mobile communication system.

A UE 1f-01 in an RRC connected mode reports cell measurement information (Measurement Report) to a current source gNB (source eNB) 1f-02 when a periodic or specific event is satisfied (1f-05). The source gNB 1f-02 determines whether the UE 1f-01 performs handover to an adjacent cell, based on the measurement information. The handover is a technique for changing the source gNB 1f-02, which provides a service to the UE 1f-01 in a connected mode state, to another gNB (or another cell of the same gNB). When the source gNB 1f-02 determines handover, the source gNB 1f-02 requests handover by transmitting a handover (HO) request message (for example, a handover preparation information message) to a new gNB that will provide a service to the UE 1f-01, that is, a target gNB 1f-03 (1f-10). When the target gNB 1f-03 accepts the handover request, the target gNB 1f-03 transmits an HO request ACK message (for example, a handover command message) to the source gNB 1f-02 (1f-15). The source gNB 1f-02 that has received the message transmits, to the UE 1f-01, a handover command message (an RRCReconfiguration message included in a dedicated control channel (DCCH) of the HO request ACK message or the HO command message) (1f-20). The source gNB 1f-02 extracts the HO command message from the message received from the target gNB 1f-03 and transmits the extracted HO command message to the UE 1f-01 by using an RRC connection reconfiguration message (1f-20).

The present disclosure proposes a method of determining an efficient DAPS handover method proposed in the present disclosure by using two messages (the handover preparation information message 1f-10 and the handover command message 1f-15) when the source gNB 1f-02 transmits the handover preparation information message 1f-10 and, in response thereto, the target gNB 1f-03 transmits the handover command message 1f-15 to the source gNB 1f-02.

A first embodiment of determining the efficient DAPS handover method proposed in the present disclosure is as follows.

In the first embodiment, a subject that determines the DAPS handover method may be the source gNB 1f-02. Also, in the first embodiment of the present disclosure, when the source gNB 1f-02 requests the DAPS handover method from the target gNB 1f-03, the target gNB 1f-03 may always indicate or perform the DAPS handover method.

The source gNB 1f-02 may define a new indicator in the handover preparation information message, may indicate the target gNB 1f-03 that the source gNB 1f-02 will perform the DAPS handover method proposed in the present disclosure, and may request the DAPS handover method. The handover preparation information message may include current bearer configuration information, security key information of the UE 1f-01, cell group configuration information, or capability information of the UE 1f-01. The source gNB 1f-02 may know in advance whether the target gNB 1f-03 supports the DAPS handover method by sharing the capabilities of the target gNB 1f-03 in an implementation manner. The source gNB 1f-02 may indicate the target gNB 1f-03 to perform the DAPS handover method, may notify the target gNB 1f-03 that the source gNB 1f-02 may perform quick or early data forwarding, and may indicate the target gNB 1f-03 to prepare to receive and process quick or early data forwarding. The source gNB 1f-02 may request the DAPS handover method for each bearer (DRB or SRB).

When the target gNB 1f-03 receives the handover preparation information message and identifies that the indicator for requesting the DAPS handover method is included, the target gNB 1f-03 may configure an RRCReconfiguration message including an indicator indicating the DAPS handover method when configuring the RRCReconfiguration message to indicate handover to the UE 1f-01, and including bearer configuration information, security key information, cell group configuration information, or system information required when the UE 1f-01 performs the DAPS handover method. The target gNB 1f-03 may transmit the configured RRCReconfiguration message to the source gNB 1f-02 by including the configured RRCReconfiguration message in the DL-DCCH message of the handover command message. The target gNB 1f-03 may indicate the DAPS handover method for each bearer (DRB or SRB).

When the source gNB 1f-02 receives the handover command message, the source gNB 1f-02 may extract the RRCReconfiguration message included in the handover command message and indicate handover by transmitting the RRCReconfiguration message to the UE 1f-01. The source gNB 1f-02 may identify the indicated DAPS handover method for each bearer and perform the DAPS handover method for each bearer (DRB or SRB).

A second embodiment of determining the efficient DAPS handover method proposed by the present disclosure is as follows.

In the second embodiment of the present disclosure, a subject that determines the DAPS handover method may be the target gNB 1f-03. Also, in the second embodiment of the present disclosure, when the source gNB 1f-02 requests the DAPS handover method to the target gNB 1f-03 by using the indicator, the target gNB 1f-03 may reject or accept the request or indicate the source gNB 1f-02 by indicating another handover method in the handover command message.

The source gNB 1f-02 may define a new indicator in the handover preparation information message, may indicate the target gNB 1f-03 that the source gNB 1f-02 will perform the DAPS handover method proposed in the present disclosure, and may request the DAPS handover method. The handover preparation information message may include current bearer configuration information, security key information of the UE 1f-01, cell group configuration information, or capability information of the UE 1f-01. The source gNB 1f-02 may know in advance whether the target gNB 1f-03 supports the DAPS handover method by sharing the capabilities of the target gNB 1f-03 in an implementation manner. The source gNB 1f-02 may indicate the target gNB 1f-03 to perform the DAPS handover method, may notify the target gNB 1f-03 that the source gNB 1f-02 may perform quick or early data forwarding, and may indicate the target gNB 1f-03 to prepare to receive and process quick or early data forwarding. The source gNB 1f-02 may request the DAPS handover method for each bearer (DRB or SRB).

When the target gNB 1f-03 receives the handover preparation information message and identifies that an indicator requesting the DAPS handover method is included, the target gNB 1f-03 may reject or accept the request for the DAPS handover of the source gNB 1f-02 or indicate another handover method to the source gNB 1f-02, according to whether the DAPS handover method is supported, the amount of current transmission resources, or scheduling. The target gNB 1f-03 may transmit an indicator that rejects or accepts the request for the DAPS handover or an indicator that indicates a different type of handover method by including the indicator in the handover command message. The target gNB 1f-03 may configure the RRCReconfiguration message to indicate handover to the UE 1f-01, wherein the RRCReconfiguration message includes the indicator indicating the DAPS handover method when the request for the DAPS handover is accepted, includes the indicator indicating another handover method when the request for the DAPS handover is rejected, and includes bearer configuration information, security key information, or cell group configuration information, or system information necessary when the UE 1f-01 performs the DAPS handover method or another handover method. Also, the target gNB 1f-03 may transmit the configured RRCReconfiguration message to the source gNB 1f-02 by including the configured RRCReconfiguration message in the DL-DCCH message of the handover command message. The target gNB 1f-03 may indicate the DAPS handover method for each bearer (DRB or SRB).

When the source gNB 1f-02 receives the handover command message, the source gNB 1f-02 may identify whether the request for the DAPS handover method is accepted or rejected by identifying the indicator included in the handover command message. When the request for the DAPS handover method is accepted, the source gNB 1f-02 may perform the DAPS handover method, may extract the RRCReconfiguration message included in the handover command message, and may indicate handover by transmitting the RRCReconfiguration message to the UE 1f-01. When the indicator included in the handover command message is identified and the request for the DAPS handover method is rejected, or when another handover method is indicated, the source gNB 1f-02 may perform another handover method indicated by the target gNB 1f-03. Also, the source gNB 1f-02 may extract the RRCReconfiguration message included in the handover command message and indicate handover by transmitting the RRCReconfiguration message to the UE 1f-01. As another method, even when there is no separate indicator in the handover command message, the source gNB 1f-02 may read the RRCReconfiguration message included in the handover command message, may identify which handover method is indicated by the target gNB 1f-03, and may identify whether the request for the DAPS handover method is accepted or rejected. The source gNB 1f-02 may perform the handover method indicated in the RRCReconfiguration message (for example, the DAPS handover method or another handover method). The source gNB 1f-02 may identify the indicated DAPS handover method for each bearer and perform the DAPS handover method for each bearer (DRB or SRB).

A third embodiment of determining the efficient DAPS handover method proposed by the present disclosure is as follows.

In the third embodiment of the present disclosure, a subject that determines the DAPS handover method may be the target gNB. Also, in the third embodiment of the present disclosure, the target gNB 1f-03 may identify the capability of the UE 1f-01, and may determine the handover method (for example, the DAPS handover method) according to whether the target gNB 1f-03 is able to support the DAPS handover method, the amount of current transmission resources, or scheduling.

The source gNB 1/-02 may transmit a message for requesting handover to the target gNB 1/-03 by including current bearer configuration information of the UE 1/-01, security key information, cell group configuration information, or capability information of the UE 1/-01 in the handover preparation information message. The source gNB 1/-02 may know in advance whether the target gNB 1/-03 supports the DAPS handover method by sharing the capabilities of the target gNB 1/-03 in an implementation manner. When the target gNB 1/-03 indicates to perform the DAPS handover method, the source gNB 1/-02 may perform quick or early data forwarding.

The target gNB 1/-03 may receive the handover preparation information message, and may determine the handover method (for example, the DAPS handover method) according to the capability information of the UE 1/-01, whether the target gNB 1/-03 is able to support the DAPS handover method, the amount of current transmission resources, or scheduling. When the target gNB 1/-03 determines the DAPS handover method, the target gNB 1/-03 may transmit the handover command message by including the indicator indicating the DAPS handover method in the handover command message. The target gNB 1/-03 may configure the RRCReconfiguration message to indicate handover to the UE 1/-01, wherein the RRCReconfiguration message includes the indicator indicating the DAPS handover method when the DAPS handover is determined, includes the indicator indicating another handover method when handover methods other than the DAPS handover are determined, and includes bearer configuration information, security key information, or cell group configuration information, or system information necessary when the UE 1/-01 performs the DAPS handover method or another handover method. The target gNB 1/-03 may transmit the configured RRCReconfiguration message to the source gNB 1/-02 by including the configured RRCReconfiguration message in the DL-DCCH message of the handover command message. The target gNB 1/-03 may indicate the DAPS handover method for each bearer (DRB or SRB).

When the source gNB 1/-02 receives the handover command message, the source gNB 1/-02 may identify whether the DAPS handover is determined by identifying the indicator included in the handover command message. When the DAPS handover method is indicated, the source gNB 1/-02 may perform the DAPS handover method, may extract the RRCReconfiguration message included in the handover command message, and may indicate handover by transmitting the RRCReconfiguration message to the UE 1/-01. When the indicator included in the handover command message is identified and the DAPS handover method is not determined, or when another handover method is indicated, the source gNB 1/-02 may perform another handover method indicated by the target gNB 1/-03. Also, the source gNB 1/-02 may extract the RRCReconfiguration message included in the handover command message and indicate handover by transmitting the RRCReconfiguration message to the UE 1/-01. As another method, even when there is no separate indicator in the handover command message, the source gNB 1/-02 may read the RRCReconfiguration message included in the handover command message, may identify which handover method is indicated by the target gNB 1/-03, may identify whether the DAPS handover method is determined, and when another handover method is indicated, may perform the indicated handover method. The source gNB 1/-02 may identify the indicated DAPS handover method for each bearer and perform the DAPS handover method for each bearer (DRB or SRB).

A new embodiment may be extended by combining the methods of the first embodiment, the second embodiment, or the third embodiment of determining the efficient DAPS handover method proposed in the present disclosure.

According to an embodiment, in the RRCReconfiguration message, the gNB may indicate to the UE 1/-01 the efficient handover method (DAPS handover method) proposed in the present disclosure. As another method, the gNB may set the DAPS handover method for each bearer (DRB or SRB) of the UE 1/-01. For example, in the RRC message, a new indicator indicating an efficient handover method (DAPS handover method) may be defined in bearer configuration information, PDCP configuration information, or RLC configuration information for each bearer identifier or each logical channel identifier, and the gNB may indicate the efficient handover method to the UE 1/-01 for each bearer or each logical channel identifier by using the indicator. When the gNB configures the DAPS handover method in the UE, other handover methods are indicated together to prevent data loss or transmission delay that may occur during handover (examples of the other handover methods include a conditional handover method (a method in which a plurality of target cells are set and a plurality of conditions are set in the UE 1/-01, wherein, when the above conditions are satisfied in a cell selection or reselection procedure, the UE 1/-01 performs a handover procedure to one target cell) or a handover method without a random access procedure).

Upon receiving the RRCReconfiguration message, the UE 1/-01 stops or continues to perform data transmission and reception with the source gNB 1/-02 according to the set handover method, and starts a T304 timer. When the UE 1/-01 does not succeed in handover to the target gNB 1/-03 for a certain time (for example, when the T304 timer expires), T304 returns to the original setting of the UE 1/-01 and switches the UE 1/-01 to an RRC idle state. Also, the UE 1/-01 may trigger the RRC connection re-establishment procedure. When the efficient handover method is configured and the connection with the source gNB 1/-02 is valid, the UE 1/-01 may perform fallback and report a handover failure to the source gNB 1/-02, and may reconfigure the connection. The source gNB 1/-02 transmits a sequence number (SN) status for uplink/downlink data for each bearer (for example, each RLC UM bearer or each RLC AM bearer). When there is downlink or uplink data, the source gNB 1/-02 transmits the downlink or uplink data to the target gNB 1/-03 (1/-30, 1/-35). The UE 1/-01 attempts random access to the target cell indicated by the source gNB 1/-02 (1/-40). The random access is for notifying the target cell that the UE 1/-01 moves through handover and matching uplink synchronization. For the random access, the UE 1/-01 transmits, to the target cell, a preamble ID provided from the source gNB 1/-02 or a preamble corresponding to a randomly selected preamble ID. After a specific number of subframes have passed from the transmission of the preamble, the UE 1/-01 monitors whether a random access response (RAR) message is transmitted from the target cell. A time interval for monitoring the RAR message is referred to as a RAR window. When the RAR is received during the monitoring time interval (1/-45), the UE 1/-01 transmits an HO complete message to the target gNB 1/-03 as an RRC reconfiguration complete message (1/-55). As described above, when the UE 1/-01 successfully receives the RAR from the target gNB 1/-03, the UE 1/-01 stops the T304 timer (1/-50).

The target gNB 1/-03 requests the core network 1/-04 (that is, MME/S-GW/AMF) to modify the paths of the bearers so as to modify the paths of the bearers set as the source gNB 1/-02 (1/-60, 1/-65), and notifies the source gNB 1/-02 to delete the UE context of the UE 1/-01 (1/-70). The target gNB 1/-03 may transmit an RRC message (for example, an RRCReconfiguration message) 1/-71 to the UE 1/-01 so as to indicate the release of the connection with the source gNB 1/-02 by using an indicator. According to another method, the target gNB 1/-03 may transmit MAC control information, RLC control information, or PDCP control information to the UE 1/-01 so as to indicate the release of the connection with the source gNB 1/-02. The UE 1/-01 attempts to receive data from the start time point of the RAR window with respect to the target gNB 1/-03. After receiving the RAR, the UE 1/-01 transmits an RRC reconfiguration complete message to the target gNB 1/-03, receives a downlink transmission resource or an uplink transmission resource, and starts data transmission and reception with the target gNB 1/-03.

According to an embodiment, methods applicable when the gNB configures or indicates the second embodiment (DAPS handover method) proposed in the present disclosure to the UE 1/-01 by using the handover command message or the RRC message (for example, RRCReconfiguration message) are as follows. In the present disclosure, when the gNB configures the DAPS handover method in the UE 1/-01, or when the UE 1/-01 receives, from the gNB, the handover command message that configures the DAPS handover method, a method applied by applying one or more of the following methods may be performed.

Method 1-1: When attempting to indicate or configure handover to the UE 1/-01, the gNB (the source gNB 1/-02, the target gNB 1/-03, the LTE base station, or the NR base station) may include mobility Control Info or Reconfiguration With Sync configuration information in the RRCReconfiguration message. The gNB may define an indicator in SRB-ToAddMod or DRB-ToAddMod of SRB-ToAddModList or DRB-ToAddModList in the bearer configuration information (Radio Resource Config Dedicated or Radio Bearer Config) of the RRCReconfiguration message, and may indicate the DAPS handover method for each bearer (each SRB or DRB) through the defined indicator. Also, the gNB may define an indicator in pdcp-config of SRB-ToAddMod or DRB-ToAddMod and indicate the DAPS handover method for each bearer. Also, in the case of the LTE, when the LTE base station indicates or configures handover in the UE 1/-01 with the LTE RRCReconfiguration message, pdcp-config is not defined in SRB-ToAddMod and the use of default PDCP layer configuration is set. Therefore, the LTE base station may define the indicator in SRB-ToAddMod for the SRB, may configure the DAPS handover method for each bearer, may define the indicator in pdcp-config of DRB-ToAddMod for the DRBs, and may configure the DAPS handover method for each bearer. The UE 1/-01 may perform the DAPS handover method for the bearer for which the DAPS handover method is configured, for each bearer, according to the configuration indicated in the received handover command message (RRCReconfiguration message), and may perform a general handover method for the bearer for which the DAPS handover method is not configured. Also, when mobility Control Info or Reconfiguration With Sync configuration information of the handover command message includes an indicator indicating or configuring the type of the handover method for the UE 1/-01 (for example, MakeBeforeBreak handover, rach-skip handover, RACH-less handover, or conditional handover CHO) and the DAPS handover method is configured for each bearer, the UE 1/-01 may apply the DAPS handover method in preference to other types of handover methods when performing the handover procedure for each bearer. For example, the UE 1/-01 may perform the DAPS handover method for the bearer for which the DAPS handover method is configured, for each bearer, according to the configuration. For the bearer for which the DAPS handover method is not configured, the UE 1/-01 may perform the handover method configured according to the indicator indicating or configuring the type of the handover method for the UE 1/-01 (for example, MakeBeforeBreak handover, rach-skip handover, RACH-less handover, or conditional handover CHO) in mobility Control Info or Reconfiguration With Sync configuration information of the handover command message. Also, in order to reduce the complexity of implementing the UE 1/-01, when the DAPS handover method is configured in at least one bearer or a certain bearer, the type of other handover method for the UE 1/-01 (for example, MakeBeforeBreak handover, rach-skip handover, RACH-less handover, or conditional handover CHO) in mobility Control Info or Reconfiguration With Sync configuration information of the handover command message may be set not to be indicated or configured. Also, when the UE 1/-01 receives the handover command message (RRCReconfiguration message) and the DAPS handover method is configured for at least one bearer or a certain bearer for each bearer in the handover command message (RRCReconfiguration message), the RRC layer, SDAP layer, MAC layer, PHY layer, or SRB processing method of performing the DAPS handover method proposed in the present disclosure may be applied. For each bearer for which the DAPS handover method is configured, the PDCP layer or RLC layer processing method of performing the DAPS handover method proposed in the present disclosure may be applied.

Method 1-2: When attempting to indicate or configure handover to the UE 1/-01, the gNB (the source gNB 1/-02, the target gNB 1/-03, the LTE base station, or the NR base station) may include mobility Control Info or Reconfiguration With Sync configuration information in the RRCReconfiguration message. The base station may define an indicator in DRB-ToAddMod of DRB-ToAddModList in the bearer configuration information (Radio Resource Config Dedicated or Radio Bearer Config) of the RRCReconfiguration message, and may indicate the DAPS handover method for each bearer (DRB) through the defined indicator. For SRBs, a separate indicator for configuring the DAPS handover method may not be introduced. That is, when the DAPS handover method is configured in the UE 1/-01 for at least one bearer (DRB) or a certain bearer (DRB) for each bearer in the received handover command message (RRCReconfiguration message), the SRB processing method of performing the DAPS handover method proposed in the present disclosure may be applied. Also, the gNB may define an indicator in pdcp-config of DRB-ToAddMod and indicate the DAPS handover method for each bearer. The UE 1f-01 may perform the DAPS handover method for the bearer for which the DAPS handover method is configured, for each bearer, according to the configuration indicated in the received handover command message (RRCReconfiguration message), and may perform a general handover method for the bearer for which the DAPS handover method is not configured. Also, when mobility Control Info or Reconfiguration With Sync configuration information of the handover command message includes an indicator indicating or configuring the type of the handover method for the UE 1f-01 (for example, MakeBeforeBreak handover, rach-skip handover, RACH-less handover, or conditional handover CHO) and the DAPS handover method is configured for each bearer, the UE 1f-01 may apply the DAPS handover method in preference to other types of handover methods when performing the handover procedure for each bearer. For example, the UE 1f-01 may perform the DAPS handover method for the bearer for which the DAPS handover method is configured, for each bearer, according to the configuration. For the bearer for which the DAPS handover method is not configured, the UE 1f-01 may perform the handover method configured according to the indicator indicating or configuring the type of the handover method for the UE 1f-01 (for example, MakeBeforeBreak handover, rach-skip handover, RACH-less handover, or conditional handover CHO) in mobility Control Info or Reconfiguration With Sync configuration information of the handover command message. Also, in order to reduce the complexity of implementing the UE 1f-01, when the DAPS handover method is configured in at least one bearer or a certain bearer, the type of other handover method for the UE 1f-01 (for example, MakeBeforeBreak handover, rach-skip handover, RACH-less handover, or conditional handover CHO) in mobility Control Info or Reconfiguration With Sync configuration information of the handover command message may be set not to be indicated or configured. Also, when the UE 1f-01 receives the handover command message (RRCReconfiguration message) and the DAPS handover method is configured for at least one bearer or a certain bearer for each bearer in the handover command message (RRCReconfiguration message), the RRC layer, SDAP layer, MAC layer, PHY layer, or SRB processing method of performing the DAPS handover method proposed in the present disclosure may be applied. For each bearer for which the DAPS handover method is configured, the PDCP layer or RLC layer processing method of performing the DAPS handover method proposed in the present disclosure may be applied.

Method 2-1: When attempting to indicate or configure handover to the UE 1f-01, the gNB (the source gNB 1f-02, the target gNB 1f-03, the LTE base station, or the NR base station) may include mobility Control Info or Reconfiguration With Sync configuration information in the RRCReconfiguration message. The gNB may define and include an indicator indicating or configuring the DAPS handover method in mobility Control Info or Reconfiguration With Sync, and may use the indicator to indicate that the DAPS handover method is configured for at least one bearer or a certain bearer. Also, the gNB may define an indicator in SRB-ToAddMod or DRB-ToAddMod of SRB-ToAddModList or DRB-ToAddModList in the bearer configuration information (Radio Resource Config Dedicated or Radio Bearer Config) of the RRCReconfiguration message and may indicate the DAPS handover method for each bearer (each SRB or DRB). Also, the gNB may define an indicator in pdcp-config of SRB-ToAddMod or DRB-ToAddMod and indicate the DAPS handover method for each bearer. Also, in the case of the LTE, when the LTE base station indicates or configures handover in the UE 1f-01 with the LTE RRCReconfiguration message, pdcp-config is not defined in SRB-ToAddMod and the use of default PDCP layer configuration is set. Therefore, the LTE base station may define the indicator in SRB-ToAddMod for the SRB, may configure the DAPS handover method for each bearer, may define the indicator in pdcp-config of DRB-ToAddMod for the DRBs, and may configure the DAPS handover method for each bearer. The UE 1f-01 may perform the DAPS handover method for the bearer for which the DAPS handover method is configured, for each bearer, according to the configuration indicated in the received handover command message (RRCReconfiguration message), and may perform a general handover method for the bearer for which the DAPS handover method is not configured. Also, when mobility Control Info or Reconfiguration With Sync configuration information of the handover command message includes an indicator indicating or configuring the type of the handover method for the UE 1f-01 (for example, MakeBeforeBreak handover, rach-skip handover, RACH-less handover, or conditional handover CHO) and the DAPS handover method is configured for each bearer, the UE 1f-01 may apply the DAPS handover method in preference to other types of handover methods when performing the handover procedure for each bearer. For example, the UE 1f-01 may perform the DAPS handover method for the bearer for which the DAPS handover method is configured, for each bearer, according to the configuration. For the bearer for which the DAPS handover method is not configured, the UE 1f-01 may perform the handover method configured according to the indicator indicating or configuring the type of the handover method for the UE 1f-01 (for example, MakeBeforeBreak handover, rach-skip handover, RACH-less handover, or conditional handover CHO) in mobility Control Info or Reconfiguration With Sync configuration information of the handover command message. Also, in order to reduce the complexity of implementing the UE 1f-01, when the DAPS handover method is configured in at least one bearer or a certain bearer, the type of other handover method for the UE 1f-01 (for example, MakeBeforeBreak handover, rach-skip handover, RACH-less handover, or conditional handover CHO) in mobility Control Info or Reconfiguration With Sync configuration information of the handover command message may be set not to be indicated or configured. Also, when the UE 1f-01 receives the handover command message (RRCReconfiguration message) and the indicator indicating or configuring the DAPS handover method is included (or configured) in mobility Control Info or Reconfiguration With Sync in the handover command message (RRCReconfiguration message), the RRC layer, SDAP layer, MAC layer, PHY layer, or SRB processing method of performing the DAPS handover method proposed in the present disclosure may be applied. For each bearer for which the DAPS handover method is configured, the PDCP layer or RLC layer processing method of performing the DAPS handover method proposed in the present disclosure may be applied.

Method 2-2: When attempting to indicate or configure handover to the UE 1*f*-01, the gNB (the source gNB 1*f*-02, the target gNB 1*f*-03, the LTE base station, or the NR base station) may include mobility Control Info or Reconfiguration With Sync configuration information in the RRCReconfiguration message. The gNB may define and include an indicator indicating or configuring the DAPS handover method in mobility Control Info or Reconfiguration With Sync, and may use the indicator to indicate that the DAPS handover method is configured for at least one bearer or a certain bearer. Also, the gNB may define an indicator in DRB-ToAddMod of DRB-ToAddModList in the bearer configuration information (Radio Resource Config Dedicated or Radio Bearer Config) of the RRCReconfiguration message, and may indicate the DAPS handover method for each bearer (DRB). For SRBs, a separate indicator for configuring the DAPS handover method may not be introduced. That is, when the UE 1*f*-01 receives the handover command message (RRCReconfiguration message) and the DAPS handover method is configured for at least one bearer (DRB) or a certain bearer (DRB) for each bearer in the handover command message (RRCReconfiguration message), the SRB processing method of performing the DAPS handover method proposed in the present disclosure may be applied. Also, the gNB 1*f*-03 may define an indicator in pdcp-config of DRB-ToAddMod and indicate the DAPS handover method for each bearer. The UE 1*f*-01 may perform the DAPS handover method for the bearer for which the DAPS handover method is configured, for each bearer, according to the configuration indicated in the received handover command message (RRCReconfiguration message), and may perform a general handover method for the bearer for which the DAPS handover method is not configured. Also, when mobility Control Info or Reconfiguration With Sync configuration information of the handover command message includes an indicator indicating or configuring the type of the handover method for the UE 1*f*-01 (for example, MakeBeforeBreak handover, rach-skip handover, RACH-less handover, or conditional handover CHO) and the DAPS handover method is configured for each bearer, the UE 1*f*-01 may apply the DAPS handover method in preference to other types of handover methods when performing the handover procedure for each bearer. For example, the UE 1*f*-01 may perform the DAPS handover method for the bearer for which the DAPS handover method is configured, for each bearer, according to the configuration. For the bearer for which the DAPS handover method is not configured, the UE 1*f*-01 may perform the handover method configured according to the indicator indicating or configuring the type of the handover method for the UE 1*f*-01 (for example, MakeBeforeBreak handover, rach-skip handover, RACH-less handover, or conditional handover CHO) in mobility Control Info or Reconfiguration With Sync configuration information of the handover command message. Also, in order to reduce the complexity of implementing the UE 1*f*-01, when the DAPS handover method is configured in at least one bearer or a certain bearer, the type of other handover method for the UE 1*f*-01 (for example, MakeBeforeBreak handover, rach-skip handover, RACH-less handover, or conditional handover CHO) in mobility Control Info or Reconfiguration With Sync configuration information of the handover command message may be set not to be indicated or configured. Also, when the UE 1*f*-01 receives the handover command message (RRCReconfiguration message) and the indicator indicating or configuring the DAPS handover method is included (or configured) in mobility Control Info or Reconfiguration With Sync in the handover command message (RRCReconfiguration message), the RRC layer, SDAP layer, MAC layer, PHY layer, or SRB processing method of performing the DAPS handover method proposed in the present disclosure may be applied. For each bearer for which the DAPS handover method is configured, the PDCP layer or RLC layer processing method of performing the DAPS handover method proposed in the present disclosure may be applied.

Method 3-1: When attempting to indicate or configure handover to the UE 1*f*-01, the gNB (the source gNB 1*f*-02, the target gNB 1*f*-03, the LTE base station, or the NR base station) may include mobility Control Info or Reconfiguration With Sync configuration information in the RRCReconfiguration message. The gNB may define and include an indicator indicating or configuring the DAPS handover method in mobility Control Info or Reconfiguration With Sync, and may use the indicator to indicate that the DAPS handover method is configured for at least one bearer or a certain bearer. Also, the gNB may configure and include a list of bearers for which the DAPS handover method is configured in mobility Control Info or Reconfiguration With Sync, may include identifiers (SRB or DRB) of bearers for which the DAPS handover method is configured in the list of bearers, and may indicate whether to configure the DAPS handover method for each bearer. Also, the gNB may configure and include a list of bearers for which the DAPS handover method is not configured in mobility Control Info or Reconfiguration With Sync, may include identifiers (SRB or DRB) of bearers for which the DAPS handover method is not configured in the list of bearers, and may indicate whether to configure the DAPS handover method for each bearer. The UE 1*f*-01 may perform the DAPS handover method on the bearer for which the DAPS handover method is configured, the bearer whose identifier is included in the list of bearers for which the DAPS handover method is configured, or the bearer whose identifier is not included in the list of bearers for which the DAPS handover method is not configured, for each bearer according to the configuration indicated in the received handover command message (RRCReconfiguration message), and the UE 1*f*-01 may perform the general handover method on the bearer for which the DAPS handover method is not configured, the bearer whose identifier is not included in the list of bearers for which the DAPS handover method is configured, and the bearer whose identifier is included in the list of bearers for which the DAPS handover method is not configured. Also, when mobility Control Info or Reconfiguration With Sync configuration information of the handover command message includes an indicator indicating or configuring the type of the handover method for the UE 1*f*-01 (for example, MakeBeforeBreak handover, rach-skip handover, RACH-less handover, or conditional handover CHO) and the DAPS handover method is configured for each bearer, the UE 1*f*-01 may apply the DAPS handover method in preference to other types of handover methods when performing the handover procedure for each bearer. For example, the UE 1f-01 may perform the DAPS handover method on the bearer for which the DAPS handover method is configured, the bearer whose identifier is included in the list of bearers for which the DAPS handover method is configured, or the bearer whose identifier is not included in the list of bearers for which the DAPS handover method is not configured, for each bearer, according to the configuration. The UE 1f-01 may perform the handover method, which is set according to the indicator indicating or configuring the type of the handover method for the UE 1f-01 (for example, MakeBeforeBreak handover, rach-skip handover, RACH-less handover, or conditional handover CHO) in mobility Control Info or Reconfiguration With Sync configuration information of the handover command message, on the bearer for which the DAPS handover method is not configured, the bearer whose identifier is not included in the list of bearers for which the DAPS handover method is configured, or the bearer whose identifier is included in the list of bearers for which the DAPS handover method is not configured. Also, in order to reduce the complexity of implementing the UE 1f-01, when the DAPS handover method is configured in at least one bearer or a certain bearer, the type of other handover method for the UE 1f-01 (for example, MakeBeforeBreak handover, rach-skip handover, RACH-less handover, or conditional handover CHO) in mobility Control Info or Reconfiguration With Sync configuration information of the handover command message may be set not to be indicated or configured. Also, when the handover command message (RRCReconfiguration message) is received and the indicator indicating or configuring the DAPS handover method is included (or configured) in mobility Control Info or Reconfiguration With Sync of the handover command message (RRCReconfiguration message), the UE 1f-01 may apply the RRC layer, SDAP layer, MAC layer, PHY layer, or SRB processing method of performing the DAPS handover method proposed in the present disclosure. The UE 1f-01 may apply, for each bearer, the PDCP layer or RLC layer processing method of performing the DAPS handover method proposed in the present disclosure on the bearer for which the DAPS handover method is configured, the bearer whose identifier is included in the list of bearers for which the DAPS handover method is configure, or the bearer whose identifier is not included in the list of bearers for which the DAPS handover method is not configured.

Method 3-2: When attempting to indicate or configure handover to the UE 1f-01, the gNB (the source gNB 1f-02, the target gNB 1f-03, the LTE base station, or the NR base station) may include mobility Control Info or Reconfiguration With Sync configuration information in the RRCReconfiguration message. The gNB may define and include an indicator indicating or configuring the DAPS handover method in mobility Control Info or Reconfiguration With Sync, and may use the indicator to indicate that the DAPS handover method is configured for at least one bearer or a certain bearer. Also, the gNB may configure and include a list of bearers for which the DAPS handover method is configured in mobility Control Info or Reconfiguration With Sync, may include identifiers (SRB or DRB) of bearers for which the DAPS handover method is configured in the list of bearers, and may indicate whether to configure the DAPS handover method for each bearer. Also, the gNB may configure and include a list of bearers in which the DAPS handover method is not configured in mobility Control Info or Reconfiguration With Sync, may include identifiers (SRB or DRB) of bearers for which the DAPS handover method is not configured in the list of bearers, and may indicate whether to configure the DAPS handover method for each bearer. Also, a separate indicator for configuring the DAPS handover method may not be introduced for SRBs. That is, when the UE 1f-01 receives the handover command message (RRCReconfiguration message) and the DAPS handover method is configured for at least one bearer (DRB) or a certain bearer (DRB) for each bearer in the handover command message (RRCReconfiguration message), the SRB processing method of performing the DAPS handover method proposed in the present disclosure may be applied. The UE 1f-01 may perform the DAPS handover method on the bearer for which the DAPS handover method is configured, the bearer whose identifier is included in the list of bearers for which the DAPS handover method is configured, or the bearer whose identifier is not included in the list of bearers for which the DAPS handover method is not configured, for each bearer according to the configuration indicated in the received handover command message (RRCReconfiguration message), and the UE 1f-01 may perform the general handover method on the bearer for which the DAPS handover method is not configured, the bearer whose identifier is not included in the list of bearers for which the DAPS handover method is configured, and the bearer whose identifier is included in the list of bearers for which the DAPS handover method is not configured. Also, when mobility Control Info or Reconfiguration With Sync configuration information of the handover command message includes an indicator indicating or configuring the type of the handover method for the UE 1f-01 (for example, MakeBeforeBreak handover, rach-skip handover, RACH-less handover, or conditional handover CHO) and the DAPS handover method is configured for each bearer, the UE 1f-01 may apply the DAPS handover method in preference to other types of handover methods when performing the handover procedure for each bearer. For example, the UE 1f-01 may perform the DAPS handover method on the bearer for which the DAPS handover method is configured, the bearer whose identifier is included in the list of bearers for which the DAPS handover method is configured, or the bearer whose identifier is not included in the list of bearers for which the DAPS handover method is not configured, for each bearer, according to the configuration. The UE 1f-01 may perform the handover method, which is set according to the indicator indicating or configuring the type of the handover method for the UE 1f-01 (for example, MakeBeforeBreak handover, rach-skip handover, RACH-less handover, or conditional handover CHO) in mobility Control Info or Reconfiguration With Sync configuration information of the handover command message, on the bearer for which the DAPS handover method is not configured, the bearer whose identifier is not included in the list of bearers for which the DAPS handover method is configured, or the bearer whose identifier is included in the list of bearers for which the DAPS handover method is not configured. Also, in order to reduce the complexity of implementing the UE 1f-01, when the DAPS handover method is configured in at least one bearer or a certain bearer, the type of other handover method for the UE 1f-01 (for example, MakeBeforeBreak handover, rach-skip handover, RACH-less handover, or conditional handover CHO) in mobility Control Info or Reconfiguration With Sync configuration information of the handover command message may be set not to be indicated or configured. Also, when the indicator indicating or configuring the DAPS handover method is included (or configured) in mobility Control Info or Reconfiguration With Sync of the received handover command message (RRCReconfiguration message), the UE 1f-01 may apply the RRC layer, SDAP layer, MAC layer, PHY layer, or SRB processing method of performing the DAPS handover method proposed in the present disclosure. The UE 1f-01 may apply, for each bearer, the PDCP layer or RLC layer processing method of performing the DAPS handover method proposed in the present disclosure on the bearer for which the DAPS handover method is configured, the bearer whose identifier is included in the list of bearers for which the DAPS handover method is configure, or the bearer whose identifier is not included in the list of bearers for which the DAPS handover method is not configured.

Hereinafter, the present disclosure proposes seamless handover methods capable of minimizing a data interruption time due to handover or reducing a data interruption time to 0 ms in a next-generation mobile communication system.

The UE 1f-01 may configure a plurality of first bearers with the source gNB 1f-02 and may perform data transmission and reception (uplink or downlink data transmission and reception) through the protocol layers (a PHY layer, a MAC layer, an RLC layer, or a PDCP layer) of the bearers, but it is assumed that the UE 1f-01 has one bearer in the drawings and description for convenience of description.

Figure 1G:
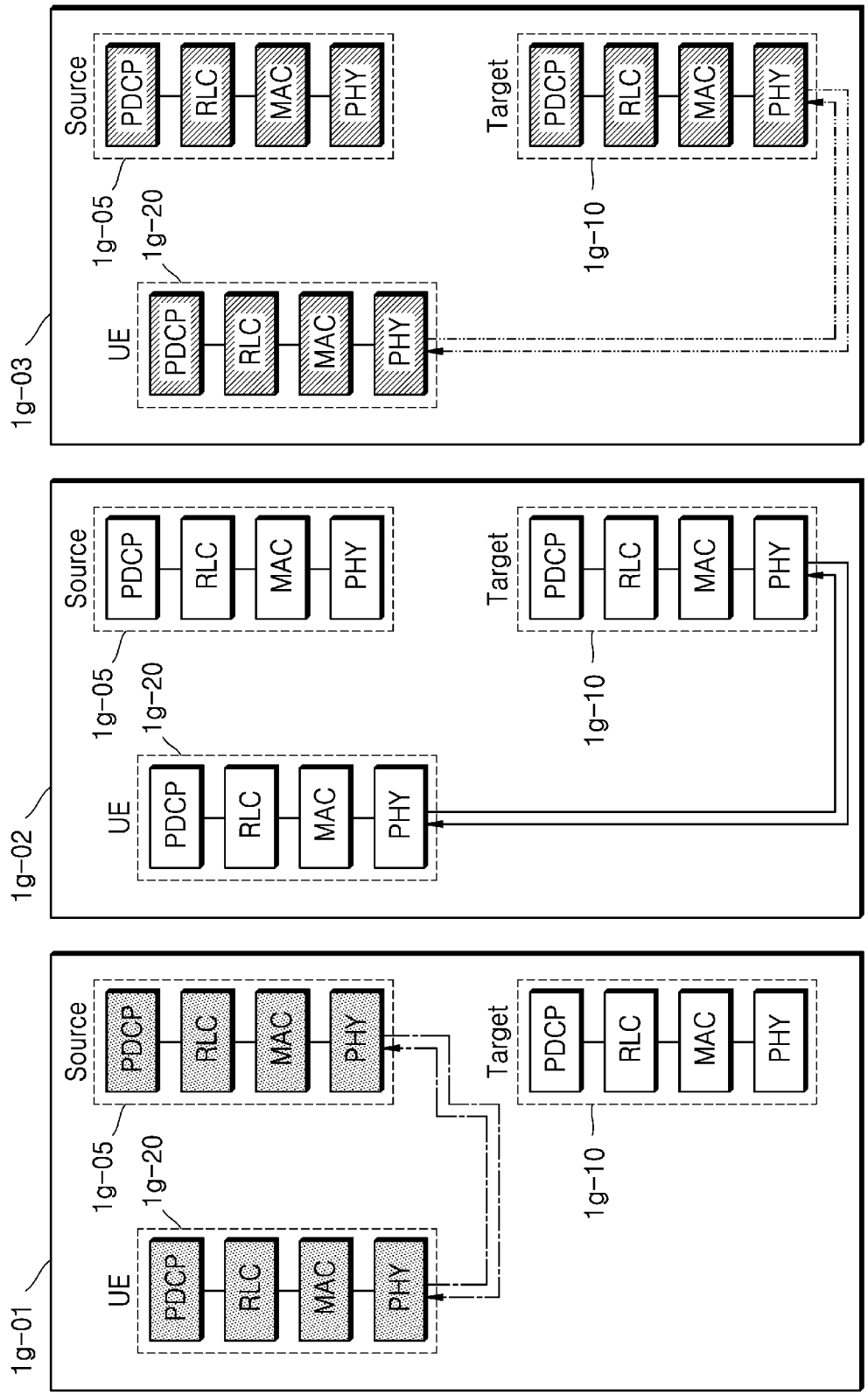
FIG. 1G illustrates specific operations of a first embodiment of an efficient handover method of minimizing a data interruption time due to handover, according to an embodiment of the present disclosure.

FIG. 1G illustrates specific operations of a first embodiment of an efficient handover method of minimizing a data interruption time due to handover, according to an embodiment of the present disclosure.

According to an embodiment, in the first embodiment of the efficient handover method of FIG. 1G, in first operation 1g-01, when a UE 1g-20 receives a handover command message from a source gNB 1g-05 while transmitting and receiving data with the source gNB 1g-05, the UE 1g-20 may release the connection with the source gNB 1g-05 according to the handover method indicated in the handover command message (for example, RRCReconfiguration message), may perform a random access procedure to a target gNB 1g-10, and may perform a handover procedure. According to another method, the UE 1g-20 may continuously transmit and receive data to and from the source gNB 1g-05 so as to minimize a data interruption time that occurs during handover according to the indicated handover method.

According to an embodiment, in second operation 1g-02, the UE 1g-20 may stop data transmission and reception (uplink data transmission and downlink data reception) with the source gNB 1g-05 when the UE 1g-20 performs the random access procedure to the target gNB 1g-10 according to the handover method indicated in the handover command message received from the source gNB 1g-05, when a preamble is transmitted to the target gNB 1g-10, or when data is transmitted through an uplink transmission resource for the first time on a PUCCH or PUSCH transmission resource.

According to an embodiment, in third operation 1g-30, the UE 1g-20 may complete the random access procedure to the target gNB 1g-10, may transmit a handover completion message to the target gNB 1g-10, and may start data transmission and reception (uplink data transmission and downlink data reception) with the target gNB 1g-10.

According to the first embodiment of the efficient handover method of the present disclosure, a handover method performed when a DAPS handover method is not configured in the present disclosure will be described.

Figure 1H:
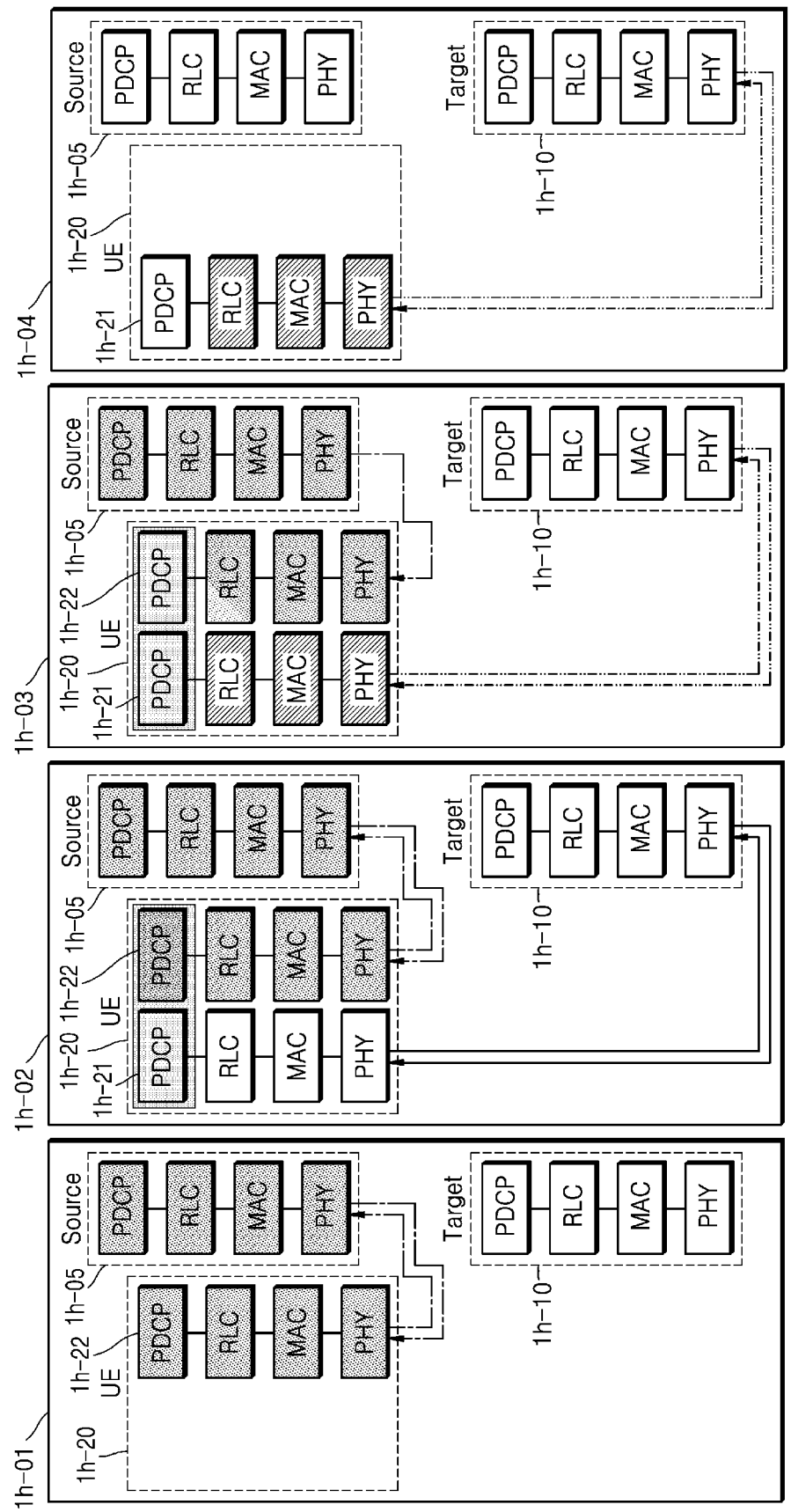
FIG. 1H illustrates specific operations of a second embodiment of an efficient handover method of minimizing a data interruption time due to handover, according to an embodiment of the present disclosure.

FIG. 1H illustrates specific operations of a second embodiment of an efficient handover method of minimizing a data interruption time due to handover, according to an embodiment of the present disclosure.

According to an embodiment, in the second embodiment of the efficient handover method of FIG. 1H, in first operation 1h-01, a UE 1h-20 may receive a handover command message from a source gNB 1h-05 while transmitting and receiving data with the source gNB 1h-05. When the source gNB 1h-05 indicates, in the handover command message, the handover method (for example, the DAPS handover method) according to the second embodiment of the efficient handover method proposed in the present disclosure, or indicates the overhand for each bearer, the UE 1h-20 may continuously transmit and receive data to and from the source gNB 1h-05 through protocol layers 1h-22 for a first bearer so as to minimize a data interruption time occurring during handover even when the UE 1h-20 receives the handover command message.

Also, when an RRC layer of the UE 1h-20 identifies, in the handover command message, the indication for the handover method (for example, the DAPS handover method) according to the second embodiment of the efficient handover method proposed in the present disclosure, or identifies an indicator for the DAPS handover method for each bearer, the RRC layer may transmit the indicator to each bearer or the PDCP layer corresponding to the bearer for which the DAPS handover method is indicated. When the PDCP layer receives the indicator, the PDCP layer may switch from a first PDCP layer structure (1i-11 or 1i-12 in FIG. 1I) to a second PDCP layer structure (1i-20 in FIG. 1I).

In first operation 1h-01 of FIG. 1H, the UE 1h-20 receives the handover command message (RRCReconfiguration message) from the gNB. Also, when switching to the second PDCP layer structure according to the configuration included in the handover command message received by the UE 1h-20, the UE 1h-20 may previously configure or establish protocol layers (a PHY layer, a MAC layer, an RLC layer, or a PDCP layer) 1h-21 for a second bearer for the target gNB 1h-10, may derive and update a security key for the target gNB 1h-10, and may configure a header (or data) compression context for the target gNB 1h-10. Also, when the UE 1h-20 receives the handover command message from the source gNB 1h-05 and the source gNB 1h-05 indicates the DAPS handover method proposed in the present disclosure in the handover command message, when the DAPS handover method is indicated for specific bearers, or when a PDCP reordering timer value is newly set, the UE 1h-20 may switch from the first PDCP layer structure or function (1i-11 or 1i-12 in FIG. 1I) to the second PDCP layer structure or function (1i-20 in FIG. 1I) proposed in the present disclosure for each bearer or with respect to the bearer for which the DAPS handover method is indicated. When switching from the first PDCP layer structure or function (1i-11 or 1i-12 in FIG. 1I) to the second PDCP layer structure or function (1i-20 in FIG. 1I) proposed in the present disclosure, the UE 1h-20 may update a reordering variable with a PDCP sequence number or count value expected to be received next, and may stop and restart the reordering timer.

Also, when the UE 1h-20 receives the handover command message (for example, RRC Reconfiguration message), the RRC layer of the UE 1h-20 may start a first timer (for example, T304). The first timer may be stopped when the UE 1h-20 performs a random access procedure to the target gNB 1h-10 so as to perform handover and the random access procedure is successfully completed (for example, when a first condition proposed in the present disclosure is satisfied). In a case in which the handover fails and the first timer expires, when the connection to the source gNB 1h-05 is valid, the UE 1h-20 may perform fallback, report a handover failure to the source gNB 1h-05, and attempt connection recovery. When the connection to the source gNB 1h-05 is invalid, the UE 1h-20 may perform an RRC connection re-establishment procedure.

The handover command message that the UE 1h-20 receives from the source gNB 1h-05 may include information for performing configuration and establishment so that the first bearer has the same bearer identifier as the second bearer, so as to prevent a data interruption time from occurring for each bearer. Also, in the second embodiment of the present disclosure, the PDCP layer for the first bearer and the PDCP layer for the second bearer may operate as a logically single PDCP layer, and a more detailed operating method therefor will be described with reference to FIG. 1I.

Also, in the second embodiment of the present disclosure, when the UE 1h-20 is allowed to transmit uplink data to both the source gNB 1h-05 and the target gNB 1h-10, the UE 1h-20 may transmit uplink data to only one of the source gNB 1h-05 and the target gNB 1h-10 so as to prevent a problem of coverage reduction due to insufficient transmission power of the UE 1h-20 or a problem (link selection) of determining which gNB to request a transmission resource to and to transmit uplink data to when transmitting uplink data. Specifically, in the second embodiment, when the UE 1h-20 does not have the capability (dual uplink transmission) to simultaneously transmit uplink data to different gNBs at different frequencies or the same frequency, the UE 1h-20 may transmit uplink data to only one of the source gNB 1h-05 and the target gNB 1h-10 in one time unit. Therefore, the UE 1h-20 may perform a scheduling request to only one of the source gNB 1h-05 and the target gNB 1h-10, may transmit a report on the size of data to be transmitted in the PDCP layer (for example, a buffer status report) to only one of the source gNB 1h-05 and the target gNB 1h-10, and may receive an uplink transmission resource and transmit uplink data to only one gNB. Also, even when the UE 1h-20 receives the handover command message from the source gNB 1h-05, the MAC layer for the first bearer may not be initialized so as to prevent data loss by continuing data transmission and reception due to HARQ retransmission. Also, in the case of the RLC layer of the AM mode, RLC retransmission may be continuously performed.

According to another method, when the second embodiment (DAPS handover method) of the efficient handover method proposed in the present disclosure is indicated for each bearer in the handover command message, the UE may continuously transmit or receive data to or from the source gNB 1h-05 only for the PDCP layer, the RLC layer, or the MAC layer corresponding to the bearer or logical channel identifier indicated in the second embodiment (DAPS handover method) in the handover command message, or only for data corresponding to the bearer or logical channel identifier. Also, even when the first condition proposed in the present disclosure is satisfied (for example, when uplink data transmission is switched to the target gNB 1h-10), the UE may continuously transmit or receive RLC control data (RLC status report), PDCP control data (ROHC feedback or PDCP status report), or HARQ retransmission to or from the source gNB 1h-05 only for the PDCP layer, the RLC layer, or the MAC layer corresponding to the bearer or logical channel identifier indicated in the second embodiment (DAPS handover method) in the handover command message. Also, when the second embodiment (DAPS handover method) of the efficient handover method proposed in the present disclosure is indicated for each bearer in the handover command message, the UE may stop data transmission or reception with the source gNB 1h-05 for the PDCP layer, the RLC layer, or the MAC layer corresponding to the bearer or logical channel identifier not indicated in the second embodiment (DAPS handover method) in the handover command message.

According to an embodiment, in the second embodiment of the efficient handover method of FIG. 1H, in second operation 1h-02, the UE 1h-20 may perform a random access procedure the target gNB 1h-10 indicated in the handover command message through the protocol layers for the second bearer. Even when the UE 1h-20 performs the random access procedure through the protocol layers for the second bearer, the UE 1h-20 may continue to perform data transmission or reception (uplink data transmission or downlink data reception) with the source gNB 1h-05 through the protocol layers for the first bearer. In second operation, the UE 1h-20 performs a cell selection or reselection procedure, and performs the random access procedure on the target cell indicated in the handover command message (RRCReconfiguration message) received from the source gNB 1h-05.

According to an embodiment, in the second embodiment of the efficient handover method of FIG. 1H, in third operation 1h-03, when the first condition is satisfied, the UE 1h-20 may stop transmitting uplink data to the source gNB 1h-05 through the protocol layers 1h-22 for the first bearer with respect to the bearer for which the DAPS handover method is configured, and may transmit uplink data to the target gNB 1h-10 through the protocol layers 1h-21 for the second bearer. At this time, the UE 1h-20 may continue to receive downlink data from the source gNB 1h-05 and the target gNB 1h-10 through the protocol layers for the first bearer and the second bearer. Third operation may be operation in which the UE 1h-20 switches uplink transmission from the source gNB 1h-05 to the target gNB 1h-10 when the first condition is satisfied. Specifically, the UE 1h-20 transmits uplink data to the source gNB 1h-05 through the first bearer until the first condition is satisfied, and when the first condition is satisfied, the UE 1h-20 stops transmitting uplink data to the source gNB 1h-05 through the first bearer and starts to transmit uplink data to the target gNB 1h-10 through the second bearer.

Specifically, in the second PDCP layer structure proposed for the bearer for which the DAPS handover method is configured in the present disclosure, when the first condition is satisfied while uplink data is transmitted through the first bearer, and the indicator is received from the lower layer (when the random access procedure from the MAC layer to the target gNB 1h-10 is successful) or the upper layer (when the first timer expires in the RRC layer), the PDCP layer may stop uplink data transmission through the first bearer and switch to start uplink data transmission through the second bearer. Also, as in the PDCP layer structure proposed in FIG. 1I, the receiving PDCP layer 1h-21 for the second bearer may be driven as a single device with the receiving PDCP layer 1*h*-22 for the first bearer, and may continuously perform seamless data reception from the source gNB 1*h*-05 or the target gNB 1*h*-10 by using the stored transmission/reception data, sequence number information, or information such as header compression and decompression context. The first condition may be one of the following conditions. The first condition below proposes an uplink data transmission switching time point at which a transmission resource is most efficiently used and a data interruption time is minimized as much as possible.

The UE 1*h*-20 may determine that the first condition is satisfied when the UE 1*h*-20 successfully completes the random access procedure to the target gNB 1*h*-10 through the layers (for example, MAC layer) for the second bearer, when the UE 1*h*-20 successfully completes the random access procedure to the target gNB 1*h*-10 through the layers (for example, MAC layer) for the second bearer and the first uplink transmission resource is allocated from the target gNB 1*h*-10, or when the uplink transmission resource is indicated to the UE 1*h*-20 for the first time.

For example, when the UE 1*h*-20 receives the handover command message from the source gNB 1*h*-05 and, when random access to the target gNB 1*h*-10 is indicated, the indicated random access is a contention free random access (CFRA) procedure (for example, when a pre-specified preamble or UE (1*h*-20) cell identifier (for example, C-RNTI) is allocated), when the UE 1*h*-20 transmits the pre-specified preamble to the cell of the target gNB 1*h*-10 and receives a RAR message, the UE 1*h*-20 may determine that the random access procedure has been successfully completed. Therefore, when the UE receives (or is allocated) the first uplink transmission resource allocated (or included or indicated) in the RAR message, the UE may determine that the first condition is satisfied. According to another method, when the UE receives the uplink transmission resource for the first time after the reception of the RAR, the UE may determine that the first condition is satisfied.

When the UE 1*h*-20 receives the handover command message from the source gNB 1*h*-05 and, when random access to the target gNB 1*h*-10 is indicated, the indicated random access is a contention-based random access (CBRA) procedure (for example, when a pre-specified preamble or UE (1*h*-20) cell identifier (for example, C-RNTI) is not allocated), The UE 1*h*-20 may determine that the random access procedure to the target gNB 1*h*-10 has been successfully completed when the UE 1*h*-20 transmits a preamble (for example, a random preamble) to the cell of the target gNB 1*h*-10, receives a RAR message, transmits message 3 (for example, handover completion message) to the target gNB by using an uplink transmission resource allocated (or included or indicated) in the RAR message, and receives a MAC CE (contention resolution MAC CE) indicating that contention has been resolved by message 4 from the target gNB 1*h*-10, or when an uplink transmission resource is received on a PDCCH corresponding to the C-RNTI of the UE 1*h*-20. Therefore, when the UE 1*h*-20 monitors the PDCCH and receives the uplink transmission resource for the first time (or when the uplink transmission resource is indicated for the first time) on the PDCCH corresponding to the C-RNTI of the UE 1*h*-20, the UE 1*h*-20 may determine that the first condition is satisfied. According to another method, when the size of the uplink transmission resource allocated in the RAR message is sufficient to transmit message 3 and the UE 1*h*-20 is allowed to additionally transmit uplink data, the UE 1*h*-20 may determine that the uplink transmission resource has been received for the first time and may determine that the first condition is satisfied. That is, when the UE receives the RAR, the UE may determine that the UE has first received the uplink transmission resource and may determine the first condition is satisfied.

When the handover method (RACH-less handover) that does not require the random access procedure is indicated together in the handover command message received by the UE 1*h*-20, when the uplink transmission resource for the target gNB 1*h*-10 is included in the handover command message, when the UE 1*h*-20 transmits message 3 (for example, a handover completion message or an RRCReconfigurationComplete message) on the uplink transmission resource of the target gNB 1*h*-10 and receives the UE (1*h*-20) identity confirmation MAC CE (UE identity confirmation MAC CE) as message 4 from the gNB, or when the uplink transmission resource is received on the PDCCH corresponding to the C-RNTI of the UE 1*h*-20, the UE 1*h*-20 may determine that the random access procedure has been successfully completed, and the first condition is satisfied. According to another method, after the random access procedure is successfully completed, when the UE performs PDCCH monitoring and receives the first uplink transmission resource on the PDCCH corresponding to the C-RNTI of the UE 1*h*-20, the UE 1*h*-20 may determine that the first condition is satisfied.

When the uplink transmission resource for the target gNB 1*h*-10 is not included in the handover command message, when the UE 1*h*-20 performs PDCCH monitoring on the target gNB 1*h*-10 (or cell) and receives the uplink transmission resource on the PDCCH corresponding to the C-RNTI of the UE 1*h*-20, when the UE 1*h*-20 transmits message 3 (for example, a handover completion message or an RRCReconfigurationComplete message) on the uplink transmission resource and receives the UE (1*h*-20) identity confirmation MAC CE (UE identity confirmation MAC CE) from the gNB, or when the uplink transmission resource is received on the PDCCH corresponding to the C-RNTI of the UE 1*h*-20, the UE 1*h*-20 may determine that the random access procedure has been successfully completed, and the first condition is satisfied. According to another method, after the random access procedure is successfully completed, when the UE performs PDCCH monitoring and receives the first uplink transmission resource on the PDCCH corresponding to the C-RNTI of the UE 1*h*-20, the UE 1*h*-20 may determine that the first condition is satisfied.

Hereinafter, an efficient method of switching uplink data from the source gNB 1*h*-05 to the target gNB 1*h*-10 in the DAPS handover method proposed in the present disclosure is proposed. Whether the first condition described above is satisfied may be identified according to one of the following methods or a combination thereof. In the MAC layer or the RRC layer for the target gNB 1h-10 corresponding to the second bearer.

First method: For example, when the DAPS handover is indicated in the RRCReconfiguration message received by the UE 1h-20, the UE 1h-20 may configure the MAC layer for the target gNB 1h-10 corresponding to the second bearer, and the MAC layer for the target gNB may perform the random access procedure, and may identify whether the first condition described above is satisfied. Also, when the first condition is satisfied, the MAC layer for the target gNB may indicate, to the upper layer (for example, the PDCP layer) of the bearer for which the DAPS handover method is configured, an indicator indicating to switch uplink data transmission from the source gNB 1h-05 through the first bearer to the target gNB 1h-10 through the second bearer in the DAPS handover method proposed in the present disclosure.

Second method: According to another method, for example, when the DAPS handover is indicated in the RRCReconfiguration message received by the UE 1h-20, the UE 1h-20 may configure the MAC layer for the target gNB 1h-10 corresponding to the second bearer, and the MAC layer for the target gNB may perform the random access procedure, and identify whether the first condition described above is satisfied. Also, when the first condition is satisfied, the MAC layer for the target gNB may indicate to the upper layer (for example, the RRC layer) that the first condition is satisfied. Also, the upper layer (for example, the RRC layer) may indicate, to the lower layer (for example, the PDCP layer) of the bearer for which the DAPS handover method is configured, an indicator indicating to switch uplink data transmission from the source gNB 1h-05 through the first bearer to the target gNB 1h-10 through the second bearer in the DAPS handover method proposed in the present disclosure. When the first condition proposed in the present disclosure is satisfied, or when the random access procedure to the target gNB 1h-10 is successfully performed, the upper layer (for example, the RRC layer) may stop the first timer. When the first timer is stopped, the RRC layer may use an indicator to indicate to switch the uplink data transmission to the PDCP layer of the bearer for which the DAPS handover method is configured.

Third method: When the DAPS handover is indicated in the RRCReconfiguration message received by the UE 1h-20, the UE 1h-20 may configure the MAC layer for the target gNB 1h-10 corresponding to the second bearer. When an indicator that the RRC layer of the UE 1h-20 performs the DAPS handover is indicated to the lower layer (for example, the MAC layer), the MAC layer for the target gNB may perform the random access procedure and identify whether the first condition described above is satisfied. Also, when the first condition is satisfied, the MAC layer for the target gNB may indicate, to the upper layer (for example, the PDCP layer) of the bearer for which the DAPS handover method is configured, an indicator to switch uplink data transmission from the source gNB 1h-05 through the first bearer to the target gNB 1h-10 through the second bearer in the DAPS handover method proposed in the present disclosure.

Fourth method: According to another method, when the DAPS handover is indicated in the RRCReconfiguration message received by the UE 1h-20, the UE 1h-20 may configure the MAC layer for the target gNB 1h-10 corresponding to the second bearer. When an indicator that the RRC layer of the UE 1h-20 performs the DAPS handover is indicated to the lower layer (for example, the MAC layer), the MAC layer for the target gNB may perform the random access procedure and identify whether the first condition described above is satisfied. Also, when the first condition is satisfied, the MAC layer may indicate to the upper layer (for example, the RRC layer) that the first condition is satisfied. When the indicator is identified and the first condition proposed in the present disclosure is satisfied, or when the random access procedure to the target gNB 1h-10 is successfully performed, the upper layer (for example, the RRC layer) may stop the first timer. Also, the upper layer (for example, the RRC layer) may indicate, to the lower layer (for example, the PDCP layer) of the bearer for which the DAPS handover method is configured, an indicator to switch uplink data transmission from the source gNB 1h-05 through the first bearer to the target gNB 1h-10 through the second bearer in the DAPS handover method proposed in the present disclosure.

According to the first method, the second method, the third method, or the fourth method described above, when the PDCP layer receives, from the upper layer (for example, the RRC layer) or the lower layer (for example, the MAC layer), the indicator that the first condition is satisfied, or the indicator indicating to switch uplink data transmission from the source gNB 1h-05 to the target gNB 1h-10 (for example, when the DAPS handover method is indicated), the PDCP layer may perform the protocol layer operation proposed below so as to effectively perform switching of uplink data transmission, and may perform one or more of the following operations so as to prevent data loss due to uplink data transmission.

The following operations may be applied to the PDCP layer connected to an AM DRB or a UM DRB (an RLC layer operating in an AM mode or an RLC layer operating in a UM mode). Before the first condition is satisfied, or before receiving the indicator that the first condition is satisfied, when there is data to be transmitted in a buffer, the PDCP layer may notify that there is data to be transmitted by indicating the size or amount of data to be transmitted (for example, PDCP data volume) to the MAC layer for the first bearer for the source gNB 1h-05, and may perform uplink data transmission to the source gNB 1h-05. The MAC layer for the first bearer for the source gNB 1h-05 may perform a scheduling request or a buffer status reporting procedure so as to receive an uplink transmission resource allocated to the source gNB 1h-05. When the first condition described above is satisfied, or when the indicator that the first condition is satisfied is received, uplink data transmission switching to the target gNB 1h-10 may be performed as follows for the bearer for which the DAPS handover method is configured.

The UE may use the uplink or downlink ROHC context for the source gNB 1h-05 as it is, without initializing the uplink or downlink ROHC context for the source gNB, may initialize the uplink or downlink ROHC context for the target gNB 1h-10, and may start in an initial state (for example, IR state in U mode).

In order to switch the uplink data transmission from the first bearer for the source gNB 1h-05 to the second bearer for the target gNB 1h-10, the PDCP layer may indicate to the MAC layer for the first bearer for the source gNB 1*h*-05 that the size or amount of data to be transmitted is 0 (or is absent). That is, the PDCP layer may indicate that there is no more data to be transmitted by indicating to the MAC layer for the first bearer that the PDCP data volume of the PDCP layer is 0 (even when there is actually data to be transmitted in the buffer, the PDCP layer may indicate to the MAC layer for the first bearer for the source gNB 1*h*-05 that there is no data to be transmitted so as to switch the uplink data transmission).—However, as proposed in the present disclosure, in the case in which the handover method (DAPS handover method) of the second embodiment of the present disclosure is indicated, in the case of the bearer for which the handover method (DAPS handover method) of the second embodiment of the present disclosure is indicated, or in the case in which the first condition is satisfied, when RLC control data (RLC status report) or PDCP control data (PDCP status report or ROHC feedback) for the source gNB 1*h*-05 is generated, the PDCP layer of the bearer may indicate the data volume corresponding to the RLC control data or PDCP control data to the MAC layer for the source gNB 1*h*-05, and may perform data transmission to the source gNB 1*h*-05 or the RLC layer for the source gNB 1*h*-05. —However, as proposed in the present disclosure, in the case in which the handover method (DAPS handover method) of the second embodiment of the present disclosure is indicated, in the case of the bearer for which the handover method (DAPS handover method) of the second embodiment of the present disclosure is indicated, and in the case in which the first condition is satisfied, when RLC control data (RLC status report) or PDCP control data (PDCP status report or ROHC feedback) for the target gNB 1*h*-10 is generated, the PDCP layer of the bearer may indicate the data volume corresponding to the RLC control data or PDCP control data to the MAC layer for the target gNB 1*h*-10, and may perform data transmission to the target gNB 1*h*-10 or the RLC layer for the target gNB 1*h*-10. When the first condition is not satisfied, the PDCP layer may indicate the data volume corresponding to the generated data (PDCP data PDU or PDCP control PDU) to the MAC layer for the source gNB 1*h*-05, and may perform data transmission to the source gNB 1*h*-05 or the RLC layer for the source gNB 1*h*-05. Therefore, in the structure of the second PDCP layer proposed for the bearer for which the DAPS handover method is configured, when the indicator that the first condition is satisfied is received, the second PDCP layer may indicate, to the target gNB 1*h*-10, the bearer for the source gNB 1*h*-05, PDCP control data or RLC control data to be transmitted to the MAC layer for the source gNB 1*h*-05, or data volume excluding data size when indicating the data volume to the MAC layer for the target gNB 1*h*-10.

The PDCP layer connected to the AM DRB (the RLC layer operating in the AM mode) (all PDCP PDUs stored in the past are discarded (for example, the PDCP SDUs are not discarded so as to prevent loss of original data)) may perform a new header compression procedure based on the header context for the target gNB 1*h*-10 for data (PDCP SDUs of the buffer) in ascending order of the allocated count values (or PDCP sequence numbers) before the first condition is satisfied from the first data (for example, PDCP SDU) in which successful delivery is not confirmed from the lower layers (for example, the RLC layer corresponding to the first bearer for the source gNB 1*h*-05), or before the indicator that the first condition is satisfied is received. The PDCP layer may perform the integrity procedure or the ciphering procedure again by applying security keys for the target gNB 1*h*-10 to the data on which the new header compression procedure has been performed, and may configure the PDCP header and transmit the configured PDCP header to the lower layer (RLC layer for the second bearer for the target gNB 1*h*-10) to perform retransmission or transmission. That is, the PDCP layer may perform cumulative retransmission from the first data in which successful delivery is not confirmed. According to another method, when the retransmission is performed, the PDCP layer may perform retransmission only for data in which successful delivery is not confirmed from lower layers (for example, RLC layers for the first bearer for the source gNB 1*h*-05).—More specifically, the PDCP layer connected to the AM DRB (the RLC layer operating in the AM mode) (all PDCP PDUs previously stored for transmission to the source gNB 1*h*-05 through the first protocol layer connected to the PDCP layer are discarded (for example, PDCP SDUs may not be discarded so as to prevent loss of original data) may perform a new header or data compression procedure by applying a header compression (or data compression) protocol context or security key corresponding to the target gNB 1*h*-10 based on the allocated count value (or PDCP sequence number) before the first condition is satisfied or before the indicator that the first condition is satisfied is received, only for data (for example, PDCP SDU) in which successful delivery has not been confirmed from lower layers (for example, RLC layers), which is the first protocol layer for the source gNB 1*h*-05. The PDCP layer may perform the integrity procedure or the ciphering procedure again on the data on which the new header or data compression procedure, may configure the PDCP header, and may perform retransmission or transmission by transmitting the configured PDCP header to the lower layer that is the second protocol layer for transmission to the target gNB 1*h*-10. That is, in order to prevent waste of transmission resources, the PDCP layer may perform selective retransmission only for data in which successful delivery is not confirmed. According to another method, the transmission or retransmission operation is performed by releasing the lower layers (for example, transmitting or receiving RLC layers or MAC layers) that are the first protocol layers for transmitting data to the source gNB 1*h*-05. When the transmission or retransmission procedure is extended to the UM DRB, the PDCP layer connected to the RLC layer operating in the UM mode may regard data that has not yet been transmitted to the lower layer, data for which a PDCP discard timer has not expired, or data to which a PDCP sequence number (or count value) has already been allocated, as data received from the upper layer or newly received data. Also, the PDCP layer entity may perform header (or data) compression, ciphering or integrity protection procedure on the data with the header (or data) compression context or security key for the target gNB 1*h*-10, without restarting the PDCP discard timer for the data received or from the upper layer or the data regarded as the newly received data, and may generate and concatenate the PDCP header and perform transmission or retransmission. Also, the PDCP layer may process data in an ascending order of the count values allocated before the procedure is triggered, and may perform transmission or retransmission. The window state variable of the PDCP layer connected to the UM DRB or AM DRB may be maintained and used without initialization.

When there is data to be transmitted in the buffer, the PDCP layer may notify that there is data to be transmitted by indicating the size or amount of data to be transmitted (for example, PDCP data volume) to the MAC layer for the second bearer for the target gNB 1h-10, and may perform uplink data transmission switching to the target gNB 1h-10. The MAC layer for the second bearer for the target gNB 1h-10 may perform a scheduling request or a buffer status reporting procedure to the target gNB 1h-10 so that an uplink transmission resource is allocated thereto.

In the second embodiment (for example, the DAPS handover method) of the efficient handover method proposed in the present disclosure, even after the UE 1h-20 receives the handover command message (for example, the RRCReconfiguration message), the UE 1h-20 may continue to receive downlink data from the source gNB 1h-05 or the target gNB 1h-10 through the protocol layers for the first bearer for the source gNB 1h-05 or the second bearer for the target gNB 1h-10. Also, according to the second embodiment of the present disclosure, in order to seamlessly receive downlink data from the source gNB 1h-05 (or the target gNB 1h-10), or in order for the source gNB 1h-05 (or the target gNB 1h-10) to seamlessly transmit downlink data to the UE, the RLC status report rather than data may be allowed to continuously perform uplink transmission to the source gNB 1h-05 (or the target gNB 1h-10) for the AM bearers through the protocol layers for the first bearer (or the second bearer). That is, even when the first condition is satisfied and the UE 1h-20 switches the uplink data transmission to the target gNB 1h-10, when the UE 1h-20 needs to transmit RLC status report, HARQ ACK or NACK, or PDCP control data (PDCP ROHC feedback or PDCP status report) to the source gNB 1h-05, the UE 1h-20 may allow data to be transmitted through the first bearer for the source gNB 1h-05. This is because, in the case of the AM bearers, when successful delivery is not indicated by the RLC status report (that is, when the RLC status report is not received) after data is transmitted to a transmitting end, data may not be continuously transmitted thereafter.

Specifically, in the second embodiment of the efficient handover method of FIG. 1H, in third operation 1h-03, even when the first condition is satisfied and the UE 1h-20 stops transmitting uplink data to the source gNB 1h-05 through the protocol layers 1h-22 for the first bearer and switches to start to transmit uplink data to the target gNB 1h-10 through the protocol layers 1h-21 for the second bearer, the UE 1h-10 may continue to transmit HARQ ACK or HARQ NACK information, RLC status report (ACK or NACK information), or PDCP control data (for example, PDCP status report or ROHC feedback information) through the protocol layers for the first bearer (or the second bearer), so that downlink data is seamlessly received from the source gNB 1h-05 (or the target gNB 1h-10), or the source gNB 1h-05 (or the target gNB 1h-10) seamlessly transmits downlink data.

Also, in the second embodiment of the efficient handover method of FIG. 1H, in third operation 1h-03, even when the first condition is satisfied and the UE 1h-20 stops transmitting uplink data to the source gNB 1h-05 through the protocol layers 1h-22 for the first bearer and switches to start to transmit uplink data to the target gNB 1h-10 through the protocol layers 1h-21 for the second bearer, the UE 1h-20 may continue to perform data transmission due to HARQ retransmission of the MAC layer or data transmission due to retransmission of the AM mode RLC layer so as to prevent data loss to the source gNB 1h-05.

In the second embodiment of the efficient handover method of FIG. 1H, in third operation 1h-03, when the first condition is satisfied and the UE 1h-20 stops transmitting uplink data to the source gNB 1h-05 through the protocol layers 1h-22 for the first bearer and switches to start to transmit uplink data to the target gNB 1h-10 through the protocol layers 1h-21 for the second bearer, the source gNB 1h-05 or the target gNB 1h-10 may allocate the transmission resources to the UE 1h-20 by dividing the time, so as to prevent collision between the uplink transmission resource to the target gNB 1h-10 and the uplink transmission resource to the source gNB 1h-05. When the uplink transmission resource to the target gNB 1h-10 and the uplink transmission resource to the source gNB 1h-05 collide and overlap each other, the UE 1h-20 may prioritize uplink transmission resource to the source gNB 1h-05 and perform data transmission to the source gNB 1h-05 so as to maintain downlink data transmission from the source gNB 1h-05 or continuously receive downlink data from the source gNB 1h-05 without problems.

According to another embodiment, when the uplink transmission resource to the target gNB 1h-10 and the uplink transmission resource to the source gNB 1h-05 collide and overlap each other, the UE 1h-20 may prioritize uplink transmission resource to the target gNB 1h-10 and perform data transmission to the target gNB 1h-10 so as to maintain downlink data transmission from the target gNB 1h-10.

Specifically, in a case where the handover (for example, DAPS handover) corresponding to the second embodiment of the present disclosure is indicated when the UE receives the handover command message, or is indicated for each bearer, the UE or the bearer to which the DAPS handover is indicated may perform the scheduling request through the first protocol layer until the first condition is satisfied, may transmit the buffer status report to the source gNB, may receive the uplink transmission resource, may transmit the uplink data, and may receive the downlink data from the source gNB. However, when the first condition is satisfied, the UE may no longer transmit data to the source gNB, may switch the uplink to perform the scheduling request through the second protocol layer, may transmit the buffer status report to the target gNB, may receive the uplink transmission resource, and may transmit uplink data to the target gNB. However, the UE may continue to receive downlink data from the source gNB. Even after uplink transmission switching, HARQ ACK or HARQ NACK, RLC status report, or PDCP control data (for example, PDCP status report or ROHC feedback information) corresponding to the downlink data may be continuously transmitted. Also, even when the first condition is satisfied, the UE may continue to receive downlink data from the source gNB or the target gNB.

In the second embodiment of the efficient handover method of FIG. 1H, in fourth operation 1h-04, when the second condition is satisfied, the UE 1h-20 may stop receiving downlink data from the source gNB 1h-05 through the protocol layers 1h-22 for the first bearer, and may release the connection with the source gNB. The second condition may be one of the following conditions. Also, the PDCP layer 1h-21 for the second bearer may continue to perform seamless data transmission or reception with the target gNB by using information such as transmission or reception data, sequence number information, or header compression and decompression context, which is stored in the PDCP layer 1h-22 for the first bearer.

When the UE performs the random access procedure to the target gNB through the layers 1h-21 for the second bearer and receives the RAR, the UE may determine that the second condition is satisfied.

When the UE performs the random access procedure to the target gNB through the layers for the second bearer, receives the RAR, and configures and transmits the handover completion message to the target gNB, the UE may determine that the second condition is satisfied.

When the UE completes the random access procedure to the target gNB through the layers for the second bearer and transmits data on the PUCCH or PUSCH uplink transmission resource for the first time, or when the UE receives the PUCCH or PUSCH uplink transmission resource for the first time, the UE may determine that the second condition is satisfied.

When the gNB sets a separate timer in the UE with the RRC message and the separate timer has expired, the UE may determine that the second condition is satisfied.

The separate timer may be started when the UE receives the handover command message from the source gNB, when random access to the target gNB is started (when the preamble is transmitted), when the RAR is received from the target gNB, when the handover completion message is transmitted to the target gNB, or when data is transmitted for the first time on the PUCCH or PUSCH uplink transmission resource.

After the UE performs the random access procedure to the target gNB through the layers for the second bearer, receives the RAR, and configures and transmits the handover completion message to the target gNB, when successful delivery of the handover completion message is confirmed in the MAC layer (HARQ ACK) or the RLC layer (RLC ACK), the UE may determine that the second condition is satisfied.

After the UE performs the random access procedure to the target gNB through the layers for the second bearer, receives the RAR, or configures and transmits the handover completion message to the target gNB, when the uplink transmission resource is allocated from the target gNB for the first time, or when the uplink transmission resource is indicated for the first time, the UE may determine that the second condition is satisfied.

When the source gNB performs the efficient handover proposed in the present disclosure, the source gNB may determine when to stop the transmission of downlink data to the UE or when to release the connection with the UE. For example, when to stop the transmission of downlink data or when to release the connection with the UE may be determined by a certain method, for example, when a certain timer has expired (a timer may be started after handover indication) or when the source gNB receives an indication from the target gNB that the UE has successfully performed handover to the target gNB. When downlink data is not received from the source gNB for a certain time, the UE may determine that the second condition is satisfied, may determine that the connection with the source gNB has been released, and may release the connection.

When the UE receives, from the target gNB, the indication to release the connection with the source gNB (for example, RRC message (e.g., RRCReconfiguration message), MAC CE, RLC control PDU, or PDCP control PDU), the UE may determine that the second condition is satisfied.

When the UE receives, from the source gNB, the indication to release the connection with the source gNB (for example, RRC message (e.g., RRCReconfiguration message), MAC CE, RLC control PDU, or PDCP control PDU), the UE may determine that the second condition is satisfied.

When the UE does not receive downlink data from the source gNB for a certain time, the UE may determine that the second condition is satisfied.

The UE may determine that the second condition is satisfied when the UE successfully completes the random access procedure to the target gNB through the layers (for example, MAC layer) for the second bearer, when the UE successfully completes the random access procedure to the target gNB through the layers for the second bearer and the first uplink transmission resource is allocated from the target gNB, or when the uplink transmission resource is indicated to the UE for the first time.

For example, in a case where the UE receives the handover command message from the source gNB and random access to the target gNB is indicated, when the indicated random access is a CFRA procedure (for example, when a pre-specified preamble or UE cell identifier (for example, C-RNTI) is allocated), and when the UE transmits a pre-specified preamble to the cell of the target gNB and receives a RAR message, the UE may determine that the random access procedure has been successfully completed. Therefore, when the UE receives the first uplink transmission resource that is allocated, included, or indicated in the RAR message, the UE may determine that the second condition is satisfied. According to another method, when the UE receives the uplink transmission resource for the first time after the reception of the RAR, the UE may determine that the second condition is satisfied.

In a case where the UE receives the handover command message from the source gNB and random access to the target gNB is indicated, when the indicated random access is a CBRA procedure (for example, when a pre-specified preamble or UE cell identifier (for example, C-RNTI) is not allocated), the UE may determine that the random access procedure to the target gNB has been successfully completed when the UE transmits a preamble (for example, a random preamble) to the cell of the target gNB, receives a RAR message, transmits message 3 (for example, the handover completion message) by using an uplink transmission resource that is allocated, included, or indicated in the RAR message, and receives a MAC CE (contention resolution MAC CE) indicating that contention has been resolved by message 4 from the target gNB, or when an uplink transmission resource is received on a PDCCH corresponding to the C-RNTI of the UE. Therefore, when the UE monitors the PDCCH and receives the uplink transmission resource for the first time, or when the uplink transmission resource is indicated for the first time, on the PDCCH corresponding to the C-RNTI of the UE, the UE may determine that the second condition is satisfied. According to another method, when the size of the uplink transmission resource allocated in the RAR message is sufficient to transmit message 3 and the UE is allowed to additionally transmit uplink data, the UE may determine that the uplink transmission resource has been received for the first time and may determine that the second condition is satisfied. That is, when the RAR is received, the UE may determine that the uplink transmission resource has been received for the first time, and may determine that the second condition is satisfied.

When the handover method (RACH-less handover) that does not require the random access procedure is indicated together in the handover command message received by the UE, the UE may determine that the second condition is satisfied in the following cases.

When the uplink transmission resource for the target gNB is included in the handover command message,
when the UE transmits message 3 (for example, a handover completion message or an RRCReconfigurationComplete message) on the uplink transmission resource of the target gNB and receives the UE identity confirmation MAC CE as message 4 from the gNB, or when the uplink transmission resource is received on the PDCCH corresponding to the C-RNTI of the UE, the UE may determine that the random access procedure has been successfully completed, and may determine that the second condition is satisfied. According to another method, after the random access procedure is successfully completed, when the UE performs PDCCH monitoring and receives the first uplink transmission resource on the PDCCH corresponding to the C-RNTI of the UE, the UE may determine that the second condition is satisfied.

When the uplink transmission resource for the target gNB is not included in the handover command message,
when the UE performs PDCCH monitoring on the target gNB (or cell) and receives the uplink transmission resource on the PDCCH corresponding to the C-RNTI of the UE, when the UE transmits message 3 (for example, a handover completion message or an RRCReconfigurationComplete message) on the uplink transmission resource and receives the UE identity confirmation MAC CE from the gNB, or when the uplink transmission resource is received on the PDCCH corresponding to the C-RNTI of the UE, the UE may determine that the random access procedure has been successfully completed, and may determine the second condition is satisfied. According to another method, after the random access procedure is successfully completed, when the UE performs PDCCH monitoring and receives the first uplink transmission resource on the PDCCH corresponding to the C-RNTI of the UE, the UE may determine that the second condition is satisfied.

In a case where the UE performs the second embodiment (for example, the DAPS handover method) of the efficient handover method proposed in the present disclosure, when the UE identifies that the RRC layer, MAC layer, RLC layer for the first bearer for the source gNB or the RRC layer, MAC layer, or RLC layer for the second bearer for the target gNB satisfies the second condition proposed in the present disclosure, the indicator indicating that the second condition is satisfied may be indicated to the PDCP layer of the UE or the bearer that performs the DAPS handover method. When the PDCP layer of the UE receives, from the lower layer or the upper layer, the indicator indicating that the second condition is satisfied, or when the second condition is satisfied, the second embodiment of the efficient handover method proposed in the present disclosure may be successfully completed by performing one or more of the following procedures on the bearer or the UE 1$h$-20 for which the DAPS handover method is configured.

The UE 1$h$-20 may release the first bearer for the source gNB 1$h$-05 and release the connection with the source gNB 1$h$-05.

When the UE 1$h$-20 releases the connection with the source gNB 1$h$-05, the UE 1$h$-20 may trigger the PDCP status reporting procedure so as to report the reception status of downlink data received from the source gNB 1$h$-05 to the target gNB 1$h$-10, may configure the PDCP status report, and may transmit the PDCP status report to the target gNB 1$h$-10.

When the second condition is satisfied, the UE 1$h$-20 may switch from the second PDCP layer structure or function 1$i$-20 to the first PDCP layer structure or function 1$i$-11 or 1$i$-12 proposed in the present disclosure for each bearer or with respect to the bearer for which the DAPS handover method is indicated. Also, the UE may initialize the reordering variable, and may stop and initialize the reordering timer. The UE may perform the deciphering procedure or header (or data) decompression by applying the security key or header decompression context for the source gNB 1$h$-05 to the data stored in the buffer for reordering (for example, data received from the source gNB 1$h$-05), and may discard the security key or header decompression context for the source gNB 1$h$-05. The UE may transmit the processed data to the upper layer in ascending order. That is, when the second condition is satisfied, the UE 1$h$-20 may perform the deciphering procedure or header (or data) decompression by applying the security key or header decompression context for the source gNB 1$h$-05 to the data stored in the buffer for reordering (for example, the data received from the source gNB 1$h$-05), and may discard the security key or header decompression context for the source gNB 1$h$-05. According to another method, when the second condition is satisfied, the UE 1$h$-20 may switch from the second PDCP layer structure or function 1$i$-20 to the third PDCP layer structure or function 1$i$-30 proposed in the present disclosure for each bearer or with respect to the bearer for which the DAPS handover method is indicated. Also, the UE may continue to use the reordering variables and the reordering timer without stopping or initializing the reordering variables and the reordering timer. However, the UE may perform the deciphering procedure or header (or data) decompression by applying the security key or header decompression context for the source gNB 1$h$-05 to the data stored in the buffer for reordering (for example, the data received from the source gNB 1$h$-05), and may discard the security key or header decompression context for the source gNB 1$h$-05. The UE may transmit the processed data to the upper layer in ascending order. That is, when the second condition is satisfied, the UE 1$h$-20 may perform the deciphering procedure or header (or data) decompression by applying the security key or header decompression context for the source gNB 1$h$-05 to the data stored in the buffer for reordering (for example, the data received from the source gNB 1$h$-05), and may discard the security key or header decompression context for the source gNB 1h-05. The UE 1h-20 may release QoS mapping information of the SDAP layer for the source gNB 1h-05, security key information for the source gNB 1h-05 of the PDCP layer, header (or data) compression context information for the source gNB 1h-05, or the RLC layer or the MAC layer for the source gNB 1h-05.

When the MAC layer for the source gNB 1h-05 is initialized and the second PDCP layer structure of the bearer for which the DAPS handover method is configured is switched to the first PDCP layer structure, the UE may perform the RLC layer re-establishment or release procedure on the RLC layer for the source gNB 1h-05 in the second PDCP layer structure.

The receiving PDCP layer may process the data received due to the re-establishment procedure of the lower layer, or may perform the header decompression procedure on UM DRBs based on the stored data (received from the source gNB 1h-05) or the header compression context (ROHC or Ethernet header compression (EHC)) for all the stored data (for the source gNB 1h-05).

The receiving PDCP layer may process the data received due to the re-establishment procedure of the lower layer, or may perform the header decompression procedure on AM DRBs based on the stored data (received from the source gNB 1h-05) or the header compression context (ROHC or EHC) for all the stored data (for the source gNB 1h-05).

According to another method, the receiving PDCP layer may process the data received due to the re-establishment procedure of the lower layer. When the indicator (drb-Continue ROHC or drb-Continue EHC) to continuously use the header compression context is not set for UM DRBs or AM DRBs, the receiving PDCP layer may perform the header decompression procedure based on the stored data (received from the source gNB 1h-05) or the header compression context (ROHC or EHC) for all the stored data.

After the above procedure is performed, the transmitting or receiving PDCP layer may discard or release the security key or header compression contexts for the source gNB 1h-05.

In FIG. 1F of the present disclosure, when the handover command message 1f-20 is transmitted to the UE, the source gNB 1f-20 may define indicators for the embodiments proposed in the present disclosure in the handover command message (for example, the RRCReconfiguration message), and may indicate to the UE 1f-01 which embodiment of the handover procedure is triggered. The UE 1f-01 may perform the handover procedure according to the handover method indicated in the handover command message. For example, the UE 1f-01 may perform handover to the target gNB 1f-03 while minimizing a data interruption time by performing the second embodiment (DAPS handover method) of the efficient handover method proposed in the present disclosure.

According to another method, in the handover command message, the indicators for the embodiments proposed in the present disclosure may be defined for each bearer. Which embodiment to be applied to the bearer during handover and which bearer to which the embodiment is applied during handover may be more specifically indicated. For example, the source gNB 1f-02 may use the handover command message to indicate to apply the second embodiment of the present disclosure only to the AM bearer in which the RLC layer driven in the AM mode is running, or may extend and apply the second embodiment of the present disclosure to the UM bearer in which the RLC layer driven in the UM mode is running.

Also, it may be assumed that the embodiments proposed in the present disclosure are applied to DRB. However, when necessary (for example, when the UE maintains the SRB for the source gNB and fails handover to the target gNB, and thus, the handover failure message may be reported or restored to the SRB for the source gNB), the embodiments proposed in the present disclosure may also be extended and applied to the SRB.

In the embodiments of the present disclosure, when the UE performs data transmission and reception with the source gNB through the protocol layers for the first bearer and performs data transmission and reception with the target gNB through the protocol layers for the second bearer, the MAC layer for the first bearer and the MAC layer for the second bearer may operate separate discontinuous reception (DRX) cycles to reduce battery consumption of the UE. That is, even after receiving the handover command message, the UE may continue to apply the DRX cycle of the MAC layer when transmitting and receiving data through the protocol layers for the first bearer. The UE may stop DRX according to the first condition or the second condition of the present disclosure. Also, the UE may separately operate the application of the DRX cycle to the MAC layer for the second bearer according to the indication of the target gNB.

Also, in the present disclosure, that the UE stops uplink transmission to the source gNB through the protocol layers for the first bearer and stops downlink data reception from the source gNB may mean that the UE re-establishes, initializes, or releases the protocol layers (PHY layer, MAC layer, RLC layer, or PDCP layer) for the first bearer.

In the embodiments of the present disclosure, for convenience of explanation, it has been described that the UE configures the first bearer for the source gNB or the second bearer for the target gNB. The embodiments of the present disclosure may be easily extended to the case in which the UE configures a plurality of first bearers for the source gNB or a plurality of second bearers for the target gNB, and the same may be applied thereto. Also, the embodiments of the present disclosure may be extended to the case in which a plurality of bearers for a plurality of target gNBs are configured, and the same may be applied thereto. For example, the UE may perform the handover procedure to the first target gNB to configure second bearers. When handover fails, the UE performs the handover procedure to the second target gNB to configure second bearers. The UE may search for and determine one cell satisfying a certain condition (for example, a certain signal intensity or more) for itself from among the target gNBs and may perform the handover procedure thereon.

In the present disclosure, when the UE receives the handover command message in FIG. 1F and applies the bearer configuration information included in the handover command message, applying the bearer configuration information in different ways according to the handover type indicated in the handover command message is proposed.

When the UE receives the handover command message and the first handover method (for example, the first embodiment of the present disclosure or the general handover method) is indicated in the handover command message, ReconfigWithSync information, or MobilityControlInfo information, when the second embodiment (DAPS handover method) proposed in the present disclosure is not configured, or when no bearer is configured in the bearer configuration information in the second embodiment (DAPS handover method) proposed in the present disclosure, when the default bearer is configured in the SDAP layer configuration information configured in the handover command message, the default bearer for the source gNB may be set as the default bearer for the target gNB indicated in the configuration information.

When the second mapping information between the QoS flow and the bearer is configured in the SDAP layer configuration information configured in the handover command message, the first mapping information between the QoS flow and the bearer applied for the source gNB may be released, and the second mapping information between the QoS flow and the bearer may be applied. According to another method, the first mapping information between the QoS flow and the bearer applied for the source gNB may be replaced with the second mapping information between the QoS flow and the bearer.

When a data discard timer value is set in the PDCP layer configuration information configured in the handover command message, the discard timer value may be directly applied to the PDCP layer corresponding to the bearer identifier of the configuration information.

When a drb-ContinueROHC indicator is set to false in the PDCP layer configuration information configured in the handover command message, the header compression or decompression protocol context may be initialized in the PDCP layer corresponding to the bearer identifier of the configuration information. When the drb-ContinueROHC indicator is set to true, the header compression or decompression protocol context is not initialized in the PDCP layer corresponding to the bearer identifier of the configuration information.

When a reordering timer value is set in the PDCP layer configuration information configured in the handover command message, the reordering timer value may be directly applied to the PDCP layer corresponding to the bearer identifier of the configuration information.

When the handover command message is received, the PDCP layer may be re-established. For example, window state variables may be initialized for SRB and the stored data (PDCP SDU or PDCP PDU) may be discarded. Window state variables for UM DRB may be initialized, and the transmission or retransmission may be performed by performing compression, ciphering, or integrity protection on data that has not yet been transmitted to the lower layer or data for which the PDCP discard timer has not expired, in ascending order of count values, based on the header (or data) compression context or security key of the target gNB. When the reordering timer is running, the reordering timer is stopped and initialized. The received data (PDCP SDU or PDCP PDU) may be processed in sequence and transmitted to the upper layer. For AM DRB, window state variables are not initialized, and the transmission or retransmission may be performed by performing compression, ciphering, or integrity protection based on the header (or data) compression context or security key in ascending order of PDCP sequence number or count value from the first data (PDCP SDU or PDCP PDU) for which successful delivery is not confirmed from the lower layer.

When the security key-related configuration information or security algorithm is set in the security configuration information configured in the handover command message, a new security key or security configuration information may be derived by using the configuration information, and the existing security key or security configuration information may be released. Also, the existing security key or security configuration information may be replaced with the new security key or security configuration information.

When a new logical channel identifier is configured in the RLC layer configuration information configured in the handover command message, the existing logical channel identifier corresponding to the bearer identifier indicated in the RLC layer configuration information may be released. Also, the existing logical channel identifier may be replaced with the new logical channel identifier.

When the RLC re-establishment procedure is configured in the RLC layer configuration information configured in the handover command message, the RLC re-establishment procedure may be performed on the RLC layer corresponding to the bearer identifier indicated in the RLC layer configuration information. That is, specifically, an RLC re-establishment procedure may be performed, so that the transmitting RLC layer may perform a procedure for discarding all stored data. Also, when the reordering timer is running, the receiving RLC layer may stop and initialize the reordering timer, may process all stored data, and may transmit the processed data to the upper layer. Also, the MAC layer may be initialized. Also, the MAC layer for the source gNB may be initialized and used for the target gNB.

When the RLC layer configuration information configured in the handover command message is newly configured, the RLC re-establishment procedure may be performed on the RLC layer corresponding to the bearer identifier indicated in the RLC layer configuration information.

When the second priority for the logical channel is newly configured in the MAC layer configuration information configured in the handover command message, the first priority corresponding to the logical channel identifier indicated in the configuration information may be released. Also, the first priority corresponding to the logical channel identifier may be replaced with the second priority newly configured as described above.

When the second priority bit rate (prioritisedBitRate, PBR) for the logical channel is newly configured in the MAC layer configuration information configured in the handover command message, the first priority bit rate (prioritisedBitRate, PBR) corresponding to the logical channel identifier indicated in the configuration information may be released. Also, the first priority bit rate (prioritisedBitRate, PBR) corresponding to the logical channel identifier may be replaced with the second priority bit rate (prioritisedBitRate, PBR) newly configured as described above. The priority bit rate is a value that increases for each logical channel every a certain time (for example, TTI). When the uplink transmission resource is received, a logical channel prioritization (LCP) procedure may be performed, and data for the logical channel may be transmitted considering the priority and the priority bit rate. More data may be transmitted as the priority is higher or the value of the priority bit rate is greater.

When the second bucket size (bucketSizeDuration) for the logical channel is newly configured in the MAC layer configuration information configured in the handover command message, the first bucket size (bucketSizeDuration) corresponding to the logical channel identifier indicated in the configuration information may be released. Also, the first bucket size (bucketSizeDuration) corresponding to the logical channel identifier may be replaced with the second bucket size (bucketSizeDuration) newly configured as described above. The bucket size indicates the maximum value that the priority bit rate may have when the priority bit rate is accumulated.

When second allowable SCell information, allowable sub-carrier spacing information, maximum PUSCH period, or logical channel group configuration information is configured in the MAC layer configuration information configured in the handover command message, the previously configured first allowable SCell information, allowable sub-carrier spacing information, maximum PUSCH period, or logical channel group configuration information may be released. Also, the previously configured first allowable SCell information, allowable subcarrier spacing information, maximum PUSCH period, or logical channel group configuration information may be replaced with the second allowable SCell information, allowable subcarrier spacing information, maximum PUSCH period, or logical channel group configuration information that is newly configured as described above.

When the UE receives the handover command message, when the second handover method (for example, the second embodiment of the present disclosure or the DAPS handover method) is indicated or configured in the handover command message, ReconfigWithSync information, or mobilityControlInfo information, when the DAPS handover method is indicated or configured for each bearer identifier, when the method according to the second embodiment (DAPS handover method) proposed in the present disclosure is configured for a certain bearer in the bearer configuration information, or when the method according to the second embodiment (DAPS handover method) proposed in the present disclosure is configured for at least one bearer in the bearer configuration information, when the default bearer is configured in the SDAP layer configuration information configured in the handover command message, the DAPS handover method proposed above in the present disclosure may be performed, the second SDAP layer structure may be applied to maintain the default bearer for the existing source gNB, and the default bearer information indicated in the configuration information may be configured as the default bearer for the target gNB. According to another method, when the first condition proposed in the present disclosure is satisfied, the default bearer for the existing source gNB may be switched to the default bearer for the target gNB indicated in the configuration information.

When the second mapping information between the QoS flow and the bearer is configured in the SDAP layer configuration information configured in the handover command message, the DAPS handover method proposed in the present disclosure may be performed, the second SDAP layer structure may be applied to maintain the first mapping information between the QoS flow and the bearer applied for the source gNB, and the second mapping information between the QoS flow and the bearer may be applied to data for the target gNB. According to another method, when the first condition proposed in the present disclosure is satisfied, the second mapping information between the QoS flow and the bearer for the target gNB may be applied.

When the data discard timer value is set in the PDCP layer configuration information configured in the handover command message, the DAPS handover method proposed above in the present disclosure may be performed. The second PDCP layer structure may be applied so that the discard timer value is directly applied to the PDCP layer corresponding to the bearer identifier of the configuration information.

The PDCP layer for which the DAPS handover method is indicated or configured in the handover command message is not re-established, and may perform the following procedures. For example, for SRB, the PDCP layer may initialize window state variables (the variable initialization may be omitted for fallback when the DAPS handover fails) or may discard the stored data (PDCP SDU or PDCP PDU). For UM DRB, the PDCP layer may continue to perform data transmission or reception with the source gNB with respect to data that has not yet been transmitted to the lower layer or data for which the PDCP discard timer has not expired, without initializing window state variables. For AM DRB, the PDCP layer may continue to perform data transmission or reception with the source gNB without initializing window state variables.

The PDCP layer for which the DAPS handover method is not indicated or configured in the handover command message may re-establish the PDCP layer. For example, the PDCP layer may initialize window state variables for SRB and discard the stored data (PDCP SDU or PDCP PDU). Also, the PDCP layer may initialize window state variables for the UM DRB, and may perform transmission or retransmission by performing compression, ciphering, or integrity protection on data that has not yet been transmitted to the lower layer or data for which the PDCP discard timer has not expired, in ascending order of count values, based on the header (or data) compression context or security key of the target gNB. Also, when the reordering timer is running, the PDCP layer may stop and initialize the reordering timer, may sequentially process the received data (PDCP SDU or PDCP PDU), and may transmit the processed data to the upper layer. Also, the PDCP layer may not initialize window state variables for the AM DRB, and may perform transmission or retransmission by performing compression, ciphering, or integrity protection based on the header (or data) compression context or security keys of the target gNB in ascending order of count values or PDCP sequence numbers from the first data (PDCP SDU or PDCP PDU) in which successful delivery is not confirmed from the lower layer. Also, the RLC layer may also perform the re-establishment procedure.

When the drb-ContinueROHC indicator is set to false in the PDCP layer configuration information for which the DAPS handover method is indicated or configured in the handover command message, the DAPS handover method proposed above in the present disclosure may be performed. The second PDCP layer structure may be applied to use the header compression or decompression protocol context for the source gNB 1h-05 as it is in the PDCP layer corresponding to the bearer identifier of the configuration information, initialize the header compression or decompression protocol context for the target gNB, and start from an initial state (for example, IR state). When the drb-ContinueROHC indicator is set to true, the DAPS handover method proposed in the present disclosure may be performed. The second PDCP layer structure may be applied to use the header compression or decompression protocol context for the source gNB as it is in the PDCP layer corresponding to the bearer identifier of the configuration information, and apply the header compression or decompression protocol context for the target gNB in the same manner as the header compression or decompression protocol context for the source gNB. For example, the header compression or decompression protocol context for the source gNB may be copied to the header compression or decompression protocol context for the target gNB and used as it is. According to another method, the same header compression or decompression protocol context may be applied to the target gNB or the source gNB.

When the reordering timer value is set in the PDCP layer configuration information in which the DAPS handover method is indicated or configured in the handover command message, the DAPS handover method proposed above in the present disclosure may be performed. The second PDCP layer structure may be applied so that the reordering timer value is directly applied to the PDCP layer corresponding to the bearer identifier of the configuration information.

When the security key-related configuration information or security algorithm is configured in the security configuration information in which the DAPS handover method is indicated or configured in the handover command message, or when there is an indicator indicating a new procedure in the PDCP layer configuration information, a new security key or security configuration information may be derived by using the configuration information, the DAPS handover method proposed in the present disclosure may be performed, the second PDCP layer structure may be applied to maintain the existing security key or security configuration information for the source gNB, and the security key or security configuration information for the target gNB may be configured as the new security key or security configuration information.

When a new logical channel identifier is configured in the RLC layer configuration information of the bearer for which the DAPS handover method is indicated or configured in the handover command message, the DAPS handover method proposed in the present disclosure may be applied, the second PDCP layer structure may be applied to maintain the existing logical channel identifier for the RLC layer or MAC layer for the first bearer for the source gNB corresponding to the bearer identifier indicated in the RLC layer configuration information, and the new logical channel identifier indicated in the configuration information may be configured for the RLC layer or the MAC layer for the second bearer for the target gNB.

The RLC re-establishment procedure may not be performed on the RLC layer for the source gNB with respect to the RLC layer of the bearer for which the DAPS handover method configured in the handover command message is indicated or configured. Specifically, the transmitting RLC layer may continue to transmit the stored data without performing the RLC re-establishment procedure. Also, the receiving RLC layer may continuously process the stored data together with the received data so that a data interruption time does not occur. However, when the first condition proposed in the present disclosure is satisfied, the PDCP layer for which the DAPS handover method is configured may transmit a data discard indicator for PDCP user data (PDCP data PDU) so as to indicate the discard of data (PDCP data PDU) to the RLC layer for the source gNB with respect to the AM bearer or the UM bearer according to the method proposed in the present disclosure. Therefore, the RLC layer for the source gNB discards the PDCP data PDU, but may transmit PDCP control PDU without discarding the PDCP control PDU.

The RLC re-establishment procedure may be performed on the RLC layer of the bearer for which the DAPS handover method configured in the handover command message is not indicated or configured. Alternatively, when the RLC re-establishment procedure is configured, the RLC re-establishment procedure may be performed. That is, specifically, the RLC re-establishment procedure may be performed so that the transmitting RLC layer may perform the procedure for discarding all stored data (PDCP Data PDU or PDCP control PDU). Also, when the reordering timer is running, the receiving RLC layer may stop and initialize the reordering timer, may process all stored data, and may transmit the processed data to the upper layer.

When the RLC layer configuration information of the bearer for which the DAPS handover method is indicated or configured in the handover command message is newly configured, the DAPS handover method proposed in the present disclosure may be performed. The second PDCP layer structure is applied. Thus, for the RLC layer for the first bearer for the source gNB corresponding to the bearer identifier indicated in the RLC layer configuration information, the existing RLC configuration information may be maintained. For the RLC layer for the second bearer for the target gNB, the new RLC layer configuration information indicated in the configuration information may be configured.

Figure 1I:
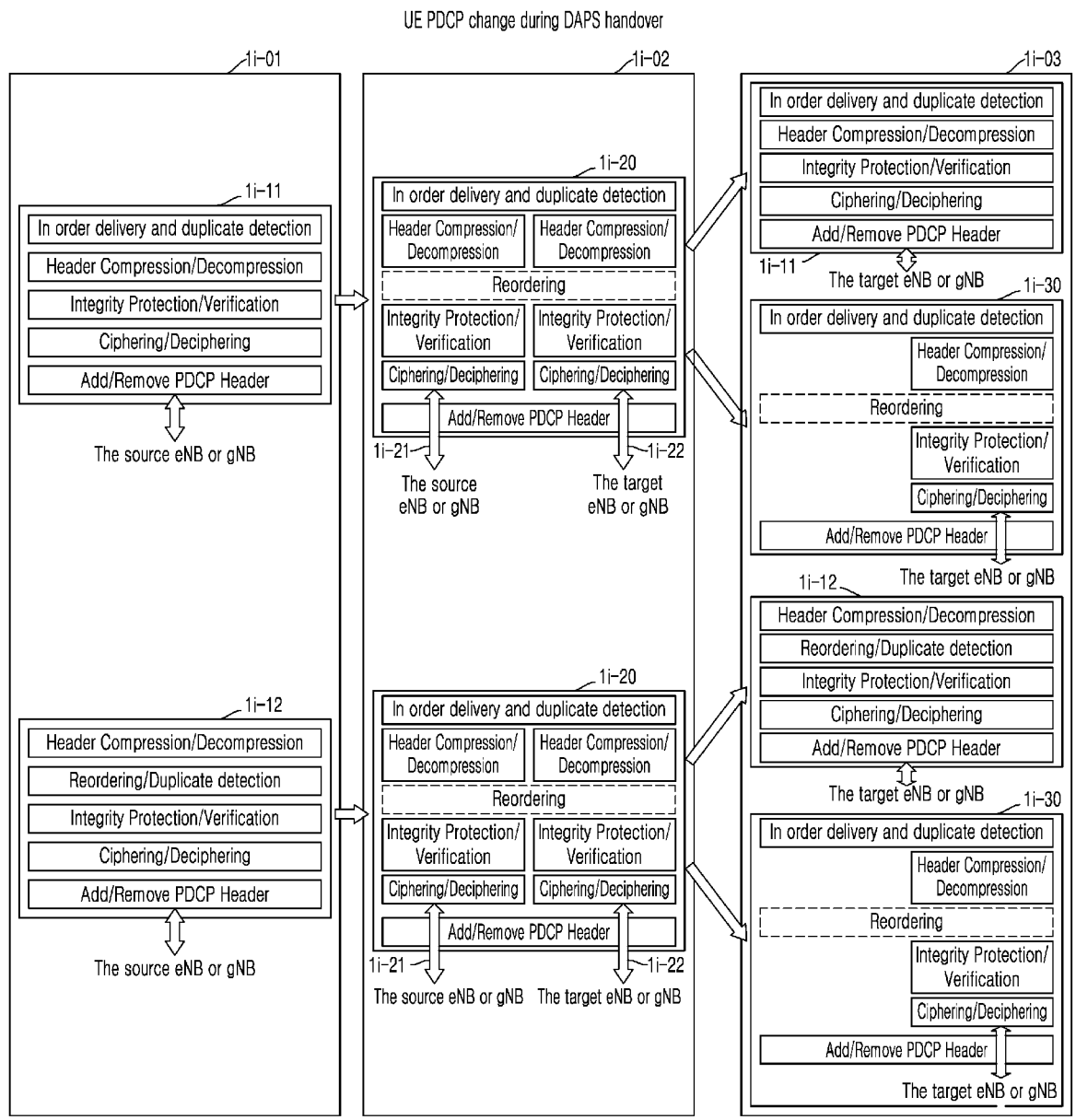
FIG. 1I is a diagram illustrating structures of an efficient packet data convergence protocol (PDCP) layer applied to a dual active protocol stack (DAPS) handover method, which is the second embodiment of the efficient handover method proposed in the present disclosure, and a method of applying the structures.
Figure 1J:
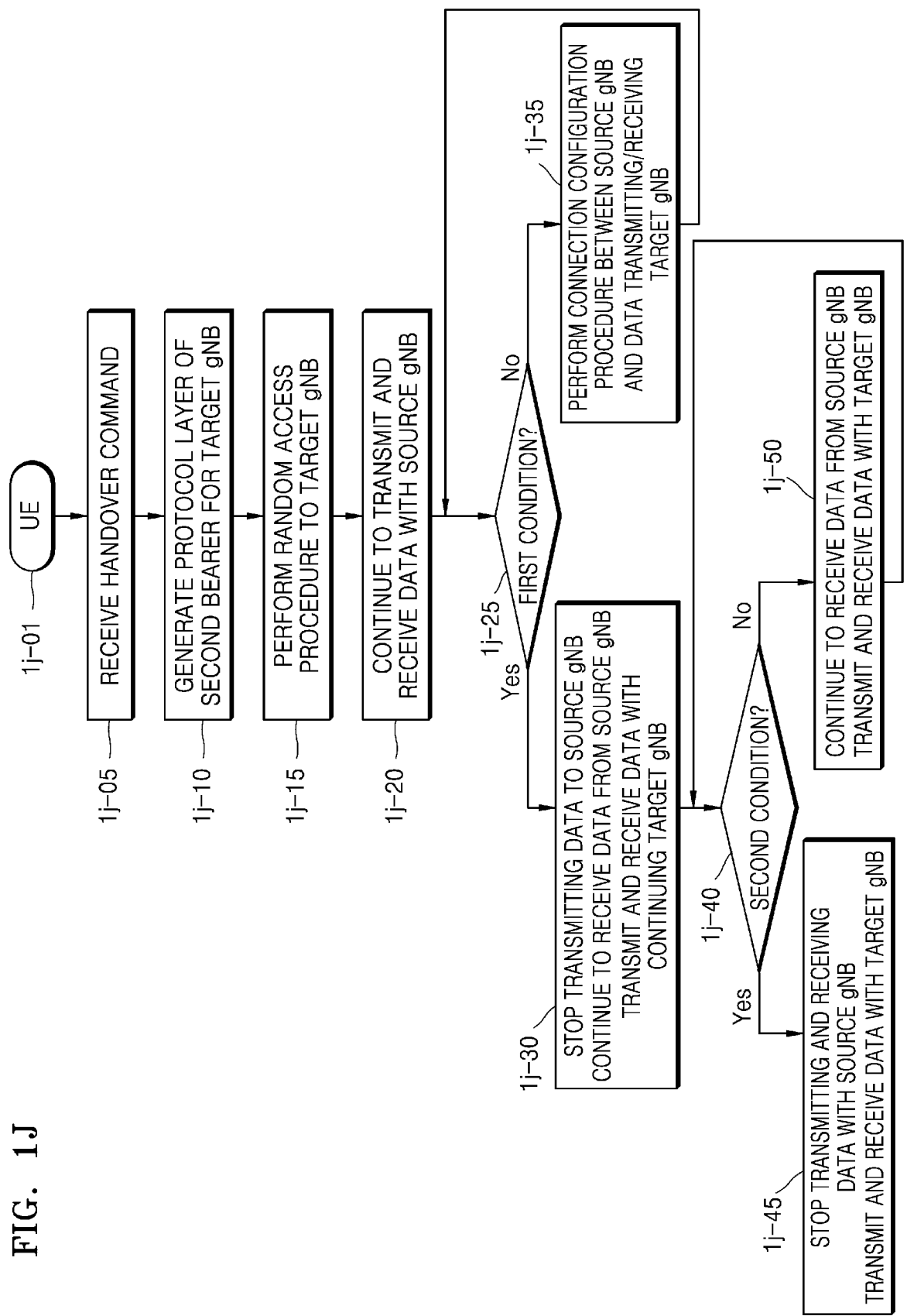
FIG. 1J is a diagram illustrating an operation of a user equipment, according embodiments proposed in the present disclosure.
Figure 1K:
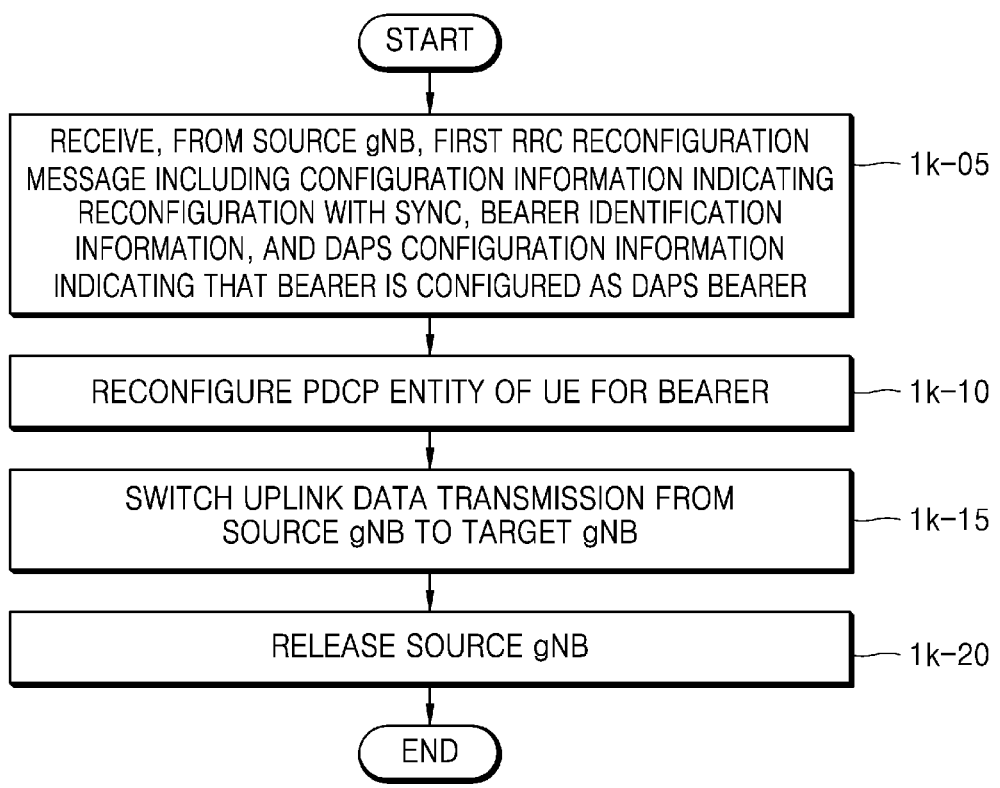
FIG. 1K is a flowchart for describing a method, performed by a user equipment, of managing a protocol layer in DAPS handover according to an embodiment of the disclosure.

Method 1, Method 2, or Method 3 of configuring the MAC layer proposed in FIG. 1K of the present disclosure may be performed.

Method 1, Method 2, or Method 3 of configuring or processing the SRB proposed in FIG. 1H of the present disclosure may be performed When the second priority for the logical channel is newly configured in the MAC layer configuration information configured in the handover command message, the DAPS handover method proposed in the present disclosure may be performed. The second PDCP layer structure may be applied. The existing configuration information may be maintained for the MAC layer for the first bearer for the source gNB corresponding to the indicated bearer identifier, and a new logical channel identifier indicated in the configuration information may be configured for the MAC layer for the second bearer for the target gNB. The newly configured second priority corresponding to the logical channel identifier indicated in the configuration information may be configured. According to another method, when the first condition proposed in the present disclosure is satisfied, the priority may be applied to the MAC layer for the second bearer for the target gNB for each logical channel identifier.

When the second priority bit rate (prioritisedBitRate, PBR) for the logical channel is newly configured in the MAC layer configuration information configured in the handover command message, the DAPS handover method proposed above in the present disclosure may be performed. The second PDCP layer structure may be applied. The existing configuration information may be maintained for the MAC layer for the first bearer for the source gNB corresponding to the indicated bearer identifier, and a new logical channel identifier indicated in the configuration information may be configured for the MAC layer for the second bearer for the target gNB. The newly configured second priority bit rate corresponding to the logical channel identifier indicated in the configuration information may be configured. According to another method, when the first condition proposed in the present disclosure is satisfied, the second priority bit rate may start to be applied to the logical channel identifier in the MAC layer for the second bearer for the target gNB (in this way, when different handover methods are indicated for each bearer, uplink transmission resources may be fairly distributed). The priority bit rate is a value that increases for each logical channel every certain time (for example, TTI) when starting to be applied to each logical channel identifier. When the uplink transmission resource is received, the LCP procedure may be performed, and data for the logical channel may be transmitted considering the priority and the priority bit rate. More data may be transmitted as the priority is higher or the value of the priority bit rate is greater.

Also, in a case where the DAPS handover method is applied, when the first condition proposed in the present disclosure is not yet satisfied, and thus, the UE needs to transmit uplink data through the first bearer for the source gNB, the MAC layer for the first bearer may, when performing the LCP procedure, select only the bearers or logical channel identifiers, for which the DAPS handover method (or the handover method that may continue to transmit data to the source gNB even after receiving the handover command message) is indicated, as the target of the LCP procedure and perform the LCP procedure. For the bearers or logical channel identifiers to which the DAPS handover method is not applied, the uplink data may not be transmitted to the source gNB when the handover command message is received. Thus, the bearers or logical channel identifiers should not be selected as the target of the LCP procedure.

When the second bucket size (bucketSizeDuration) for the logical channel is newly configured in the MAC layer configuration information configured in the handover command message, the DAPS handover method proposed above in the present disclosure may be performed. The second PDCP layer structure may be applied. The existing configuration information may be maintained for the MAC layer for the first bearer for the source gNB corresponding to the indicated bearer identifier. A new logical channel identifier indicated in the configuration information may be configured for the MAC layer for the second bearer for the target gNB. The newly configured second bucket size corresponding to the logical channel identifier indicated in the configuration information may be configured. According to another method, when the first condition proposed in the present disclosure is satisfied, the second bucket size may start to be applied to the logical channel identifier in the MAC layer for the second bearer for the target gNB (in this way, when different handover methods are indicated for each bearer, uplink transmission resources may be fairly distributed). The bucket size indicates the maximum value that the priority bit rate may have when the priority bit rate is accumulated.

When second allowable SCell information, allowable sub-carrier spacing information, maximum PUSCH period, or logical channel group configuration information is configured in the MAC layer configuration information configured in the handover command message, the DAPS handover method proposed in the present disclosure may be performed. The second PDCP layer structure may be applied to maintain the existing configuration information for the MAC layer for the first bearer for the source gNB corresponding to the indicated bearer identifier, and the second allowable SCell information, allowable sub-carrier spacing information, maximum PUSCH period, or logical channel group configuration information indicated in the configuration information may be configured for the MAC layer for the second bearer for the target gNB.

FIG. 1I is a diagram illustrating structures of an efficient PDCP layer applied to a DAPS handover method, which is the second embodiment of the efficient handover method according to an embodiment present disclosure, and a method of applying the structures.

FIG. 1I proposes a specific structure and functions of the efficient PDCP layer applied to the DAPS handover method, which is the second embodiment of the efficient handover method proposed in the present disclosure, and the structures of the PDCP layers proposed below may be applied to different PDCP layer structures for each bearer at different times while performing the DAPS handover procedure.

For example, before the handover command message is received from the gNB, data may be processed, transmitted, or received by applying the first PDCP layer structure and function 1*i*-11 or 1*i*-12 proposed in the present disclosure for each bearer (1*i*-01).

However, when the UE receives the handover command message from the gNB and the DAPS handover method proposed in the present disclosure is indicated in the handover command message, or when the DAPS handover method is indicated for specific bearers, the UE processes, transmits, or receives data by applying the second PDCP layer structure and function 1*i*-20 proposed in the present disclosure to each bearer or the bearers for which the DAPS handover method is indicated (1*i*-02).

That is, when the UE receives the handover command message and the DAPS handover method proposed in the present disclosure is indicated in the handover command message, or when the DAPS handover method is indicated for specific bearers, the UE may switch from the first PDCP layer structure or function 1*i*-11 or 1*i*-12, which has been used for each bearer, to the second PDCP layer structure or function 1*i*-20 proposed in the present disclosure for each bearer or with respect to the bearer for which the DAPS handover method is indicated.

According to another method, when the first condition proposed in the present disclosure is satisfied, the UE may switch from the first PDCP layer structure or function 1*i*-11 or 1*i*-12, which has been used for each bearer, to the second PDCP layer structure or function 1*i*-20 proposed in the present disclosure for each bearer or with respect to the bearer for which the DAPS handover method is indicated (1*i*-02).

Also, when the UE receives the handover command message and the DAPS handover method proposed in the present disclosure is indicated in the handover command message, when the DAPS handover method is indicated for specific bearers, or when the PDCP reordering timer value is newly set, the UE may update the reordering variable with the PDCP sequence number or count value expected to be received next when the UE switches from the first PDCP layer structure or function 1*i*-11 or 1*i*-12 to the second PDCP layer structure or function 1*i*-20 proposed in the present disclosure for each bearer or with respect to the bearer for which the DAPS handover method is indicated, and may stop and restart the reordering timer.

Also, when the second condition proposed in the present disclosure is satisfied while the DAPS handover method proposed in the present disclosure is performed, the UE may release the first bearers for the source gNB, and may switch again from the second PDCP layer structure and function 1*i*-20 applied to each bearer or the bearer for which the DAPS handover method is indicated to the first PDCP layer structure and function 1*i*-11 or 1*i*-12. Also, when the second condition is satisfied and the UE switches from the second PDCP layer structure or function 1*i*-20 to the first PDCP layer structure or function 1*i*-11 or 1*i*-12 proposed in the present disclosure for each bearer or with respect to the bearer for which the DAPS handover method is indicated, the UE may initialize reordering variables and stop and initialize the reordering timer. Also, the UE may perform the deciphering procedure or header (or data) decompression by applying the security key or header decompression context for the source gNB to the data stored in the buffer for reordering (for example, the data received from the source gNB), and may discard the security key or header decompression context for the source gNB. The UE may transmit the processed data to the upper layer in ascending order. That is, when the second condition is satisfied, the UE may perform the deciphering procedure or header (or data) decompression by applying the security key or header decompression context for the source gNB to the data stored in the buffer for reordering (for example, the data received from the source gNB), and may discard the security key or header decompression context for the source gNB.

According to another embodiment, when the second condition proposed in the present disclosure is satisfied while the DAPS handover method proposed in the present disclosure is performed, the UE may release the bearers for the source gNB, and may switch from the second PDCP layer structure and function 1*i*-20 applied to each bearer or with respect to the bearer for which the DAPS handover method is indicated to the third PDCP layer structure and function the 1*i*-30. Also, when the second condition is satisfied and the UE switches from the second PDCP layer structure or function 1*i*-20 to the third PDCP layer structure or function 1*i*-30 proposed in the present disclosure for each bearer or with respect to the bearer for which the DAPS handover method is indicated, the UE may use the reordering variables and the reordering timer without stopping or initializing the reordering variables and the reordering timer.

However, the UE may perform the deciphering procedure or header (or data) decompression by applying the security key or header decompression context for the source gNB to the data stored in the buffer for reordering (for example, the data received from the source gNB), and may discard the security key or header decompression context for the source gNB. The processed data may be transmitted to the upper layer in ascending order. That is, when the second condition is satisfied, the UE may perform the deciphering procedure or header (or data) decompression by applying the security key or header decompression context for the source gNB to the data stored in the buffer for reordering (for example, the data received from the source gNB), and may discard the security key or header decompression context for the source gNB.

As proposed in FIG. 1I of the present disclosure, when the UE may apply the first PDCP layer structure and function 1*i*-11 or 1*i*-12, the second PDCP layer structure and function 1*i*-20, or the third PDCP layer structure and function 1*i*-30 of the first PDCP layer, which is different from each other, for each bearer at different times, and may minimize a data interruption time without data loss when performing handover.

The first PDCP layer structure 1*i*-11 or 1*i*-12 proposed in FIG. 1I may have a (1-1)th PDCP layer structure, a (1-2)th PDCP layer structure, a (1-3)th PDCP layer structure, or a (1-4)th PDCP layer structure proposed below in the present disclosure, and may have the following features.

When the first PDCP layer structure has the (1-1)th PDCP layer structure, the first PDCP layer structure may have the following features.

1> (In the case of the (1-1)th PDCP layer structure) For example, when the UE applies the first PDCP layer structure and function 1*i*-11 to the PDCP layer (for example, E-UTRA PDCP layer or LTE PDCP layer) connected to the AM RLC layer (for example, E-UTRA AM RLC layer), the PDCP layer may have the following features.

2> The PDCP layer may first perform out-of-window data detection or duplicate data detection for the received data. (Because RLC AM has retransmission and the sizes of the LTE RLC SN and the PDCP SN may be different from each other, duplicate data or out-of-window data may be received. The window indicates the area of the PDCP sequence number or count value for which valid data is received.)

3> The PDCP layer performs the deciphering procedure and the header decompression procedure and then discards the out-of-window data or duplicate data. (Because useful information for the header decompression procedure (for example, IR packet or header compression information) may be included, the out-of-window data or duplicate data may be identified and then discarded.)

2> The PDCP layer may directly decipher the received data, which is not discarded, without ordering and may perform the header decompression procedure. This is because the E-UTRA AM RLC layer arranges data in sequence and transmits the data to the PDCP layer.
2> When the PDCP layer transmits the data to the upper layer, the PDCP layer transmits the data in ascending order of count values.

Next, when the first PDCP layer structure has the (1-2)th PDCP layer structure, the first PDCP layer structure may have the following features.

1> (In the case of the (1-2)th PDCP layer structure) For example, when the UE applies the first PDCP layer structure and function 1i-11 to the PDCP layer (for example, E-UTRA PDCP layer or LTE PDCP layer) connected to the UM RLC layer (for example, E-UTRA UM RLC layer), the PDCP layer may have the following features.
  2> The PDCP layer may not perform out-of-window data detection or duplicate data detection. This is because the UM E-UTRA RLC layer does not have a retransmission procedure.
  2> The PDCP layer may directly decipher the received data and may perform the header decompression procedure thereon.
  2> The PDCP layer may perform the reordering procedure and may transmit data to the upper layer (for example, in ascending order).

Next, when the first PDCP layer structure has the (1-3)th PDCP layer structure, the first PDCP layer structure may have the following features.

1> (In the case of the (1-3)th PDCP layer structure) For example, when the UE applies the first PDCP layer structure and function 1i-11 to the PDCP layer (for example, E-UTRA PDCP layer or LTE PDCP layer) configured as a split bearer, a packet duplication bearer, or an LTE WLAN aggregation (LWA) bearer, the reordering procedure and the reordering timer may be always applied, and the PDCP layer may have the following features.
  2> The PDCP layer may first perform out-of-window data detection or duplicate data detection for the received data. (Because RLC AM has retransmission or data may be received from different RLC layers at different times and the sizes of LTE RLC SN and PDCP SN may be different from each other, the out-of-window data or duplicate data may be received.)
    3> The PDCP layer performs the deciphering procedure. However, the header decompression procedure may not be performed. (This is because E-UTRA PDCP is unable to set the header compression protocol for the split bearer or the LWQ bearer.)
    3> The PDCP layer discards data after the integrity protection or verification procedure is performed thereon. When the integrity verification procedure fails, the PDCP layer may discard the data and may report the discard of the data to the upper layer.
    3> The PDCP layer discards out-of-window or duplicate data.
  2> When the data is not discarded, the PDCP layer may directly perform the deciphering procedure on the received data without ordering. When the integrity protection or verification is set, the PDCP layer may perform the integrity verification. The data is discarded after the integrity protection or verification procedure is performed thereon. When the integrity verification procedure fails, the PDCP layer may discard the data and may report the discard of the data to the upper layer.
  2> When the PDCP layer performs the ordering on the received data and arranges the data sequentially and continuously in ascending order without a gap in the PDCP sequence numbers or count values, the PDCP layer may perform the header compression procedure and (when the header compression procedure or the header decompression procedure is configured) may transmit the data to the upper layer in ascending order.
  2> When the reordering timer is running,
    3> when data corresponding to the count value having the same value as the value obtained by subtracting 1 from the value maintained by the reordering variable is transmitted to the upper layer, or when data is all transmitted to the upper layer without a gap in the PDCP sequence number (or count value),
      4> the PDCP layer stops and initializes the reordering timer.
  2> When the reordering timer is not running,
    3> when there is data stored in the buffer without being transmitted to the upper layer, or when there is a gap in the PDCP sequence number (or count value),
      4> the PDCP layer starts the reordering timer.
      4> The PDCP layer updates the reordering variable with the PDCP sequence number or count value expected to be received next.
  2> When the reordering timer has expired,
    3> when the header decompression procedure is configured for the stored data in the ascending order of the PDCP sequence numbers or count values for a value less than the reordering variable value, the PDCP layer performs the header decompression procedure on the data and transmits the data to the upper layer.
    3> When the header decompression procedure is configured for the stored data in the ascending order of the PDCP sequence numbers or count values continuously for the value equal to or greater than the reordering variable value, the PDCP layer may perform the header decompression procedure on the data and transmit the data to the upper layer.
    3> The PDCP layer updates the variable value for the last data transmitted to the upper layer with the PDCP sequence number or count value of the last transmitted data.
    3> When there is data stored in the buffer without being transmitted to the upper layer, or when there is a gap in the PDCP sequence number (or count value),
      4> the PDCP layer starts the reordering timer.
      4> The reordering variable is updated with the PDCP sequence number or count value expected to be received next.

When the first PDCP layer structure has the (1-4)th PDCP layer structure, the first PDCP layer structure may have the following features.

1> (In the case of the (1-4)th PDCP layer structure) For example, when the UE applies the first PDCP layer structure and function 1i-12 to the NR PDCP layer, the reordering procedure and the reordering timer are always applied, and the PDCP layer may have the following features.

2> The PDCP layer may first perform the deciphering procedure on the received data.

2> When the integrity protection or verification procedure is configured, the PDCP layer may perform the integrity protection or verification procedure on the received data, and when the integrity verification procedure fails, the PDCP layer may discard the data and report the discard of the data to the upper layer.

2> The PDCP layer performs out-of-window data detection or duplicate data detection on the received data. (After the deciphering procedure is performed, the out-of-window data detection or duplicate detection is performed. According to another method, only when the integrity protection or verification procedure is configured, the deciphering procedure is performed. When the out-of-window data detection or duplicate detection is performed and the integrity protection or verification procedure is not configured, the deciphering procedure may be performed only on the data that is not discarded after the out-of-window data detection or duplicate detection is performed.)

3> The PDCP layer discards the out-of-window or duplicate data.

2> When the data is not discarded, the PDCP layer may perform the ordering on the received data, and when the data is arranged sequentially and continuously in ascending order without a gap in the PDCP sequence numbers or count values, the PDCP layer may perform the header compression procedure and (when the header compression procedure or the header decompression procedure is configured) may transmit the data to the upper layer in ascending order.

2> When the PDCP layer transmits the data to the upper layer, the PDCP layer transmits the data in the ascending order of count values.

2> When the reordering timer is running,
   3> when data corresponding to the count value having the same value as the value obtained by subtracting 1 from the value maintained by the reordering variable is transmitted to the upper layer, when data is all transmitted to the upper layer without a gap in the PDCP sequence number (or count value), or when the value of the variable storing the PDCP sequence number or count value of the data to be transmitted to the upper layer is greater than or equal to the value of the reordering variable,
      4> the PDCP layer stops and initializes the reordering timer.

2> When the reordering timer is not running,
   3> when there is data stored in the buffer without being transmitted to the upper layer, when there is a gap in the PDCP sequence number (or count value), or when the variable value storing the count value of the first data that is not transmitted to the upper layer is less than the reordering variable value,
      4> the PDCP layer updates the reordering variable with the PDCP sequence number or count value expected to be received next.
      4> The PDCP layer starts the reordering timer.

2> When the reordering timer has expired,
   3> when the header decompression procedure is configured for the stored data in the ascending order of the PDCP sequence numbers or count values for a value less than the reordering variable value, the PDCP layer performs the header decompression procedure on the data and transmits the data to the upper layer.
   3> When the header decompression procedure is configured for the stored data in the ascending order of the PDCP sequence numbers or count values continuously for the value equal to or greater than the reordering variable value, the PDCP layer may perform the header decompression procedure on the data and transmit the data to the upper layer.
   3> The PDCP layer updates the variable value for the first data that is not transmitted to the upper layer is updated with the PDCP sequence number or count value of the first data that is not transmitted to the upper layer.
   3> When there is data stored in the buffer without being transmitted to the upper layer, when there is a gap in the PDCP sequence number (or count value), or when the variable value storing the count value of the first data that is not transmitted to the upper layer is less than the reordering variable value,
      4> the PDCP layer updates the reordering variable with the PDCP sequence number or count value expected to receive next time.
      4> The PDCP layer starts the reordering timer.

The second PDCP layer structure 1*i*-20 proposed in FIG. 1I may have a (2-1)th PDCP layer structure or a (2-2)th PDCP layer structure proposed below in the present disclosure, and may have the following features.

The present disclosure proposes the second PDCP layer structure 1*i*-20 that is efficient in handover. The second PDCP layer structure may be applied to the second embodiment of the efficient handover method of minimizing the data interruption time proposed in the present disclosure.

In the second PDCP layer structure, the UE may perform data transmission or reception with the source gNB 1*i*-21 through protocol layers for the first bearer (for example, an SDAP layer, a PDCP layer, an RLC layer, or a MAC layer). The UE may perform data transmission or reception with the target gNB 1*i*-22 through protocol layers for the second bearer (for example, an SDAP layer, a PDCP layer, an RLC layer, or a MAC layer).

The PDCP layer for the first bearer and the PDCP layer for the second bearer may be configured in the UE, but may operate as a logically single PDCP layer entity, as in 1*i*-20. Specifically, the single PDCP layer may divide the functions of the PDCP layer to implement the functions of an upper PDCP layer (for example, a sequence number allocation function, a reordering function, an in-sequence delivery function, or a duplicate detection function) and the functions of two lower PDCP layers for each source gNB and each target gNB (for example, a deciphering or ciphering function, a header (or data) compression or header (or data) decompression function, an integrity protection or verification function, or a duplicate detection function). Also, as proposed above, in the DAPS handover method, when the UE satisfies the first condition while transmitting uplink data to the source gNB, the UE may switch to the target gNB, and downlink data may be continuously received from the source gNB and the target gNB. Therefore, the header (or data) compression protocol context may maintain and apply only one context for the source gNB or the target gNB for the uplink, and may maintain and apply two contexts for the source gNB or the target gNB for the downlink.

Based on the second PDCP layer structure proposed above, the second PDCP layer structure (for example, the E-UTRA PDCP layer for the DAPS handover method) proposed in the present disclosure may have the following features.

The upper transmitting PDCP layer function may allocate the PDCP sequence number to data received from the upper layer. The two lower transmitting PDCP layer functions 1*i*-21 and 1*i*-22 for each source gNB and each target gNB may use a separate security key set with each source gNB and each target gNB to apply the header (or data) compression context or security key set with the source gNB to data to be transmitted to the source gNB and to apply the header (or data) compression context or security key set with the target gNB to data to be transmitted to the target gNB. When the header (or data) compression procedure is configured, the header (or data) compression procedure is applied. When the integrity protection is configured, the lower transmitting PDCP layer functions 1*i*-21 and 1*i*-22 may apply the integrity protection procedure to the PDCP header and data (PDCP SDU), may apply the ciphering procedure, may transmit, to the transmitting RLC layer for the first bearer, data to be transmitted to the source gNB, and may transmit, to the transmitting RLC layer for the second bearer, data to be transmitted to the target gNB.

The two lower transmitting PDCP layer functions 1*i*-21 and 1*i*-22 may perform parallel data processing in which the header compression, integrity protection, or ciphering procedure is performed in parallel so as to accelerate the data processing speed. Also, the two lower transmitting PDCP layer functions 1*i*-21 and 1*i*-22 may perform the integrity protection or ciphering procedure by using different security keys in the two lower transmitting PDCP layer functions. Also, different data compression, integrity protection, or ciphering procedures may be performed by applying different compression contexts, security keys, or security algorithms within the logically single transmitting PDCP layer.

For data received from each lower layer, specifically, for data received from two RLC layers for each source gNB and each target gNB, the receiving PDCP layer function (that is, the lower receiving PDCP layer functions 1*i*-21 and 1*i*-22 for the source gNB or the target gNB) may independently perform the out-of-window data detection or duplicate detection procedure on data received from each RLC layers based on the PDCP sequence number or count value. According to another method, for convenience of implementation, the receiving PDCP layer function may perform the out-of-window data detection or duplicate detection procedure on all received data based on the PDCP sequence number or count value without distinguishing the RLC layers.

According to another method, for more accurate duplicate detection, the receiving PDCP layer function may perform the out-of-window data detection on all received data based on the PDCP sequence number or count value without distinguishing the RLC layers, and may independently perform the duplicate detection procedure on data received from each RLC layer. According to another method, when data received from different gNBs overlap each other, the receiving PDCP layer function may perform the out-of-window data detection on all received data based on the PDCP sequence number or count value without distinguishing the RLC layers in order to prevent data loss for the header compression protocol. Also, after performing the deciphering procedure, the integrity protection procedure, or the header (or data) decompression procedure on data received from each RLC layer, the receiving PDCP layer function may perform the duplicate detection procedure on the entire data.

The lower functions of the receiving PDCP layer may directly apply the deciphering procedure on the received data by using a separate header (or data) compression context or security key set with each source gNB and each target gNB, and when the integrity protection is configured, may apply the integrity verification procedure to the PDCP header and data (PDCP SDU).

In the (2-1)th PDCP layer structure, the header (or data) decompression procedure may be performed directly on the data received from the RLC layers for the first bearer for each source gNB without ordering. Also, the header (or data) decompression procedure may be performed directly on the data received from the RLC layers for the second bearer for each target gNB without ordering. Also, in order to distinguish between the data received from the RLC layers for the first bearer for each source gNB and the data received from the RLC layers for the second bearer for each target gNB, an indicator may be defined for each data so that the PDCP layer determines whether the data is received from the source gNB or the data is received from the target gNB. According to another method, a 1-bit indicator of a PDCP header, an SDAP header, or an RLC header may be defined so that the PDCP layer determines whether the data is received from the source gNB or the data is received from the target gNB. Also, for the data received from the RLC layers for the first bearer for the source gNB that has completed the header (or data) compression procedure and the data received from the RLC layers for the second bearer for the target gNB, the PDCP layer may perform the duplicate detection procedure (the procedure for discarding all but one data (applicable including data previously received or transmitted to the upper layer) for each PDCP sequence number or count value) based on the PDCP sequence number or count value. For the data received from the RLC layers for the first bearer for the source gNB and the data received from the RLC layers for the second bearer for the target gNB, the PDCP layer may perform the reordering procedure in ascending order based on the PDCP sequence number or count value, and may sequentially transmit the data to the upper layer. Because the single PDCP layer may receive data from different gNBs, that is, the first bearer or the second bearer, in any order, it may be necessary to always perform the reordering procedure.

The two lower receiving PDCP layer functions may perform parallel data processing of performing the header compression, integrity protection, or ciphering procedure in parallel so as to accelerate the data processing speed based on the PDCP sequence number or count value. Also, the two lower receiving PDCP layer functions may perform the integrity protection or ciphering procedure or the decompression procedure by using different header (or data) compression contexts or security keys. Also, the two lower receiving PDCP layer functions may perform different integrity protection or ciphering procedures or decompression procedures on data by applying different header (or data) compression contexts or security keys or security algorithms within a logically single transmitting PDCP layer. Also, the lower receiving PDCP layer functions may perform the out-of-sequence deciphering or integrity verification procedure on each received data regardless of the order of the PDCP sequence number or count value.

Considering that the layers for the first bearer and the layers for the second bearer are connected to different MAC layers, considering that the layers for the first bearer and the layers for the second bearer have different logical channel identifiers or that the layers for the first bearer and the layers for the second bearer are different RLC layers connected to different MAC layers, or considering that different encryption keys are used, the single PDCP layer may distinguish between the layers for the first bearer (or the first RLC layer) and the layers for the second bearer (or the second RLC layer). In this manner, the single PDCP layer may perform the ciphering or deciphering procedure with different security keys for uplink data and downlink data, and may perform compression or decompression by using different compression protocol contexts.

Based on the second PDCP layer structure proposed above, the (2-2)th PDCP layer structure (for example, the NR PDCP layer for the DAPS handover method) proposed in the present disclosure may have the following features.

The upper transmitting PDCP layer function may allocate the PDCP sequence number to data received from the upper layer. Also, the two lower transmitting PDCP layer functions 1$i$-21 and 1$i$-22 for each source gNB and each target gNB may use a separate security key set with each source gNB and each target gNB to apply the header (or data) compression context or security key set with the source gNB to data to be transmitted to the source gNB and to apply the header (or data) compression context or security key set with the target gNB to data to be transmitted to the target gNB. When the header (or data) compression procedure is configured, the header (or data) compression procedure may be applied. Also, when the integrity protection is configured, the lower transmitting PDCP layer functions 1$i$-21 and 1$i$-22 may apply the integrity protection procedure to the PDCP header and data (PDCP SDU), may apply the ciphering procedure, may transmit, to the transmitting RLC layer for the first bearer, data to be transmitted to the source gNB, and may transmit, to the transmitting RLC layer for the second bearer, data to be transmitted to the target gNB.

The two lower transmitting PDCP layer functions 1$i$-21 and 1$i$-22 may perform parallel data processing in which the header compression, integrity protection, or ciphering procedure is performed in parallel so as to accelerate the data processing speed. Also, the two lower transmitting PDCP layer functions may perform the integrity protection or ciphering procedure by using different security keys. Also, different data compression, integrity protection, or ciphering procedures may be performed by applying different compression contexts, security key, or security algorithms within the logically single transmitting PDCP layer.

For data received from each lower layer, specifically, for data received from two RLC layers for each source gNB and each target gNB, the receiving PDCP layer function (that is, the lower receiving PDCP layer functions 1$i$-21 and 1$i$-22 for the source gNB or the target gNB) may independently perform the out-of-window data detection or duplicate detection procedure on data received from each RLC layers based on the PDCP sequence number or count value. According to another method, for convenience of implementation, the receiving PDCP layer function may perform the out-of-window data detection or duplicate detection procedure on all received data based on the PDCP sequence number or count value without distinguishing the RLC layers.

According to another method, for more accurate duplicate detection, the receiving PDCP layer function may perform the out-of-window data detection on all received data based on the PDCP sequence number or count value without distinguishing the RLC layers, and may independently perform the duplicate detection procedure on data received from each RLC layer. According to another method, when data received from different gNBs overlap each other, the receiving PDCP layer function may perform the out-of-window data detection on all received data based on the PDCP sequence number or count value without distinguishing the RLC layers in order to prevent data loss for the header compression protocol. Also, after performing the deciphering procedure, the integrity protection procedure, or the header (or data) decompression procedure on data received from each RLC layer, the receiving PDCP layer function may perform the duplicate detection procedure on the entire data.

The lower functions of the receiving PDCP layer may directly apply the deciphering procedure on the received data by using a separate header (or data) compression context or security key set with each source gNB and each target gNB, and when the integrity protection is configured, may apply the integrity verification procedure to the PDCP header and data (PDCP SDU).

In the (2-2)th PDCP layer structure, after the reordering procedure is performed on the data received from the RLC layers for the first bearer for each source gNB and the data received from RLC layers for the second bearer for each target gNB, the header (or data) decompression procedure may be performed by applying the header (or data) compression context of each gNB (the source gNB or the target gNB) for each data received from each gNB (the source gNB or the target gNB) in the ascending order of PDCP sequence number or count value. Also in order to distinguish between the data received from the RLC layers for the first bearer for each source gNB and the data received from the RLC layers for the second bearer for each target gNB, an indicator may be defined for each data so that the PDCP layer determines whether the data is received from the source gNB or the data is received from the target gNB. According to another method, a 1-bit indicator of a PDCP header, an SDAP header, or an RLC header may be defined so that the PDCP layer determines whether the data is received from the source gNB or the data is received from the target gNB. Also, for the data received from the RLC layers for the first bearer for the source gNB that has completed the header (or data) compression procedure and the data received from the RLC layers for the second bearer for the target gNB, the PDCP layer may perform the duplicate detection procedure (the procedure for discarding all but one data (applicable including data previously received or transmitted to the upper layer) for each PDCP sequence number or count value) based on the PDCP sequence number or count value. For the data received from the RLC layers for the first bearer for the source gNB and the data received from the RLC layers for the second bearer for the target gNB, the PDCP layer may sequentially transmit data to the upper layer in ascending order based on the PDCP sequence number or count value. Because the single PDCP layer may receive data from different gNBs, that is, the first bearer or the second bearer, in any order, it may be necessary to always perform the reordering procedure.

The two lower receiving PDCP layer functions may perform parallel data processing of performing the header compression, integrity protection, or ciphering procedure in parallel so as to accelerate the data processing speed based on the PDCP sequence number or count value. Also, the two lower receiving PDCP layer functions may perform the integrity protection or ciphering procedure or the decompression procedure by using different header (or data) compression contexts or security keys. Also, the two lower receiving PDCP layer functions may perform different integrity protection or ciphering procedures or decompression procedures on data by applying different header (or data) compression contexts or security keys or security algorithms within a logically single transmitting PDCP layer. Also, the lower receiving PDCP layer functions may perform the out-of-sequence deciphering or integrity verification procedure on each received data regardless of the order of the PDCP sequence number or count value.

Considering that the layers for the first bearer and the layers for the second bearer are connected to different MAC layers, considering that the layers for the first bearer and the layers for the second bearer have different logical channel identifiers or that the layers for the first bearer and the layers for the second bearer are different RLC layers connected to different MAC layers, or considering that different encryption keys are used, the single PDCP layer may distinguish between the layers for the first bearer (or the first RLC layer) and the layers for the second bearer (or the second RLC layer). In this manner, the single PDCP layer may perform the ciphering or deciphering procedure with different security keys for uplink data and downlink data, and may perform compression or decompression by using different compression protocol contexts.

The present disclosure proposes the third PDCP layer structure 1i-30 that is efficient in handover. The third PDCP layer structure may be applied to the second embodiment of the efficient handover method of minimizing the data interruption time proposed in the present disclosure. Also the PDCP layer function in the third PDCP layer structure proposed in the present disclosure may be the same as the second PDCP layer structure proposed in the present disclosure.

However, the third PDCP layer structure may have a structure in which the first bearer for the source gNB is released in the second PDCP layer structure. Specifically, the third PDCP layer structure proposed in the present disclosure has the same function as the second PDCP layer structure, but may have a structure in which the first bearer for the source gNB (for example, the SDAP layer, the PDCP layer, the RLC layer, or the MAC layer) is released. Therefore, the third PDCP layer structure may release QoS mapping information of the SDAP layer for the source gNB, security key information for the source gNB of the PDCP layer, header (or data) compression context information for the source gNB, or the RLC layer or MAC layer for the source gNB.

FIG. 1J is a diagram illustrating the operation of the UE that is applicable to the embodiments proposed in the present disclosure.

In FIG. 1J, the UE 1j-01 may transmit or receive data with the source gNB through the first PDCP layer structure for each bearer. However, when the handover command message is received (1j-05) and the DAPS handover method of the second embodiment proposed in the present disclosure is indicated in the handover command message, when the DAPS handover method is indicated for each bearer, or when the UE switches to the second PDCP layer for each bearer or the bearers for which the DAPS handover method is indicated with respect to the target gNB indicated in the handover command message and configures and establishes the protocol layers for the second bearer and the random access procedure is performed to the target gNB through the established protocol layers (1j-10, 1j-15), the UE may continue to transmit or receive data (uplink data transmission and downlink data reception) with the source gNB through the protocol layers for the first bearer (1j-20).

When the first condition is satisfied (1j-25), the UE may stop transmitting uplink data to the source gNB through the protocol layers for the first bearer, and may switch uplink data transmission to transmit uplink data to the target gNB through the protocol layers for the second bearer. Also, the UE may continue to receive downlink data from the source gNB and the target gNB through the protocol layers for the first bearer and the second bearer (1j-30). Also, the PDCP layer for the second bearer may continue to perform seamless data transmission or reception with the target gNB by using information such as transmission or reception data, sequence number information, or header compression and decompression context, which is stored in the PDCP layer for the first bearer. When the first condition is not satisfied, the first condition may be continuously checked while continuously performing the procedure that has been previously being performed (1j-35).

Also, when the second condition is satisfied, the UE may stop receiving downlink data from the source gNB through the protocol layers for the first bearer (1j-45). Also, the PDCP layer for the second bearer may continue to perform seamless data transmission or reception with the target gNB by using information such as transmission or reception data, sequence number information, or header compression and decompression context, which is stored in the PDCP layer for the first bearer. When the second condition is not satisfied, the second condition may be continuously checked while continuously performing the procedure that has been previously being performed (1j-50).

According to an embodiment of the present disclosure, the PDCP layer may perform different procedures according to the type of the handover indicated in the handover command message received by the UE as follows.

When the type of the handover indicated in the handover command message that the UE receives from the source gNB indicates the handover of the first embodiment (for example, the normal handover procedure), when the UE receives the handover command message and the first handover method (for example, the first embodiment of the present disclosure or the normal handover method) is indicated in the handover command message, ReconfigWithSync information, or MobilityControlInfo information, when the second embodiment (DAPS handover method) proposed in the present disclosure is not configured, when the second embodiment (DAPS handover method) proposed in the present disclosure is not configured for any bearer in the bearer configuration information, or for the bearer for which the second embodiment (DAPS handover method) proposed in the present disclosure is not configured in the bearer configuration information, the UE may perform the PDCP layer re-establishment procedure (PDCP re-establishment) to the PDCP layer for each bearer. For example, the UE may initialize window state variables for SRB and may discard the stored data (PDCP SDU or PDCP PDU). Also, the UE may initialize window state variables for UM DRB and may perform transmission or retransmission by performing compression, ciphering, or integrity protection on data that has not yet been transmitted to the lower layer or data for which the PDCP discard timer has not expired, in ascending order of count values, based on the header (or data) compression context or security key of the target gNB. Also, when the reordering timer is running, the UE may stop and initialize the reordering timer, may process the received data (PDCP SDU or PDCP PDU) in sequence, and may transmit the processed data to the upper layer. Also, for AM DRB, the UE may not initialize window state variables, and may perform transmission or retransmission by performing compression, ciphering, or integrity protection based on the header (or data) compression context or security key in ascending order of PDCP sequence number or count value from the first data (PDCP SDU or PDCP PDU) for which successful delivery is not confirmed from the lower layer. Also, the receiving PDCP layer may process the data received due to the re-establishment procedure of the lower layer. When there is no indicator (drb-Continue ROHC) to continuously use the header compression context for AM DRBs, the receiving PDCP layer may perform the header decompression procedure on the stored data based on the header compression context (ROHC). Also, the receiving PDCP layer may process the data received due to the re-establishment procedure of the lower layer, and may perform the header decompression procedure on the stored data for AM DRBs based on the EHC. According to another method, the receiving PDCP layer may process the data received due to the re-establishment procedure of the lower layer. When there is no indicator (drb-Continue EHC) to continuously use the header compression context for AM DRBs, the receiving PDCP layer may perform the header decompression procedure on the stored data based on the EHC.

When the type of the handover indicated in the handover command message that the UE receives from the source gNB indicates the handover of the second embodiment (or when indicated for each bearer), when the UE receives the handover command message and the second embodiment (DAPS handover method) proposed in the present disclosure is configured in the handover command message, ReconfigWithSync information, or MobilityControlInfo information, when the second embodiment (DAPS handover method) proposed in the present disclosure is configured for a certain bearer in the bearer configuration information, when the second embodiment (DAPS handover method) proposed in the present disclosure is configured in the bearer configuration information for at least one bearer, or for the bearer for which the second embodiment (DAPS handover method) proposed in the present disclosure is configured in the bearer configuration information, the PDCP layer which receives the handover command message and for which the DAPS handover method is indicated may perform the following procedures without performing the PDCP re-establishment procedure. For example, for SRB, the PDCP layer may initialize window state variables (the variable initialization may be omitted for fallback when the DAPS handover fails), and may discard the stored data (PDCP SDU or PDCP PDU). For UM DRB, the PDCP layer may continue to perform data transmission or reception with the source gNB with respect to data that has not yet been transmitted to the lower layer or data for which the PDCP discard timer has not expired, without initializing the window state variables. Also, for AM DRB, the PDCP layer may continue to perform data transmission or reception with the source gNB, without initializing the window state variables. Also, the PDCP layer may use the uplink or downlink ROHC context for the source gNB as it is, without initializing the uplink or downlink ROHC context for the source gNB, may initialize the uplink or downlink ROHC context for the target gNB, and may start in an initial state (for example, IR state in U mode). According to another method, the PDCP layer may initialize the uplink or downlink ROHC context for the source gNB, may start in the initial state (for example, the IR state of the U mode), may initialize the uplink or downlink ROHC context for the target gNB, and may start in the initial state (for example, the IR state of the U mode).

The UE may perform the procedures proposed in the present disclosure when the first condition is satisfied for each bearer (or the bearer for which the second embodiment is indicated).

The UE may perform the procedures proposed in the present disclosure when the second condition is satisfied for each bearer (or the bearer for which the second embodiment is indicated).

When the source gNB indicates, to the UE, the handover to which the embodiments proposed in disclosure are applied, the source gNB may start data forwarding to the target gNB when the following third condition is satisfied. The third condition may mean satisfying one or more of the following conditions.

When the source gNB receives, from the target gNB, an indication indicating that the UE has successfully completed handover, when the source gNB transmits the handover command message to the UE, when the source gNB transmits the handover command message to the UE and confirms the successful delivery of the handover command message (HARQ ACK or NACK or RLC ACK or NACK), when the source gNB receives, from the UE, an indication indicating the release of the connection with the source gNB (for example, an RRC message (e.g., RRCReconfiguration message), MAC CE, RLC control PDU, or PDCP control PDU), when a certain timer has expired by transmitting the handover command message to the UE and driving the timer, and when the confirmation (HARQ ACK or NACK, or RLC ACK or NACK) information for successful delivery of downlink data is not received from the UE for a certain time.

The present disclosure proposes a condition in which, when the gNB indicates the first embodiment (normal handover method) or the second embodiment (DAPS handover method) proposed above in the present disclosure to the UE with the RRC message (for example, the handover command message), or when indicated for each bearer (or for each logical channel) of the UE, the UE performs the handover procedure according to the first embodiment or the second embodiment proposed in the present disclosure and triggers the PDCP status report, and a method by which the LTE or NR PDCP layer connected to the AM DRB (the RLC layer operating in the AM mode) or the LTE or NR PDCP layer connected to the UM DRB (the RLC layer operating in the UM mode) generates and configures the triggered PDCP status report.

According to an embodiment, when the PDCP layer for each bearer satisfies one of the following conditions, the PDCP layer may trigger, generate, configure the PDCP status report and transmit the PDCP status report to the lower layer. The operations proposed below may be applied to the PDCP layer of the UE or the gNB.

For the LTE or NR PDCP layer connected to the AM DRB or the RLC layer operating in the AM mode, when configured to trigger or transmit the PDCP status report by the upper layer (RRC layer) (or whether to trigger the PDCP status report is configured with an indicator (for example, status Report Required) in the RRC message), or when configured to trigger or transmit the PDCP status report for the bearer (or PDCP layer) configured for DAPS handover, when the UE receives the RRC message (for example, the handover message) from the gNB, the gNB indicates to the UE the handover method corresponding to the first embodiment, and the PDCP re-establishment procedure is indicated to the LTE or NR PDCP layer connected to the AM DRB (the RLC layer operating in the AM mode), when the second embodiment (DAPS handover method) proposed in the present disclosure is not configured, when the second embodiment (DAPS handover method) proposed in the present disclosure is not configured for the bearer in the bearer configuration information, or when the upper layer (for example, RRC layer) of the UE indicates the PDCP re-establishment procedure to the LTE or NR PDCP layer connected to the AM DRB (the RLC layer operating in the AM mode) of the UE, the LTE or NR PDCP layer connected to the AM DRB (the RLC layer operating in the AM mode) may trigger and configure the PDCP status report and transmit the PDCP status report to the target gNB or the source gNB.

When the UE receives the RRC message (for example, the handover message) from the gNB and the gNB indicates to the UE the handover method corresponding to the first embodiment, when the second embodiment (DAPS handover method) proposed in the present disclosure is not configured, when the second embodiment (DAPS handover method) proposed in the present disclosure is not configured for the bearer in the bearer configuration information, when the PDCP data recovery procedure is indicated to the LTE or NR PDCP layer connected to the AM DRB (the RLC layer operating in the AM mode), or when the upper layer (for example, the RRC layer) of the UE indicates the PDCP data recovery procedure to the LTE or NR PDCP layer connected to the AM DRB (the RLC layer operating in the AM mode) of the UE, the LTE or NR PDCP layer connected to the AM DRB (the RLC layer operating in the AM mode) may trigger and configure the PDCP status report and transmit the PDCP status report to the target gNB or the source gNB.

In the RRC message (for example, the handover message) that the UE receives from the gNB, when the handover method (DAPS handover method) corresponding to the second embodiment is indicated for the UE or each bearer of the UE and the DAPS handover method (or the procedure proposed as an indicator in the present disclosure) is indicated to the LTE or NR PDCP layer connected to the AM DRB (the RLC layer operating in the AM mode), or when the upper layer (for example, the RRC layer) of the UE indicates the DAPS handover method (or the procedure indicated as an indicator in the present disclosure) to the LTE or NR PDCP layer connected to the AM DRB (the RLC layer operating in the AM mode) of the UE, the LTE or NR PDCP layer connected to the AM DRB (the RLC layer operating in the AM mode) may trigger and configure the PDCP status report and transmit the PDCP status report to the source gNB or the target gNB. When the DAPS handover method is indicated, the source gNB transmit the handover command message to the UE with respect to data of the bearer for which the DAPS handover method is indicated and may immediately start downlink or uplink data forwarding to the target gNB. Therefore, unnecessary data forwarding may be prevented as long as the UE transmits the PDCP status report (indicating whether downlink data is successfully received) to the source gNB with respect to downlink data.

In the RRC message (for example, the handover message) that the UE receives from the gNB, when the handover method (DAPS handover method) corresponding to the second embodiment is indicated for the UE or each bearer of the UE and the DAPS handover method (or the procedure proposed as an indicator in the present disclosure) is configured in the LTE or NR PDCP layer connected to the AM DRB (the RLC layer operating in the AM mode), when the first condition proposed in the present disclosure is satisfied, the lower layer (the MAC layer) or the upper layer (when the first timer of the RRC layer is stopped) transmits an indicator (for example, an indicator indicating uplink data transmission switching) to the PDCP layer, and the PDCP layer receives the indicator, when the first condition proposed in the present disclosure is satisfied, or when the first condition is satisfied, the lower layer (the MAC layer) or the upper layer (when the first timer of the RRC layer is stopped) transmits an indicator (for example, an indicator indicating uplink data transmission switching) to the PDCP layer, and the PDCP layer receives the indicator, the LTE or NR PDCP layer connected to the AM DRB (the RLC layer operating in the AM mode) may trigger and configure the PDCP status report and transmit the PDCP status report to the source gNB or the target gNB. When the PDCP layer switches uplink data transmission, the UE may transmit the PDCP status report (or new PDCP control data) to the source gNB or the target gNB to indicate to the source gNB or the target gNB that the PDCP layer corresponding to the bearer of the UE has switched the uplink data transmission. Because the source gNB or the target gNB may identify the time when the UE satisfies the first condition, the source gNB or the target gNB may manage the transmission source of the UE by reflecting, to the scheduling, the time when the UE satisfies the first condition. According to another method, in order for the source gNB or the target gNB to identify the time when the UE satisfies the first condition, a new MAC CE may be transmitted, an existing MAC CE (for example, a buffer status report with a special value) may be transmitted, a 1-bit indicator of a MAC header, an RLC header, or a PDCP header may be defined, configured, and transmitted, or new RLC control data or PDCP control data may be defined and transmitted.

In the RRC message (for example, the handover message) that the UE receives from the gNB, when the handover method (DAPS handover method) corresponding to the second embodiment is indicated for the UE or each bearer of the UE and the DAPS handover method (or the procedure proposed as an indicator in the present disclosure) is configured in the LTE or NR PDCP layer connected to the AM DRB (the RLC layer operating in the AM mode), when the second condition proposed in the present disclosure is satisfied, the lower layer (the MAC layer) or the upper layer (the RRC layer) transmits an indicator (for example, an indicator indicating to release the connection with the source gNB) to the PDCP layer, and the PDCP layer receives the indicator, when the second condition proposed in the present disclosure is satisfied, or when the second condition is satisfied, the lower layer (the MAC layer) or the upper layer (the RRC layer) transmits an indicator (for example, an indicator indicating to release the connection with the source gNB) to the PDCP layer, and the PDCP layer receives the indicator, the LTE or NR PDCP layer connected to the AM DRB (the RLC layer operating in the AM mode) may trigger and configure the PDCP status report and transmit the PDCP status report to the source gNB or the target gNB. When the PDCP layer releases the source gNB, the UE may transmit the PDCP status report (or new PDCP control data) to the source gNB or the target gNB to indicate to the source gNB or the target gNB that the UE has released the connection with the source gNB. Because the source gNB or the target gNB may identify the time when the UE satisfies the second condition, the source gNB or the target gNB may manage the transmission source of the UE by reflecting, to the scheduling, the time when the UE satisfies the second condition.

For the LTE or NR PDCP layer connected to the UM DRB or the RLC layer operating in the UM mode, when configured to trigger or transmit the PDCP status report by the upper layer (RRC layer) (or whether to trigger the PDCP status report is configured with an indicator (for example, status Report Required) in the RRC message), or when configured to trigger or transmit the PDCP status report for the bearer (or PDCP layer) configured for DAPS handover, In the RRC message (for example, the handover message) that the UE receives from the gNB, when the handover method (DAPS handover method) corresponding to the second embodiment is indicated for the UE or each bearer of the UE and the DAPS handover method (or the procedure proposed as an indicator in the present disclosure) is indicated to the LTE or NR PDCP layer connected to the UM DRB (the RLC layer operating in the UM mode), or when the upper layer (for example, the RRC layer) of the UE indicates the DAPS handover method (or the procedure indicated as an indicator in the present disclosure) to the LTE or NR PDCP layer connected to the UM DRB (the RLC layer operating in the UM mode) of the UE, the LTE or NR PDCP layer connected to the UM DRB (the RLC layer operating in the UM mode) may trigger and configure the PDCP status report and transmit the PDCP status report to the source gNB or the target gNB. When the DAPS handover method is indicated, the source gNB transmit the handover command message to the UE with respect to data of the bearer for which the DAPS handover method is indicated and may immediately start downlink or uplink data forwarding to the target gNB. Therefore, unnecessary data forwarding may be prevented as long as the UE transmits the PDCP status report (indicating whether downlink data is successfully received) to the source gNB with respect to downlink data.

In the RRC message (for example, the handover message) that the UE receives from the gNB, when the handover method (DAPS handover method) corresponding to the second embodiment is indicated for the UE or each bearer of the UE and the DAPS handover method (or the procedure proposed as an indicator in the present disclosure) is configured in the LTE or NR PDCP layer connected to the UM DRB (the RLC layer operating in the UM mode), when the first condition proposed in the present disclosure is satisfied, when the first condition proposed in the present disclosure is satisfied, the lower layer (the MAC layer) or the upper layer (when the first timer of the RRC layer is stopped) transmits an indicator (for example, an indicator indicating uplink data transmission switching) to the PDCP layer, and the PDCP layer receives the indicator, when the first condition proposed in the present disclosure is satisfied, the lower layer (the MAC layer) or the upper layer (when the first timer of the RRC layer is stopped) transmits an indicator (for example, an indicator indicating uplink data transmission switching) to the PDCP layer, and the PDCP layer receives the indicator, the LTE or NR PDCP layer connected to the UM DRB (the RLC layer operating in the UM mode) may trigger and configure the PDCP status report and transmit the PDCP status report to the source gNB or the target gNB. When the PDCP layer switches uplink data transmission, the UE may transmit the PDCP status report (or new PDCP control data) to the source gNB or the target gNB to indicate to the source gNB or the target gNB that the PDCP layer corresponding to the bearer of the UE has switched the uplink data transmission. Because the source gNB or the target gNB may identify the time when the UE satisfies the first condition, the source gNB or the target gNB may manage the transmission source of the UE by reflecting, to the scheduling, the time when the UE satisfies the first condition.

In the RRC message (for example, the handover message) that the UE receives from the gNB, when the handover method (DAPS handover method) corresponding to the second embodiment is indicated for the UE or each bearer of the UE and the DAPS handover method (or the procedure proposed as an indicator in the present disclosure) is configured in the LTE or NR PDCP layer connected to the UM DRB (the RLC layer operating in the UM mode), when the second condition proposed in the present disclosure is satisfied, when the second condition proposed in the present disclosure is satisfied, the lower layer (the MAC layer) or the upper layer (the RRC layer) transmits an indicator (for example, an indicator indicating to release the connection with the source gNB) to the PDCP layer, and the PDCP layer receives the indicator, or when the second condition is satisfied, the lower layer (the MAC layer) or the upper layer (the RRC layer) transmits an indicator (for example, an indicator indicating to release the connection with the source gNB) to the PDCP layer, and the PDCP layer receives the indicator, the LTE or NR PDCP layer connected to the UM DRB (the RLC layer operating in the UM mode) may trigger and configure the PDCP status report and transmit the PDCP status report to the source gNB or the target gNB. When the PDCP layer releases the source gNB, the UE may transmit the PDCP status report (or new PDCP control data) to the source gNB or the target gNB to indicate to the source gNB or the target gNB that the UE has released the connection with the source gNB. Because the source gNB or the target gNB may identify the time when the UE satisfies the second condition, the source gNB or the target gNB may manage the transmission source of the UE by reflecting, to the scheduling, the time when the UE satisfies the second condition.

According to the triggering condition of the PDCP status report proposed in the present disclosure, when the PDCP status report is triggered in the LTE or NR PDCP layer connected to the AM DRB (the RLC layer operating in the AM mode) or the LTE or NR PDCP layer connected to the UM DRB (the RLC layer operating in the UM mode), the UE may configure the PDCP status report as follows.

When the PDCP status report is triggered in the NR PDCP layer connected to the AM DRB or the UM DRB, or when the PDCP status report is triggered, the UE may configure the PDCP status report as follows.

A first missing count (FMC) value of the PDCP status report is set to a value of RX_DELIV variable (a count value of first data not transmitted to the upper layer).

When the value of RX_DELIV (the count value of the first data not transmitted to the upper layer) is less than a value of RX_NEXT (a count value of data expected to be received next)

A length of a bitmap field may be set to a length from a count value not including first lost PDCP SDU to a multiple of 8 including a count value of last data out of order, or a length of a bitmap field may be set to a length from a count value not including first lost PDCP SDU to a count value of PDCP SDU that makes the size of the PDCP control data (PDCP status report) 9,000 bytes. The length may be set according to the first satisfying case among the two cases.

When PDCP SDUs corresponding to the bitmap field are not successfully received, or when the header decompression failure occurs, the bitmap field corresponding to the PDCP SDU may be set to 0.

When PDCP SDUs corresponding to the bitmap field are successfully received, the bitmap field corresponding to the PDCP SDU may be set to 1.

When the PDCP status report configured as described above is transmitted to the lower layer, the PDCP status report may be transmitted to the lower layer as the first PDCP PDU of the transmitting PDCP layer. That is, the highest priority is assigned to the PDCP status report, and when the PDCP status report is generated, the PDCP status report is first transmitted to the lower layer in order for fast transmission.

When the PDCP status report is triggered in the LTE PDCP layer connected to the AM DRB, or when the PDCP status report is triggered, When there are data received due to the re-establishment of the lower layer (RLC layer), the data received due to the re-establishment of the lower layer (RLC layer) is first processed, and then, the PDCP status report may be configured as follows.

A first missing PDCP sequence number (FMS) value of the PDCP status report may be set to a value obtained by increasing the sequence number of first lost PDCP SDU, the PDCP sequence number of first data not transmitted to the upper layer, or the PDCP sequence number of data finally transmitted to the upper layer by 1.

When at least one PDCP SDU out of order is stored in the buffer, a length of a bitmap field may be set to a length from a PDCP sequence number not including first lost PDCP SDU to a multiple of 8 including a PDCP sequence number of last data out of order, or a length of a bitmap field may be set to a length from a PDCP sequence number not including first lost PDCP SDU to a PDCP sequence number of PDCP SDU that makes the size of the PDCP control data (PDCP status report) 8188 bytes. The length may be set according to the first satisfying case among the two cases.

When PDCP SDUs corresponding to the bitmap field are not successfully received, or when the header decompression failure occurs, the bitmap field corresponding to the PDCP SDU may be set to 0.

When PDCP SDUs corresponding to the bitmap field are successfully received, the bitmap field corresponding to the PDCP SDU may be set to 1.

When the PDCP status report configured as described above is transmitted to the lower layer, the PDCP status report may be transmitted to the lower layer as the first PDCP PDU of the transmitting PDCP layer. That is, the highest priority is assigned to the PDCP status report, and when the PDCP status report is generated, the PDCP status report is first transmitted to the lower layer in order for fast transmission.

When the PDCP status report is triggered in the LTE PDCP layer connected to the UM DRB, or when the PDCP status report is triggered, When there are data received due to the re-establishment of the lower layer (RLC layer), the data received due to the re-establishment of the lower layer (RLC layer) is processed first, and then, the PDCP status report may be configured as follows.

An FMS value of the PDCP status report or a new field value may be set to a value obtained by increasing the sequence number of first lost PDCP SDU, the PDCP sequence number of first data not transmitted to the upper layer or the PDCP sequence number of data finally transmitted to the upper layer by 1.

When at least one PDCP SDU out of order is stored in the buffer,
  a length of a bitmap field may be set to a length from a PDCP sequence number not including first lost PDCP SDU, first PDCP SDU not transmitted to the upper layer, or next PDCP SDU of data finally transmitted to the upper layer to a multiple of 8 including a PDCP sequence number of last data out of order, or a length of a bitmap field may be set to a length from a PDCP sequence number not including first lost PDCP SDU to a PDCP sequence number of PDCP SDU that makes the size of the PDCP control data (PDCP status report) 8188 bytes. The length may be set according to the first satisfying case among the two cases.

When PDCP SDUs corresponding to the bitmap field are not successfully received, or when the header decompression failure occurs, the bitmap field corresponding to the PDCP SDU may be set to 0.

When PDCP SDUs corresponding to the bitmap field are successfully received, the bitmap field corresponding to the PDCP SDU may be set to 1.

When the PDCP status report configured as described above is transmitted to the lower layer, the PDCP status report may be transmitted to the lower layer as the first PDCP PDU of the transmitting PDCP layer. That is, the highest priority is assigned to the PDCP status report, and when the PDCP status report is generated, the PDCP status report is first transmitted to the lower layer in order for fast transmission.

According to another method, when there are data received due to the re-establishment of the lower layer (RLC layer), the data received due to the re-establishment of the lower layer (RLC layer) is first processed, and then, the PDCP status report may be configured as follows.

The FMS value of the PDCP status report, a next received PDCP sequence number (NRS) field value, or new field value is set to the PDCP serial number value expected to be received next.

When at least one PDCP SDU out of order is stored in the buffer,
  a length of a bitmap field may be set to a length from a PDCP sequence number not including PDCP SDU expected to be received next to a multiple of 8 including a PDCP sequence number of last data transmitted to the upper layer in descending order, next data, or first data not transmitted to the upper layer, or a length of a bitmap field may be set to a length from a PDCP sequence number not including PDCP SDU expected to be received next to a PDCP sequence number of PDCP SDU that makes the size of the PDCP control data (PDCP status report) 8188 bytes in descending order. The length may be set according to the first satisfying case among the two cases.

When PDCP SDUs corresponding to the bitmap field are not successfully received, or when the header decompression failure occurs, the bitmap field corresponding to the PDCP SDU may be set to 0.

When PDCP SDUs corresponding to the bitmap field are successfully received, the bitmap field corresponding to the PDCP SDU may be set to 1.

When the PDCP status report configured as described above is transmitted to the lower layer, the PDCP status report may be transmitted to the lower layer as the first PDCP PDU of the transmitting PDCP layer. That is, the highest priority is assigned to the PDCP status report, and when the PDCP status report is generated, the PDCP status report is first transmitted to the lower layer in order for fast transmission.

When the NR PDCP layer connected to the UM DRB or the AM DRB receives the PDCP status report generated as described above, the PDCP layer may set the bitmap field to 1. When successful delivery is confirmed for each data having a count value less than the FMC field, the PDCP layer may perform a procedure for discarding data for which successful delivery is confirmed.

When the LTE PDCP layer connected to the AM DRB receives the PDCP status report generated as described above, the PDCP layer may set the bitmap field to 1. When successful delivery is confirmed for each data having a count value less than the FMS field, the PDCP layer may perform a procedure for discarding data for which successful delivery is confirmed.

When the LTE PDCP layer connected to the UM DRB receives the PDCP status report generated as described above, the PDCP layer may set the bitmap field to 1. When successful delivery is confirmed for each data having a count value less than or greater than the FMS field, the NRS field, or a new field, the PDCP layer may perform a procedure for discarding data for which successful delivery is confirmed.

When the PDCP status report has been received and data for which successful delivery is confirmed in the PDCP status report has been transmitted to the lower layer (for example, the RLC layer), the PDCP layer may transmit, to the lower layer, a discard indicator indicating to discard the data. The operation of the lower layer receiving the discard indicator is as follows.

When the indicator indicating to discard data (for example, PDCP user data) is received from the LTE or NR PDCP layer and the RLC layer entity receiving the discard indicator is an LTE RLC layer,
    For user data (PDCP PDU, PDCP data PDU, or RLC SDU) received from the upper layer (PDCP layer), when a part of the user data has not yet been mapped to RLC user data (RLC data PDU), or when not generated as RLC user data, the LTE RLC layer discards the user data (When indicated from upper layer (i.e. PDCP) to discard a particular RLC SDU, the transmitting side of an AM RLC entity or the transmitting UM RLC entity shall discard the indicated RLC SDU if no segment of the RLC SDU has been mapped to a RLC data PDU yet). Therefore, when a part of the user data has already been mapped to RLC user data (RLC data PDU), or when generated as RLC user data, the LTE RLC layer may transmit the data to the source gNB without discarding the user data.
  When the indicator indicating to discard data (for example, PDCP user data) is received from the LTE or NR PDCP layer and the RLC layer entity receiving the discard indicator is an NR RLC layer, For user data (PDCP PDU, PDCP data PDU, or RLC SDU) received from the upper layer (PDCP layer), when the user data or part of the user data has never been transmitted or delivered to the lower layer, the NR RLC layer discards the user data (When indicated from upper layer (i.e. PDCP) to discard a particular RLC SDU, the transmitting side of an AM RLC entity or the transmitting UM RLC entity shall discard the indicated RLC SDU, if neither the RLC SDU nor a segment thereof has been submitted to the lower layers). Therefore, when the user data or a part of the user data has never been transmitted or delivered the lower layer, the NR RLC layer may transmit the data to the source gNB without discarding the user data. Unlike the LTE RLC layer, the NR RLC layer may discard the user data in a case where the user data is not transmitted even when the user data is generated as RLC user data. Therefore, more data may be discarded and unnecessary data transmission may be prevented more effectively.

The present disclosure proposes the operation of the UE that specifically performs the techniques proposed above.

1> When the UE receives the handover command message (for example, RRCReconfiguration message), or when ReconfigWithSync information (in the case of the NR gNB) or MobilityControlInfo information (in the case of the LTE gNB) is received in the RRCReconfiguration message, the UE may perform one or more of the following operations.
 2> The first timer proposed in the present disclosure is started.
 2> When the second handover method (for example, the second embodiment of the present disclosure or the DAPS handover method) is not indicated, when the DAPS handover method is not indicated for each bearer identifier or each logical channel identifier, when the DAPS handover method is not configured for at least one bearer, or when the DAPS handover method is not configured for any bearer,
  3> when the second timer for the source gNB proposed in the present disclosure is running, the second timer may be stopped.
 2> When the second handover method (for example, the second embodiment of the present disclosure or the DAPS handover method) is indicated, when the DAPS handover method is indicated for each bearer identifier or each logical channel identifier, when the DAPS handover method is configured for at least one bearer, or when the DAPS handover method is configured for a certain bearer, or for the bearer for which the DAPS handover method is configured, the UE may perform one or more of the following operations.
  3> Even when the second timer for the source gNB proposed in the present disclosure is running, the second timer is not stopped.
  3> SRBs for the source gNB are suspended.
  3> The MAC layer for the target gNB may be generated or established.
  3> A new UE identifier (for example, C-RNTI) may be applied in the target gNB or the MAC or PHY layer for the target gNB.
  3> Pieces of configuration information for the target gNB configured in the handover message may be configured in the lower layers (for example, the SDAP layer, the PDCP layer, the RLC layer, or the MAC layer or the PHY layer for the target gNB).
  3> SCells configured in the source gNB may be regarded as being in the inactive state.
  3> The RLC layers may be generated or established for the target gNB or in the MAC layer for the target gNB based on the configuration information of the RLC layer received in the handover command message.
  3> The logical channel identifier or related configuration information (for example, priority, prioritizedBiteRate, or BucketSizeDuration) may be generated or established for the target gNB or in the MAC layer for the target gNB based on the configuration information of the MAC layer received in the handover command message.
  3> In the configuration information for the source gNB or the current, previous, or existing configuration information (for example, MAC layer configuration information), configuration information (logical channel identifier, priority, prioritizedBiteRate, BucketSizeDuration, etc.) except for the configuration information of the MAC layer related to the bearers for which the DAPS handover method is not configuration in the handover command message may be reconfigured in the lower layer (for example, the MAC layer). According to another method, in the configuration information for the source gNB or the current, previous, or existing configuration information (for example, MAC layer configuration information (logical channel identifier, priority, prioritizedBiteRate, BucketSizeDuration, etc.)), only the configuration information of the MAC layer related to the bearers for which the DAPS handover method is configuration in the handover command message may be reconfigured in the lower layer (for example, the MAC layer). Specifically, in the MAC layer for the source gNB, the MAC layer configuration information (logical channel identifier, priority, prioritizedBiteRate, BucketSizeDuration, etc.) for the bearer for which the DAPS handover method is configured is maintained or configured, and the MAC layer configuration information (logical channel identifier, priority, prioritizedBiteRate, BucketSizeDuration, etc.) for the bearer for which the DAPS handover method is not configured may be released. According to another method, when the source gNB performs the DAPS handover method, configuration information of the MAC layer for the source gNB to be applied may be set as an RRC message.
  3> The PDCP layer corresponding to the SRB or SRB identifier may be generated or established for the target gNB or the MAC layer for the target gNB, and the ciphering or deciphering algorithm or the integrity protection or integrity verification algorithm may be configured in the PDCP layer together with the security keys for the target gNB received in the handover command message. When the ciphering function or the integrity function is configured or is not released, the PDCP layer may configure the ciphering function or the integrity protection function by applying the security key or algorithm.

3> When there is PDCP layer configuration information for the SRB or SRB identifier, the PDCP layer configuration information is applied, and when there is no PDCP layer configuration information, default configuration information is applied.

3> For the bearer (SRB or DRB) for which the DAPS handover method is configured, the PDCP re-establishment procedure indicator may always be set to false so that the PDCP re-establishment procedure is not triggered. This is because, when the PDCP re-establishment procedure is performed, the data interruption time may occur in the DAPS handover method. According to another method, the PDCP re-establishment procedure may be indicated for the SRB, and the PDCP re-establishment procedure may not be indicated for the DRB. This is because the SRB for the source gNB and the SRB for the target gNB may be independently configured.

3> For the bearer (SRB or DRB) for which the DAPS handover method is configured, the first PDCP layer structure may be reconfigured to the second PDCP layer structure.

3> When configuration information (for example, mapping information between the QoS and the bearer) of the SDAP layer is included, the configuration information of the SDAP layer may be configured for the target gNB. The configuration information of the existing SDAP layer for the source gNB may be maintained and released when the connection with the source gNB is released.

3> When the entire configuration information is newly configured (full configuration), the default value of the first timer or the second timer for the target gNB is applied and operated, the default configuration information for the PHY layer or the MAC layer is applied, and the default configuration information is also applied to SRBs. The configuration information for the current gNB or the source gNB is maintained and applied.

2> Otherwise (for example, when the second handover method (for example, the second embodiment of the present disclosure or the DAPS handover method) is not indicated, when the DAPS handover method is not indicated for each bearer identifier or each logical channel identifier, when the DAPS handover method is not configured for at least one bearer, or when the DAPS handover method is not configured for any bearer, or for the bearer for which the DAPS handover is not configured), the UE may perform one or more of the following operations.

3> The MAC layer for the source gNB or the current gNB may be initialized.

3> SCells configured in the source gNB may be regarded as being in the inactive state.

3> A new UE identifier (for example, C-RNTI) may be applied in the source gNB, the current gNB, or the MAC or PHY layer for the current gNB.

3> When the RLC re-establishment procedure is indicated, the RLC re-establishment procedure may be performed.

3> When the PDCP re-establishment procedure is indicated, the PDCP re-establishment procedure may be performed.

3> Pieces of configuration information for the target gNB configured in the handover message may be reconfigured in the lower layers (for example, the SDAP layer, the PDCP layer, the RLC layer, or the MAC layer or the PHY layer for the current gNB or the cell group).

3> When configuration information (for example, mapping information between the QoS and the bearer) of the SDAP layer is included, the configuration information of the SDAP layer may be reconfigured as the configuration information of the SDAP layer.

3> When the entire configuration information is newly configured (full configuration), all pieces of configuration information (SDAP layer, PDCP layer, RLC layer, MAC layer, or PHY layer configuration information) for the current gNB or the source gNB are released. >>3> The default value of the first timer or the second timer is applied and operated to the current gNB or the source gNB, the default configuration information is applied to the PHY layer or the MAC layer, and the default configuration information is also applied to SRBs.

The present disclosure proposes the operation of the PDCP layer of the UE that specifically performs the techniques proposed above.

According to an embodiment of the present disclosure, when the PDCP layer of the UE performs the DAPS handover method proposed in the present disclosure, the PDCP layer of the UE may process data according to the following procedure, and may transmit the data the lower layer or indicate the size of the data to the lower layer.

When the transmitting PDCP layer transmits data (PDCP PDU) to the lower layer, the transmitting PDCP layer may perform the following procedure.

1> When the transmitting PDCP layer is connected to one RLC layer,
2> the data (PDCP PDU) is transmitted to the connected RLC layer.

1> When the transmitting PDCP layer is connected to two RLC layers,
2> when the PDCP duplication function (packet duplication technology or PDCP packet duplication) is activated,
3> when data to be delivered to the lower layer (PDCP PDU) is PDCP user data (PDCP data PDU),
4> The data (PDCP data PDU) is duplicated and the data (PDCP data PDU) is transmitted to the connected RLC layers.
3> Otherwise (when data to be delivered to the lower layer (PDCP PDU) is PDCP control data (PDCP data PDU),
4> The data (PDCP control PDU) is transmitted to the connected first RLC layer (the primary RLC entity). When the first RLC layer or the second RLC layer may be configured in the RRC message received from the base gNB as in FIG. 1E, and when the first RLC layer is not deactivated and the packet redundancy technique is configured, PDCP control data (PDCP control PDU) may always be transmitted to the first RLC layer without being duplicated.
2> Otherwise (that is, when the PDCP duplication function (packet duplication technique or PDCP packet duplication) is activated),
3> when the total data amount of the size of the PDCP data and the size of the RLC data waiting for initial transmission in the RLC layers connected to the PDCP layer is equal to or greater than a threshold value for uplink data transmission (the threshold value may be set in the RRC message received from the gNB as in FIG. 1E), and/or 3> when the transmitting PDCP layer is not connected to the bearer for which the DAPS handover method is configured (or when the DAPS handover method is not configured), and/or 3> when the RLC layers (or two RLC layers) connected to the transmitting PDCP layer belong to different cell groups (or gNBs), 4> the data (PDCP PDU, PDCP data PDU, or PDCP control PDU) may be transmitted to the first RLC layer or the second RLC layer. The first RLC layer or the second RLC layer may be configured in the RRC message received from the gNB as in FIG. 1E.

3> Otherwise, when the transmitting PDCP layer is connected to the bearer for which the DAPS handover method is configured (or when the DAPS handover method is configured), and/or 4> when an indicator indicating that the first condition is satisfied has not been received from the upper layer or the lower layer, or when an indicator indicating to switch uplink data transmission has not been received, 5> the data (PDCP PDU, PDCP data PDU, or PDCP control PDU) may be transmitted to the source gNB or the RLC layer for the source gNB.

4> Otherwise (when an indicator indicating that the first condition is satisfied has been received from the upper layer or the lower layer, or when an indicator indicating to switch uplink data transmission has been received), 5> when the data is PDCP user data (PDCP data PDU), 6> the PDCP user data may be transmitted to the target gNB or the RLC layer for the target gNB.

5> Otherwise (that is, when the data is PDCP control data (PDCP data PDU)),

6> when the PDCP control data is data for the source gNB or is related to the source gNB, 7> the PDCP control data may be transmitted to the source gNB or the RLC layer for the source gNB.

6> Otherwise (that is, when the PDCP control data is data for the target gNB or is related to the target gNB), 7> the PDCP control data may be transmitted to the target gNB or the RLC layer for the target gNB.

3> Otherwise (that is, when the total data amount of the size of the PDCP data and the size of the RLC data waiting for initial transmission in the RLC layers connected to the PDCP layer is not equal to or greater than the threshold value for uplink data transmission, when the transmitting PDCP layer is not connected to the bearer for which the DAPS handover method is configured (or when the DAPS handover method is configured), or when the RLC layers (or two RLC layers) connected to the transmitting PDCP layer do not belong to different cell groups (or gNBs), 4> the data (PDCP PDU, PDCP data PDU, or PDCP control PDU) may be transmitted to the first RLC layer.

FIG. 1K is a flowchart for describing a method, performed by a UE, of managing a protocol layer in DAPS handover according to an embodiment of the disclosure.

Referring to FIG. 1K, in operation 1k-05, the UE may receive, from a source gNB, a first RRC reconfiguration message including configuration information indicating reconfiguration with sync, bearer identification information, and DAPS configuration information indicating that the bearer is configured as a DAPS bearer.

In operation 1k-10, the UE may reconfigure a PDCP entity of the UE for the bearer.

According to an embodiment of the present disclosure, the UE may configure a security key and header compression context of a target gNB with respect to the PDCP entity.

In operation 1k-15, the UE may switch uplink data transmission from the source gNB to the target gNB.

According to an embodiment of the present disclosure, when random access to the target gNB is successfully completed, the UE may request the PDCP entity to switch uplink data, and when PDCP PDU that the PDCP entity attempts to transmit to the lower layer is PDCP data PDU, the UE may transmit the PDCP data PDU from the PDCP entity to a first RLC entity associated with the target gNB.

According to an embodiment of the present disclosure, in a case where the PDCP PDU that the PDCP entity attempts to transmit to the lower layer is PDCP control PDU, when the PDCP control PDU is associated with the source gNB, the UE may transmit the PDCP control PDU from the PDCP entity to a second RLC entity associated with the source gNB, and when the PDCP control PDU is associated with the target gNB, the UE may transmit the PDCP control PDU from the PDCP entity to the first RLC entity associated with the target gNB.

In operation 1k-20, the UE may release the source gNB.

According to an embodiment of the present disclosure, the UE may receive, from the source gNB or the target gNB, a second RRC reconfiguration message including an indicator indicating to release a source for the bearer, may release a second RLC entity associated with the source gNB, and may discard a security key and a first header decompression context associated with the source gNB.

According to an embodiment of the present disclosure, before the UE discards the first header decompression context associated with the source gNB, the UE may perform header decompression by applying the first header compression context to data received from the source gNB, which are stored in the PDCP entity.

According to an embodiment of the present disclosure, in the PDCP entity, the header compression context associated with the target gNB may be used for uplink, and the first header decompression context associated with the source gNB and the second header decompression context associated with the target gNB may be used for downlink.

Figure 1L:
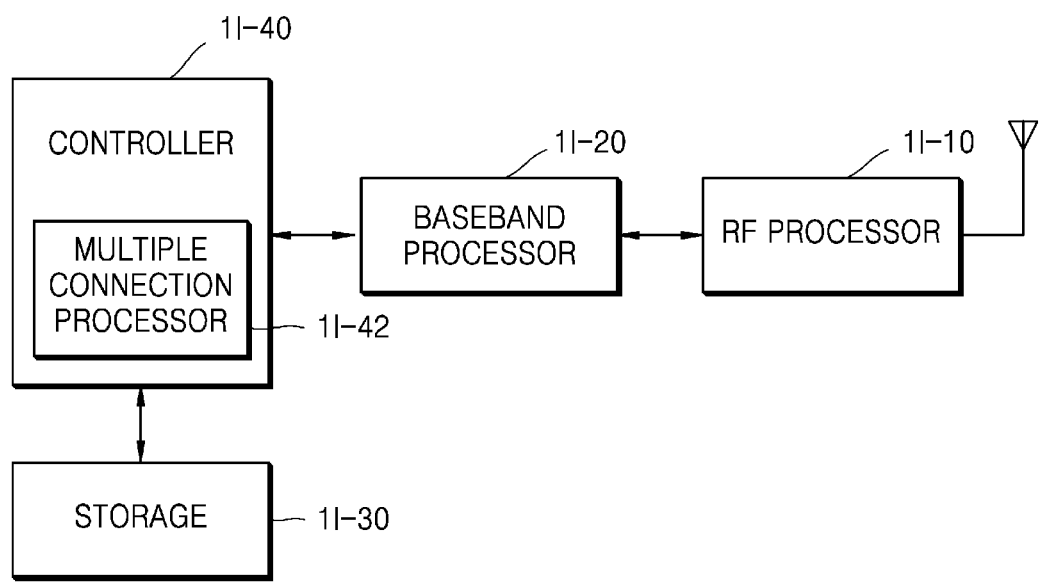
FIG. 1L is a diagram illustrating a structure of a user equipment (UE) to which an embodiment of the present disclosure is applicable.

FIG. 1L is a diagram illustrating a structure of a UE to which an embodiment of the present disclosure is applicable.

Referring FIG. 1L, the UE includes a radio frequency (RF) processor 1l-10, a baseband processor 1l-20, a storage 1l-30, and a controller 1l-40. However, the structure of the UE is not limited to the components illustrated in FIG. 1L.

The RF processor 1l-10 performs functions for transmitting and receiving signals through a radio channel, such as signal band conversion, amplification, and the like. That is, the RF processor 1l-10 up-converts a baseband signal provided from the baseband processor 1*l*-20 into an RF band signal, transmits the RF band signal through an antenna, and down-converts an RF band signal received through the antenna into a baseband signal. For example, the RF processor 1*l*-10 may include a transmission filter, a reception filter, an amplifier, a mixer, an oscillator, a digital-to-analog converter (DAC), an analog-to-digital converter (ADC), and the like. Although only one antenna is illustrated in FIG. 1L, the UE may include a plurality of antennas. Also, the RF processor 1*l*-10 may include a plurality of RF chains. Furthermore, the RF processor 1*l*-10 may perform beamforming. For beamforming, the RF processor 1*l*-10 may adjust the phases and magnitudes of signals transmitted and received through a plurality antennas or antenna elements. Also, the RF processor may perform MIMO, and may receive a plurality of layers upon MIMO operation. The RF processor 1*l*-10 may perform reception beam sweeping by appropriately setting a plurality of antennas or antenna elements under the control of the controller, or may adjust the direction and beam width of the reception beam so that the reception beam is coordinated with the transmission beam.

The baseband processor 1*l*-20 performs a conversion function between a baseband signal and a bit string according to a physical layer standard of a system. For example, upon transmission of data, the baseband processor 1*l*-20 encodes and modulates a transmission bit string to generate complex symbols. Also, upon reception of data, the baseband processor 1*l*-20 reconstructs the reception bit string by demodulating and decoding the baseband signal provided from the RF processor 1*l*-10. For example, in the case of conforming to an OFDM scheme, upon transmission of data, the baseband processor 1*l*-20 encodes and modulates the transmission bit string to generate complex symbols, maps the complex symbols to sub-carriers, and configures OFDM symbols through an inverse fast Fourier transform (IFFT) operation and cyclic prefix (CP) insertion. Also, upon reception of data, the baseband processor 1*l*-20 segments the baseband signal provided from the RF processor 1*l*-10 in units of OFDM symbols, reconstructs signals mapped to sub-carriers through a fast Fourier transform (FFT) operation, and reconstructs a reception bit string through demodulation and decoding.

The baseband processor 1*l*-20 and the RF processor 1*l*-10 transmit and receives signal as described above. Therefore, the baseband processor 1*l*-20 and the RF processor 1*l*-10 may be referred to as a transmitter, a receiver, a transceiver, or a communicator. Furthermore, at least one of the baseband processor 1*l*-20 and the RF processor 1*l*-10 may include a plurality of communication modules so as to support a plurality of different radio access technologies. Also, at least one of the baseband processor 1*l*-20 and the RF processor 1*l*-10 may include different communication modules so as to process signals of different frequency bands. For example, the different radio access technologies may include an LTE network, an NR network, and the like. Also, the different frequency bands may include a super high frequency (SHF) (e.g., 2.5 GHz, 5 GHz) band and a millimeter wave (e.g., 60 GHz) band.

The storage 1*l*-30 stores data such as basic programs, application programs, and configuration information for the operations of the UE. The storage 1*l*-30 provides the stored data in response to the request of the controller 1*l*-40.

The controller 1*l*-40 controls overall operations of the UE. Also, the controller 1*l*-40 controls operations of the UE according to the embodiments of the present disclosure. For example, the controller 1*l*-40 transmits and receives signals through the baseband processor 1*l*-20 and the RF processor 1*l*-10. Also, the controller 1*l*-40 records data in the storage 1*l*-40 and reads data from the storage 1*l*-40. To this end, the controller 1*l*-40 may include at least one processor. For example, the controller 1*l*-40 may include a communication processor (CP) that performs control for communication, and an application processor (AP) that controls an upper layer, such as an application program.

FIG. 1L is a diagram illustrating a structure of a gNB to which an embodiment of the present disclosure is applicable.

Figure 1M:
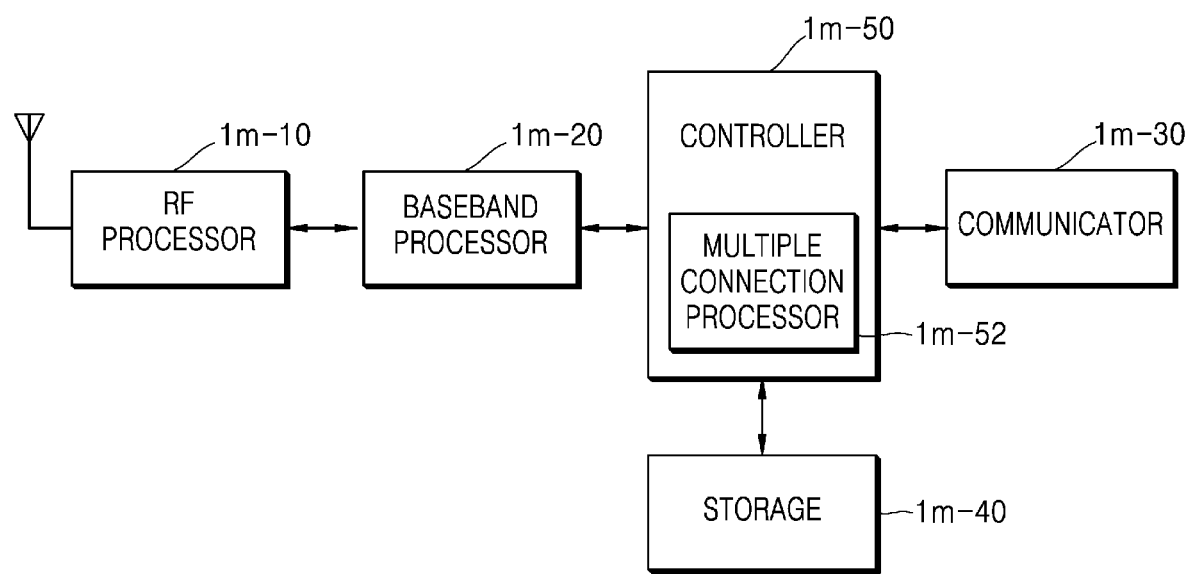
FIG. 1M illustrates a block configuration of a base station (gNB) in a wireless communication system to which an embodiment of the present disclosure is applicable.

Referring to FIG. 1M, the gNB includes an RF processor 1*m*-10, a baseband processor 1*m*-20, a backhaul communicator 1*m*-30, a storage 1*m*-40, and a controller 1*m*-50. However, the structure of the gNB is not limited to the components illustrated in FIG. 1M.

The RF processor 1*m*-10 performs functions for transmitting and receiving signals through a radio channel, such as signal band conversion, amplification, and the like. That is, the RF processor 1*m*-10 up-converts a baseband signal provided from the baseband processor 1*m*-20 into an RF band signal, transmits the RF band signal through an antenna, down-converts an RF band signal received through the antenna into a baseband signal. For example, the RF processor 1*m*-10 may include a transmission filter, a reception filter, an amplifier, a mixer, an oscillator, a DAC, an ADC, and the like. Although only one antenna is illustrated in FIG. 1M, the first access node may include a plurality of antennas. Also, the RF processor 1*m*-10 may include a plurality of RF chains. Also, the RF processor 1*m*-10 may perform beamforming. For beamforming, the RF processor 1*m*-10 may adjust the phases and magnitudes of signals transmitted and received through a plurality antennas or antenna elements. The RF processor may perform a downlink MIMO operation by transmitting one or more layers.

The baseband processor 1*m*-20 performs a conversion function between a baseband signal and a bit string according to a physical layer standard of a first radio access technology. For example, upon transmission of data, the baseband processor 1*m*-20 encodes and modulates a transmission bit string to generate complex symbols. Also, upon reception of data, the baseband processor 1*m*-20 reconstructs the reception bit string by demodulating and decoding the baseband signal provided from the RF processor 1*m*-10. For example, in the case of conforming to an OFDM scheme, upon transmission of data, the baseband processor 1*m*-20 encodes and modulates the transmission bit string to generate complex symbols, maps the complex symbols to sub-carriers, and configures OFDM symbols through an IFFT operation and CP insertion. Also, upon reception of data, the baseband processor 1*m*-20 segments the baseband signal provided from the RF processor 1*m*-10 in units of OFDM symbols, reconstructs signals mapped to sub-carriers through an FFT operation, and reconstructs a reception bit string through demodulation and decoding. The baseband processor 1*m*-20 and the RF processor 1*m*-10 transmit and receive signals as described above. Therefore, the baseband processor 1*m*-20 and the RF processor 1*m*-10 may be referred to as a transmitter, a receiver, a transceiver, a communicator, or a wireless communicator.

The communicator 1*m*-30 provides an interface for performing communication with other nodes in the network.

The storage 1*m*-40 stores data such as basic programs, application programs, and configuration information for the operations of the gNB. Particularly, the storage 1*m*-40 may store information about bearers allocated to the connected UE, measurement results reported from the connected UE, and the like. Also, the storage 1m-40 may store information that is the criterion for determining whether to provide multiple connections to the UE or to stop multiple connections. The storage 1m-40 provides the stored data in response to the request of the controller 1m-50.

The controller 1m-50 controls overall operations of the gNB. Also, the controller 1m-50 controls operations of the gNB according to the embodiments of the present disclosure. For example, the controller 1m-50 transmits and receives signals through the baseband processor 1m-20 and the RF processor 1m-10 or through the backhaul communicator 1m-30. Also, the controller 1m-40 records data in the storage 1m-40 and reads data from the storage 1m-40. To this end, the controller 1m-50 may include at least one processor.

The methods according to the embodiments of the present disclosure, which are described in the claims or the detailed description, may be implemented as hardware, software, or a combination of hardware and software.

When implemented as software, a computer-readable storage medium or a computer program product storing one or more programs (software modules) may be provided. One or more programs stored in the computer-readable storage medium or the computer program product are configured to be executable by one or more processors in an electronic device. One or more programs include instructions that cause the electronic device to execute the methods according to the embodiments of the present disclosure, which are described in the claims or the specification of the present disclosure.

One or more programs (software modules, software, etc.) may be stored in random access memory (RAM), non-volatile memory including flash memory, read-only memory (ROM), electrically erasable programmable read-only memory (EEPROM), magnetic disc storage devices, compact disc-ROM (CD-ROM), digital versatile discs (DVDs), other types of optical storage devices, or magnetic cassette. Alternatively, one or more programs may be stored in a memory provided by a combination of all or part of these devices. Also, each memory may include a plurality of configured memories.

Also, the programs may be stored in an attachable storage device that is accessible through a communication network such as Internet, intranet, local area network (LAN), wide LAN (WLAN), or storage area network (SAN), or communication network provided by a combination thereof. These storage devices may be connected through an external port to a device that performs the embodiments of the present disclosure. Also, a separate storage device on the communication network may access the device that performs the embodiments of the present disclosure.

In specific embodiments of the present disclosure, the elements included in the present disclosure have been expressed in the singular or plural form according to the suggested specific embodiments. However, the expression in the singular or plural form is appropriately selected according to the suggested situations for convenience of explanation and is not intended to limit the present disclosure to the single or plural elements. Even when a certain element is expressed in the plural form, it may be provided with a single element, and even when a certain element is expressed in the singular form, it may be provided with a plurality of elements.

On the other hand, the embodiments disclosed in the present specification and drawings are only presented as specific examples to easily explain the technical contents of the present disclosure and help the understanding of the present disclosure, and are not intended to limit the scope of the present disclosure. That is, it will be obvious to those of ordinary skill in the art that other modifications based on the technical idea of the present disclosure may be made. In addition, the respective embodiments may be operated in combination with each other as necessary. For example, parts of one embodiment and another embodiment of the present disclosure may be combined with each other. In addition, the embodiments may be implemented in other systems, for example, LTE systems, 5G or NR systems, and other modifications based on the technical idea of the embodiments described above.

The invention claimed is:

1. A method performed by a user equipment (UE) in a wireless communication system, the method comprising:
receiving, from a source base station, a first radio resource control (RRC) reconfiguration message including configuration information indicating reconfiguration with sync, identification information of a bearer, and dual active protocol stack (DAPS) configuration information indicating that the bearer is configured as a DAPS bearer;
reconfiguring a packet data convergence protocol (PDCP) entity of the UE for the bearer based on the first RRC reconfiguration message;
in case that a random access to the target base station is successfully completed, requesting, by an RRC entity of the UE, the PDCP entity to switch uplink data;
in case that the uplink data switching being requested, identifying whether a PDCP protocol data unit (PDU) is a PDCP data PDU or a PDCP control PDU;
in case that the PDCP PDU is the PDCP control PDU, identifying whether the PDCP control PDU is associated with the source base station or the target base station; and
in case that the PDCP control PDU is associated with the source base station, submitting, by the PDCP entity, the PDCP control PDU to a radio link control (RLC) entity associated with the source base station.

2. The method of claim 1, wherein the reconfiguring of the PDCP entity of the UE for the bearer comprises configuring and header compression context for the target base station.

3. The method of claim 1, further comprising:
in case that the PDCP PDU is the PDCP data PDU, submitting, by the PDCP entity, the PDCP data PDU to an RLC entity associated with the target base station.

4. The method of claim 1,
in case that the PDCP control PDU is associated with the target base station, submitting, by the PDCP entity, the PDCP control PDU to the first RLC entity associated with the target base station.

5. The method of claim 1, further comprising:
receiving, from the source base station or the target base station, a second RRC reconfiguration message including an indicator indicating to release a source for the bearer; and
releasing the RLC entity associated with the source base station.

6. The method of claim 5, wherein the releasing of the source base station further comprises, before discarding the first header decompression context associated with the source base station, performing header decompression by applying the first header decompression context to data received from the source base station, which are stored in the PDCP entity.

7. The method of claim 6, wherein, in the PDCP entity, [the] header compression context associated with the target base station is used for uplink, and the first header decompression context associated with the source base station and second header decompression context associated with the target base station are used for downlink.

8. A user equipment (UE) in a wireless communication system, the UE comprising:
  a transceiver; and
  at least one processor configured to:
    control the transceiver to receive, from a source base station, a first radio resource control (RRC) reconfiguration message including configuration information indicating reconfiguration with sync, identification information of a bearer, and dual active protocol stack (DAPS) configuration information indicating that the bearer is configured as a DAPS bearer,
    reconfigure a packet data convergence protocol (PDCP) entity of the UE with respect to the bearer based on the first RRC reconfiguration message,
    in case that a random access to the target base station is successfully completed, request, by an RRC entity of the UE, the PDCP entity to switch uplink data,
    in case that the uplink data switching being requested, identify whether a PDCP protocol data unit (PDU) is a PDCP data PDU or a PDCP control PDU,
    in case that the PDCP PDU is the PDCP control PDU, identify whether the PDCP control PDU is associated with the source base station or the target base station, and
  in case that the PDCP control PDU is associated with the source base station, submit, by the PDCP entity, the PDCP control PDU to a radio link control (RLC) entity associated with the source base station.

9. The UE of claim 8, wherein at least one processor is further configured to configure and header compression context for the target base station.

10. The UE of claim 8, wherein the at least one processor is further configured to:
  in case that the PDCP PDU is the PDCP data PDU, submit, by the PDCP entity, the PDCP data PDU an RLC entity associated with the target base station.

11. The UE of claim 8, wherein the at least one processor is further configured to:
  in case that the PDCP control PDU is associated with the target base station, submit, by the PDCP entity, the PDCP control PDU to the RLC entity associated with the target base station.

12. The UE of claim 8, wherein the at least one processor is further configured to:
  control the transceiver to receive, from the source base station or the target base station, a second RRC reconfiguration message including an indicator indicating to release a source for the bearer, and
  release the RLC entity associated with the source base station.

13. The UE of claim 12, wherein the at least one processor is further configured to, before discarding the first header decompression context associated with the source base station, perform header decompression by applying the first header decompression context to data received from the source base station, which are stored in the PDCP entity.

14. The UE of claim 13, wherein in the PDCP entity, header compression context associated with the target base station is used for uplink, and the first header decompression context associated with the source base station and second header decompression context associated with the target base station are used for downlink.

* * * * *